US009695361B2

(12) United States Patent
Kawamura

(10) Patent No.: US 9,695,361 B2
(45) Date of Patent: Jul. 4, 2017

(54) LIQUID CRYSTAL COMPOSITION AND LIQUID CRYSTAL DISPLAY ELEMENT USING THE SAME

(71) Applicant: DIC CORPORATION, Tokyo (JP)

(72) Inventor: Joji Kawamura, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/384,894

(22) PCT Filed: Oct. 5, 2012

(86) PCT No.: PCT/JP2012/076027
§ 371 (c)(1),
(2) Date: Sep. 12, 2014

(87) PCT Pub. No.: WO2014/054181
PCT Pub. Date: Apr. 10, 2014

(65) Prior Publication Data
US 2015/0028257 A1    Jan. 29, 2015

(51) Int. Cl.
*C09K 19/30* (2006.01)
*C09K 19/20* (2006.01)
(Continued)

(52) U.S. Cl.
CPC .......... *C09K 19/3068* (2013.01); *C09K 19/20* (2013.01); *C09K 19/3066* (2013.01);
(Continued)

(58) Field of Classification Search
CPC ...... C09K 2019/0466; C09K 2019/123; C09K 2019/124; C09K 2019/3004;
(Continued)

(56) References Cited

U.S. PATENT DOCUMENTS 8,603,594 B2 * 12/2013 Hamano ................ C09K 19/20
                                                          252/299.61
8,617,419 B2 * 12/2013 Ohgiri .................... C09K 19/32
                                                          252/299.01
(Continued)

FOREIGN PATENT DOCUMENTS

CN      101544894 A      9/2009
CN      102226090 A     10/2011
(Continued)

OTHER PUBLICATIONS

International Search Report dated Nov. 6, 2012 issued in corresponding application No. PCT/JP2012/076027.
(Continued)

*Primary Examiner* — Shean C Wu
(74) *Attorney, Agent, or Firm* — Westerman, Hattori, Daniels & Adrian, LLP

(57) ABSTRACT

The liquid crystal composition of the present invention can be used in a liquid crystal display element of an IPS type or a TN type in which display defects such as burn-in and dropping marks in high speed response are unlikely to be generated. Since the liquid crystal composition contains a component which is a dielectrically positive component including a dielectrically positive compound and a dielectrically neutral component of which dielectric anisotropy is greater than −2 and less than +2, the liquid crystal composition has excellent characteristics that the liquid crystal composition has a liquid crystal phase in a wide temperature range, low viscosity, excellent solubility at a low temperature, high specific resistance and a high voltage holding ratio, and is stable with respect to heat and light.

6 Claims, 1 Drawing Sheet

(51) Int. Cl.
   *C09K 19/44*  (2006.01)
   *C09K 19/12*  (2006.01)
   *C09K 19/04*  (2006.01)

(52) U.S. Cl.
   CPC ...... *C09K 19/44* (2013.01); *C09K 2019/0444* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3078* (2013.01)

(58) Field of Classification Search
   CPC ...... C09K 2019/3009; C09K 2019/301; C09K 2019/3016; C09K 2019/3019; C09K 2019/0444; C09K 19/3003; C09K 19/3066; C09K 19/3068; C09K 19/44
   See application file for complete search history.

(56) References Cited

U.S. PATENT DOCUMENTS

| | | | |
|---|---|---|---|
| 9,005,479 B2 * | 4/2015 | Yanai | C09K 19/20 252/299.61 |
| 2003/0134056 A1 | 7/2003 | Heckmeier et al. | |
| 2006/0043334 A1 | 3/2006 | Tomi | |
| 2006/0204677 A1 * | 9/2006 | Wittek et al. | 428/1.1 |
| 2006/0278850 A1 | 12/2006 | Czanta et al. | |
| 2008/0029736 A1 | 2/2008 | Saito | |
| 2008/0083904 A1 | 4/2008 | Wittek et al. | |
| 2008/0128653 A1 | 6/2008 | Manabe et al. | |
| 2008/0199635 A1 | 8/2008 | Hirschmann et al. | |
| 2008/0260971 A1 | 10/2008 | Wittek et al. | |
| 2009/0065739 A1 | 3/2009 | Haseba et al. | |
| 2009/0091703 A1 | 4/2009 | Matsumura et al. | |
| 2009/0194739 A1 | 8/2009 | Wittek et al. | |
| 2009/0237610 A1 | 9/2009 | Saito et al. | |
| 2009/0256114 A1 | 10/2009 | Yamashita et al. | |
| 2009/0289223 A1 | 11/2009 | Wittek et al. | |
| 2009/0321685 A1 | 12/2009 | Tomi | |
| 2010/0026953 A1 † | 2/2010 | Hirschmann | |
| 2010/0051865 A1 † | 3/2010 | Yoshino | |
| 2010/0085529 A1 | 4/2010 | Wittek et al. | |
| 2010/0219375 A1 | 9/2010 | Wittek et al. | |
| 2010/0224827 A1 | 9/2010 | Wittek et al. | |
| 2010/0272927 A1 | 10/2010 | Hiraoka et al. | |
| 2010/0276635 A1 | 11/2010 | Wittek et al. | |
| 2010/0294991 A1 | 11/2010 | Saito et al. | |
| 2010/0294992 A1 † | 11/2010 | Fujita | |
| 2010/0294993 A1 | 11/2010 | Fujita et al. | |
| 2010/0302498 A1 | 12/2010 | Saito | |
| 2010/0314582 A1 | 12/2010 | Wittek et al. | |
| 2010/0320420 A1 * | 12/2010 | Hirschmann et al. ... | 252/299.61 |
| 2011/0049427 A1 | 3/2011 | Jansen et al. | |
| 2011/0095228 A1 † | 4/2011 | Saito | |
| 2011/0193023 A1 | 8/2011 | Yanai et al. | |
| 2011/0260104 A1 | 10/2011 | Maeda et al. | |
| 2011/0261312 A1 | 10/2011 | Saito et al. | |
| 2011/0291048 A1 † | 12/2011 | Hamano | |
| 2011/0301360 A1 | 12/2011 | Lietzau et al. | |
| 2011/0309301 A1 | 12/2011 | Fujita et al. | |
| 2011/0315925 A1 | 12/2011 | Hiraoka et al. | |
| 2012/0001123 A1 | 1/2012 | Jansen et al. | |
| 2012/0044453 A1 † | 2/2012 | Miyairi | |
| 2012/0068114 A1 | 3/2012 | Daigo et al. | |
| 2012/0229751 A1 † | 9/2012 | Yanai | |
| 2012/0256124 A1 * | 10/2012 | Ohgiri | C09K 19/32 252/299.61 |
| 2013/0134355 A1 † | 5/2013 | Saito | |
| 2013/0248762 A1 | 9/2013 | Hirschmann et al. | |
| 2014/0027672 A1 | 1/2014 | Yanai et al. | |
| 2014/0070141 A1 | 3/2014 | Lietzau et al. | |

FOREIGN PATENT DOCUMENTS

| | | |
|---|---|---|
| CN | 102250625 A | 11/2011 |
| DE | 10 2009 018 149 A1 | 11/2009 |
| EP | 0 717 093 A2 | 6/1996 |
| EP | 2 457 975 A2 | 5/2012 |
| JP | 08-157826 A | 6/1996 |
| JP | 2003-518154 A | 6/2003 |
| JP | 2006-328399 A | 12/2006 |
| JP | 2008-502754 A | 1/2008 |
| JP | 2008-037918 A | 2/2008 |
| JP | 2008-038018 A | 2/2008 |
| JP | 2008-88433 A | 4/2008 |
| JP | 2008-189927 A | 8/2008 |
| JP | 2008-545804 A | 12/2008 |
| JP | 2009-67780 A | 4/2009 |
| JP | 2009-84560 A | 4/2009 |
| JP | 2009-185285 A | 8/2009 |
| JP | 2009-191264 A | 8/2009 |
| JP | 2009-256614 A | 11/2009 |
| JP | 2009-270102 A | 11/2009 |
| JP | 2010-501688 A | 1/2010 |
| JP | 2010-53211 A | 3/2010 |
| JP | 2010-254871 A | 11/2010 |
| JP | 2010-261034 A | 11/2010 |
| JP | 2010-270178 A | 12/2010 |
| JP | 2010-270189 A | 12/2010 |
| JP | 2010-275390 A | 12/2010 |
| JP | 2011-52120 A | 3/2011 |
| JP | 2011-231197 A | 11/2011 |
| JP | 2012-7020 A | 1/2012 |
| JP | 2012-117062 A | 6/2012 |
| JP | 2012-219270 A | 11/2012 |
| JP | 2014-24888 A | 2/2014 |
| JP | 2014-503615 A | 2/2014 |
| WO | 2005/123879 A1 | 12/2005 |
| WO | 2006/038443 A1 | 4/2006 |
| WO | 2006/133783 A1 | 12/2006 |
| WO | 2008/025533 A1 | 3/2008 |
| WO | 2008/138643 A1 | 11/2008 |
| WO | 2009/028367 A1 | 3/2009 |
| WO | 2009/028368 A1 | 3/2009 |
| WO | 2009/100810 A1 | 8/2009 |
| WO | 2009/129915 A1 | 10/2009 |
| WO | 2010/050324 A1 | 5/2010 |
| WO | 2010/090076 A1 | 8/2010 |
| WO | 2010/099853 A1 | 9/2010 |
| WO | 2010/106910 A1 | 9/2010 |
| WO | 2010/131614 A1 | 11/2010 |
| WO | 2010/137538 A1 | 12/2010 |
| WO | 2010/270178 A1 | 12/2010 |
| WO | 2011/065299 A1 | 6/2011 |
| WO | 2011/137956 A1 | 11/2011 |
| WO | 2012/007096 A1 | 1/2012 |
| WO | 2012/020642 A1 | 2/2012 |
| WO | 2012/069151 A1 | 5/2012 |

OTHER PUBLICATIONS

Extended European Search Report dated Nov. 2, 2015 issued in counterpart European Application No. 12886016.0 (12 pages).

\* cited by examiner
† cited by third party

LIQUID CRYSTAL COMPOSITION AND LIQUID CRYSTAL DISPLAY ELEMENT USING THE SAME

TECHNICAL FIELD

The present invention relates to a nematic liquid crystal composition of which dielectric anisotropy (Δ∈) is a positive value useful as a liquid crystal display material and a liquid crystal display element using the same.

BACKGROUND ART

The liquid crystal display element is used in various kinds of measuring apparatus, a panel for an automobile, a word processor, an electronic organizer, a printer, a computer, a TV, a clock, an advertising display board and the like including a watch and a calculator. The representative examples of the liquid crystal display method include a TN (twisted nematic) type, an STN (super twisted nematic) type, and a vertical alignment type and an IPS (in-plane switching) type using a TFT (thin film transistor). The liquid crystal composition used in these liquid crystal display elements is required to be stable with respect to external impetuses such as water, air, heat, and light, and to exhibit a liquid crystal phase in as wide temperature range around room temperature as possible, and to have a low viscosity and a low driving voltage. Furthermore, the liquid crystal composition is constituted with several kinds of compounds to several dozens of compounds in order to make dielectric anisotropy (Δ∈) and/or refractive index anisotropy (Δn) optimal values in each display element.

In the vertical alignment (VA) type display, a liquid crystal composition having negative Δ∈ is used, and in horizontal alignment type displays such as the TN type, the STN type, and the IPS (in-plane switching) type, a liquid crystal composition having positive Δ∈ is used. A driving method in which a liquid crystal composition having positive Δ∈ is vertically aligned when no voltage is applied, and a horizontal electric field is applied for display has also been reported, and the need of the liquid crystal composition having positive Δ∈ is further increased. On the other hand, in all the driving methods, a low voltage driving, a high speed response, and a wide operating temperature range are required. That is to say, it is required for Δ∈ to have a positive and high absolute value, for viscosity (η) to be low, and for a nematic phase-isotropic liquid phase transition temperature ($T_{ni}$) to be high. In addition, it is necessary to adjust Δn of the liquid crystal composition to an appropriate range in accordance with a cell gap by setting Δn×d which is a product of Δn and the cell gap (d). Additionally, in a case where the liquid crystal display element is applied to a TV or the like, the liquid crystal composition is required to have low rotational viscosity (γ1) since a high speed response property matters.

As a constitution of the liquid crystal composition for high speed response, for example, liquid crystal compositions using compounds represented by formula (A-1) or (A-2) which are liquid crystal compounds having positive Δ∈ and liquid crystal compounds (B) of which Δ∈ is neutral in combination are disclosed. Characteristics of these liquid crystal compositions are that the liquid crystal compounds having positive Δ∈ have a —CF$_2$O— structure and the liquid crystal compounds having neutral Δ∈ have an alkenyl group, and these are widely known in the field of the liquid crystal composition. (PTLs 1 to 4)

[Chem. 1]

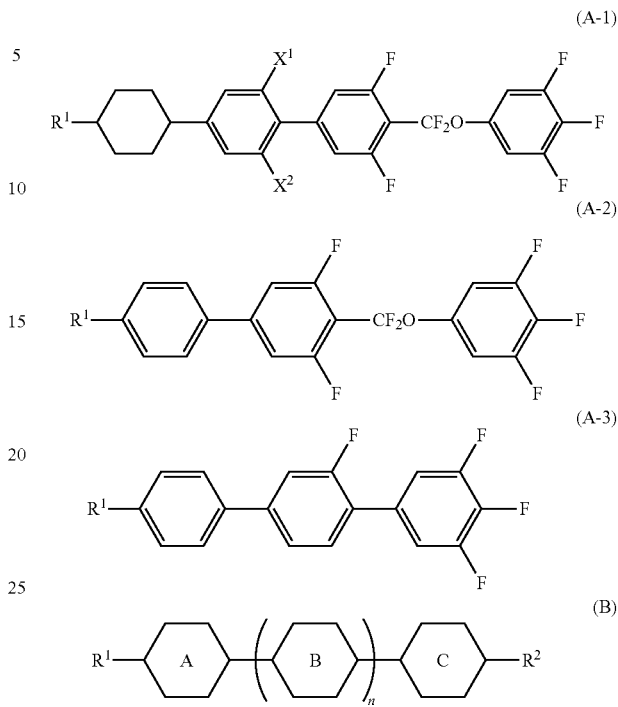

On the other hand, the application for the liquid crystal display element is expanded, and great changes are seen in the usage method and the manufacturing method thereof. In order to cope with these changes, optimization of characteristics other than fundamental physical property values known in the related art is demanded. That is to say, as the liquid crystal display element which uses the liquid crystal composition, the VA type and the IPS type are widely used, a display element of which the size is also an extra-large size equal to or longer than 50 inches is put into practical use and is used. With the increase in a substrate size, in an injection method of the liquid crystal composition into a substrate, the mainstream type of the injection method has been changed from a vacuum injection method in the related art to a drop injection (ODF: One Drop Fill) method, and the problem in that dropping marks generated when the liquid crystal composition is dropped on a substrate leads to a decrease in display quality became an issue. Furthermore, in the liquid crystal display element manufacturing step by the ODF method, the optimal liquid crystal injection amount needs to be dropped according to the size of the liquid crystal display element. If the injection amount greatly deviates from the optimal value, the balance of the refractive index and the driving electric field of the liquid crystal display element which is designed in advance is lost, and display defects such as generation of spots and poor contrast occur. In particular, in a small-sized liquid crystal display element which is frequently used in smart phones in vogue recently, it is difficult to control deviation from the optimal value to be within a certain range since the optimal liquid crystal injection amount is small. Therefore, in order to maintain a high yield of the liquid crystal display element, for example, effects with respect to rapid pressure change or impact in the dropping apparatus which occurs when the liquid crystal is dropped are required to be small, and performance capable of continuously stably dropping a liquid crystal over a long period of time is also required.

In this manner, in the liquid crystal composition used in an active matrix driving liquid crystal display element driven by a TFT element or the like, while maintaining characteristics and performance required as a liquid crystal display element such as high-speed response performance and the like, in addition to characteristics of having a high specific resistance value or a high voltage holding ratio considered to be important in the related art, and being stable with respect to external impetuses such as light and heat, development taking into consideration the manufacturing method of the liquid crystal display element has been demanded.

CITATION LIST

Patent Literature

[PTL 1] JP-A-2008-037918
[PTL 2] JP-A-2008-038018
[PTL 3] JP-A-2010-275390
[PTL 4] JP-A-2011-052120

SUMMARY OF INVENTION

Technical Problem

An object of the present invention is to provide a liquid crystal display composition which has a positive $\Delta\in$, a liquid crystal phase in a wide temperature range, low viscosity, excellent solubility at a low temperature, high specific resistance and a high voltage holding ratio, and is stable with respect to heat and light, and another object of the present invention is to provide, by using the same, a liquid crystal display element of the IPS type or the TN type which has excellent display quality, and in which display defects such as burn-in and dropping marks are unlikely to be generated, with a high yield.

Solution to Problem

The present inventor has examined various liquid crystal compounds and various chemical substances, and as a result, has found that it is possible to solve the problem by combining specific liquid crystal compounds, thereby completing the present invention.

That is, a liquid crystal composition having positive dielectric anisotropy, containing the component (A) which is a dielectrically positive component containing the compound represented by formula (1),

[Chem. 2]

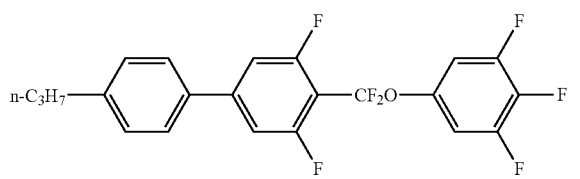

(1)

and the dielectrically neutral component (B) including the dielectrically neutral compound represented by formula (40),

[Chem. 3]

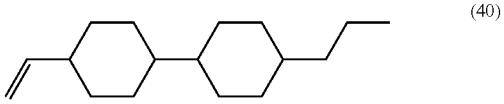

(40)

of which dielectric anisotropy is greater than −2 and less than +2, and the liquid crystal display element using the liquid crystal compositions are provided.

Advantageous Effects of Invention

Since, in the liquid crystal composition having positive dielectric anisotropy of the present invention, significantly low viscosity can be obtained, solubility at a low temperature is excellent, and changes in the specific resistance and the voltage holding ratio due to heat and light are extremely small, practicability of the product is high, and the liquid crystal display element of the IPS type or the FFS type using the same can achieve the high-speed response performance. In addition, since performance can be stably exhibited in the liquid crystal display element manufacturing step, display defects due to the step can be suppressed, the liquid crystal display element can be manufactured with a high yield, and therefore the liquid crystal composition is very useful.

DESCRIPTION OF EMBODIMENTS

Figure 1:
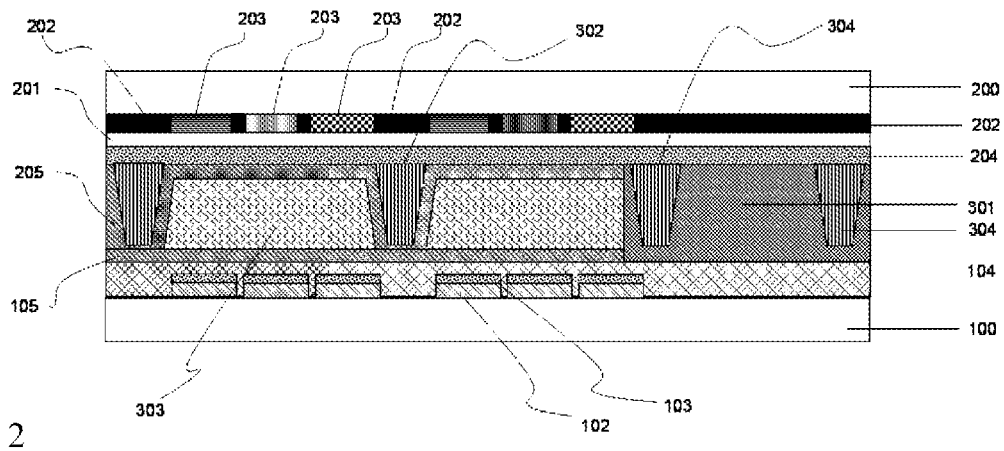
FIG. 1 is a cross-sectional view of a liquid crystal display element of the present invention. A substrate having 100 to 105 is referred to as "back plane", and a substrate having 200 to 205 is referred to as "front plane".
Figure 2:
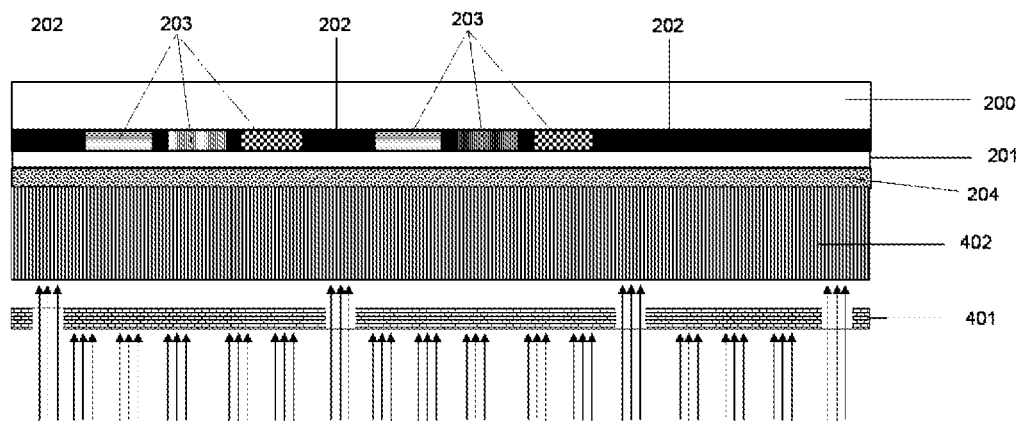
FIG. 2 is a diagram of an exposure processing step using a pattern for producing a post spacer to be formed on a black matrix as a photomask pattern.

The liquid crystal composition having positive dielectric anisotropy of the present invention contains the component (A) which is a dielectrically positive component. The component (A) is constituted with a compound of which dielectric anisotropy is 2 or greater. In addition, the dielectric anisotropy of the compound is a value obtained by extrapolation from measured values of the dielectric anisotropy of the composition prepared by adding in the liquid crystal composition of which the dielectric anisotropy is about 0 at 25° C.

The component (A) of the liquid crystal composition of the present invention contains the compound represented by formula (1).

[Chem. 4]

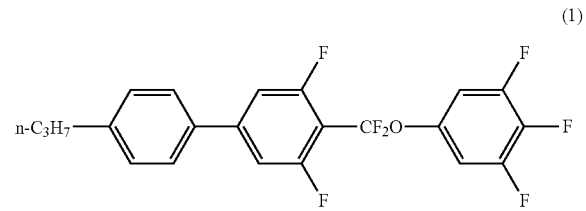

(1)

In the liquid crystal composition of the present invention, the content of the compound represented by formula (1) constituting the component (A) is preferably 2% by mass or greater, more preferably 4% by mass or greater, more preferably 6% by mass or greater, more preferably 8% by mass or greater, more preferably 10% by mass or greater, further more preferably 12% by mass or greater, further more preferably 16% by mass or greater, and particularly preferably 21% by mass or greater with respect to the total amount of the liquid crystal composition of the present invention. In addition, in consideration of solubility at a low temperature, a transition temperature, and electrical reliability, the maximum ratio is preferably 40% by mass or less, more preferably 35% by mass or less, further more preferably 30% by mass or less, and particularly preferably 25% by mass or less.

The liquid crystal composition of the present invention can contain one type or two or more types of compounds represented by general formula (2),

[Chem. 5]

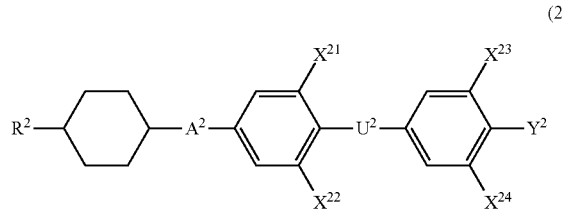

(2)

(In the formula, $R^2$ represents an alkyl group having 2 to 5 carbon atoms, $A^2$ represents a 1,4-phenylene group $X^{24}$ or a 1,4-cyclohexylene group, each of $X^{21}$ to independently represents a hydrogen atom or a fluorine atom, $Y^2$ represents a fluorine atom or —$OCF_3$, and $U^2$ represents a single bond or —$CF_2O$—.) in the dielectrically positive component (A). The compounds with which the compound represented by general formula (2) can be combined are not particularly limited, and in consideration of solubility at a low temperature, a transition temperature, electrical reliability, and birefringence, one type to three types are preferably combined, and one type to four or more types are more preferably combined. Furthermore, the compound represented by general formula (2) is preferably the compound represented by general formulas (2.1) to (2.5).

[Chem. 6]

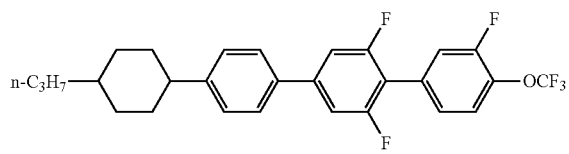

(2.1)

[Chem. 7]

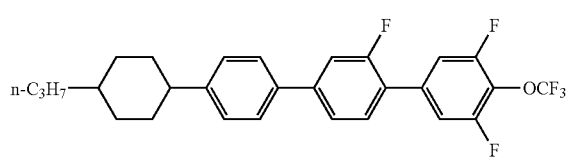

(2.2)

[Chem. 8]

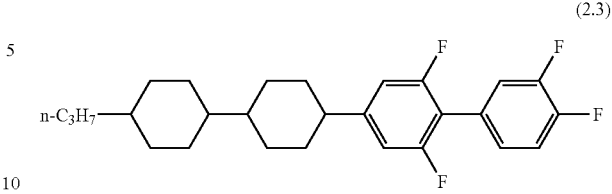

(2.3)

[Chem. 9]

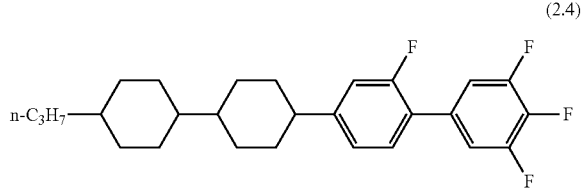

(2.4)

[Chem. 10]

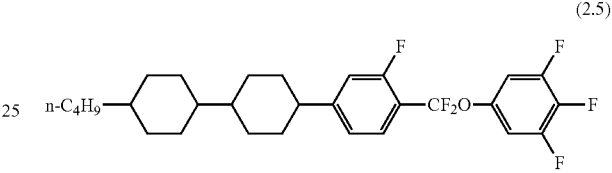

(2.5)

The compounds with which the compounds represented by formulas (2.1) to (2.5) can be combined are not particularly limited, and in consideration of solubility at a low temperature, a transition temperature, electrical reliability, and birefringence, one type to two or more types are preferably combined, and one type to three or more types are more preferably combined.

In addition, there is no particular limitation on the combination method, and any one type from the compounds represented by formulas (2.1) and (2.2) and any one type from the compounds represented by formulas (2.3) and (2.4) are preferably selected.

In the liquid crystal composition of the present invention, in consideration of solubility at a low temperature, a transition temperature, electrical reliability, and birefringence, the content of the compound represented by formula (2.1) constituting the component (A) is preferably 2% by mass or greater, preferably 4% by mass or greater, more preferably 6% by mass or greater, and further more preferably 8% by mass or greater. In addition, the maximum content ratio is preferably 20% by mass or less, more preferably 15% by mass or less, and further more preferably 12% by mass or less.

In the liquid crystal composition of the present invention, in consideration of solubility at a low temperature, a transition temperature, electrical reliability, and birefringence, the content of the compound represented by formula (2.2) constituting the component (A) is preferably 2% by mass or greater, preferably 4% by mass or greater, more preferably 6% by mass or greater, and further more preferably 8% by mass or greater. In addition, the maximum content ratio is preferably 20% by mass or less, more preferably 15% by mass or less, and further more preferably 12% by mass or less.

In the liquid crystal composition of the present invention, in consideration of solubility at a low temperature, a transition temperature, electrical reliability, and birefringence, the content of the compound represented by formula (2.3)

constituting the component (A) is preferably 1% by mass or greater, preferably 3% by mass or greater, more preferably 5% by mass or greater, and further more preferably 7% by mass or greater. In addition, the maximum content ratio is preferably 20% by mass or less, more preferably 15% by mass or less, and further more preferably 12% by mass or less.

In the liquid crystal composition of the present invention, in consideration of solubility at a low temperature, a transition temperature, electrical reliability, and birefringence, the content of the compound represented by formula (2.4) constituting the component (A) is preferably 1% by mass or greater, preferably 3% by mass or greater, more preferably 5% by mass or greater, further more preferably 7% by mass or greater, further more preferably 9% by mass or greater, further more preferably 10% by mass or greater, and further more preferably 12% by mass or greater. In addition, the maximum content ratio is preferably 22% by mass or less, more preferably 18% by mass or less, and further more preferably 15% by mass or less.

In the liquid crystal composition of the present invention, in consideration of solubility at a low temperature, a transition temperature, electrical reliability, and birefringence, the content of the compound represented by formula (2.5) constituting the component (A) is preferably 1% by mass or greater, preferably 3% by mass or greater, more preferably 5% by mass or greater, and further more preferably 8% by mass or greater. In addition, the maximum content ratio is preferably 25% by mass or less, more preferably 20% by mass or less, and further more preferably 15% by mass or less.

Furthermore, the liquid crystal composition of the present invention can contain one type or two or more types of compounds represented by general formula (5),

[Chem. 11]

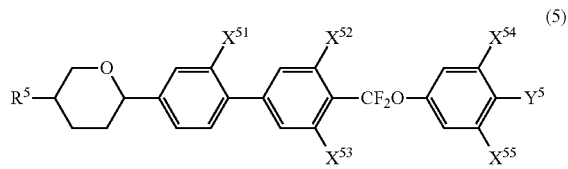

(5)

(In the formula, $R^5$ represents an alkyl group having to 5 carbon atoms, each of $X^{51}$ to $X^{55}$ independently represents a hydrogen atom or a fluorine atom, and $Y^5$ represents a fluorine atom or —$OCF_3$.) in the dielectrically positive component (A). The compounds with which the group represented by general formula (5) can be combined are not particularly limited, and in consideration of solubility at a low temperature, a transition temperature, electrical reliability, and birefringence, one type to three types are preferably combined, and one type to four or more types are more preferably combined.

The compound represented by general formula (5) preferably contains a compound selected from the compound group represented by formula (5.1) or (5.2).

[Chem. 12]

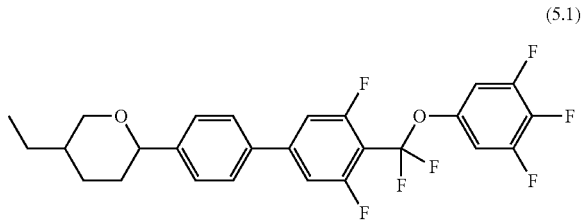

(5.1)

[Chem. 13]

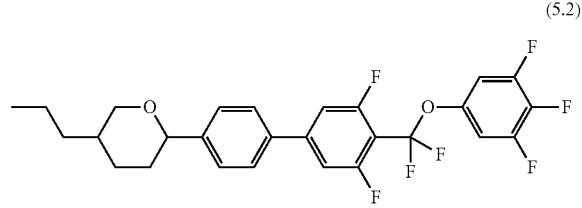

(5.2)

The component (A) may contain only one type of these compounds or may contain two types, and is preferably suitably combined depending on the required transition temperature ($T_{ni}$) or size of the dielectric anisotropy and performance such as solubility at a low temperature, electrical reliability, and birefringence. The content of the compound represented by formula (5.1) or (5.2) is preferably 2% by mass or greater, more preferably 4% by mass or greater, further more preferably 6% by mass or greater, further more preferably 8% by mass or greater, further more preferably 10% by mass or greater, further more preferably 12% by mass or greater, further more preferably 15% by mass or greater, and particularly preferably 17% by mass or greater with respect to the total amount of the liquid crystal composition of the present invention. In addition, the maximum content ratio is preferably 25% by mass or less, and more preferably 20% by mass or less. The liquid crystal composition of the present invention can contain one type or two or more types of compounds represented by general formula (6),

[Chem. 14]

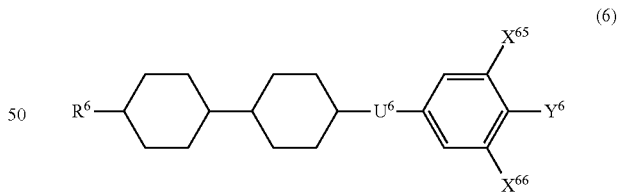

(6)

(In the formula, $R^6$ represents an alkyl group having 2 to 5 carbon atoms, each of $X^{65}$ and $X^{66}$ independently represents a hydrogen atom or a fluorine atom, $Y^6$ represents a fluorine atom or —$OCF_3$, and $U^6$ represents a single bond or —$CF_2O$—.) in the dielectrically positive component (A). The types of compounds capable of being combined are not limited, and in consideration of solubility at a low temperature, a transition temperature, electrical reliability, and birefringence, one type to three types are preferably combined, one type to four types are more preferably combined, one type to five types are more preferably combined, and one type to six or more types are further more preferably combined.

The compound represented by general formula (6) is preferably a compound selected from the group represented by formulas (6.1) to (6.6).

[Chem. 15]

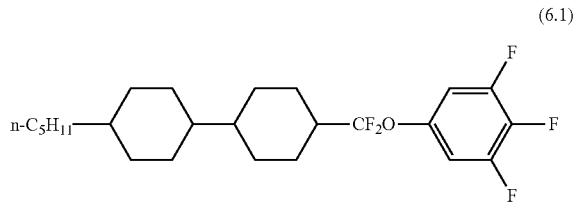

(6.1)

[Chem. 16]

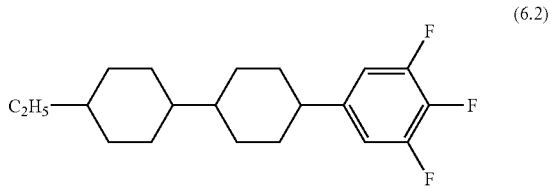

(6.2)

[Chem. 17]

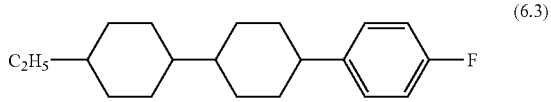

(6.3)

[Chem. 18]

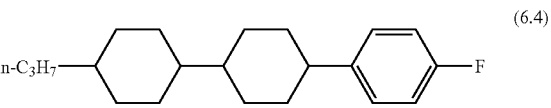

(6.4)

[Chem. 19]

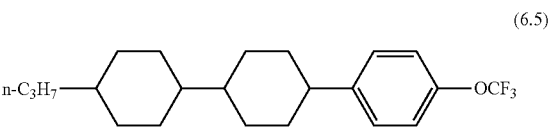

(6.5)

[Chem. 20]

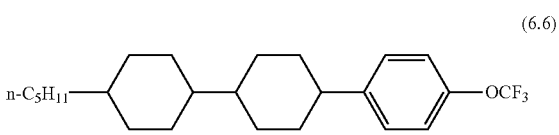

(6.6)

The compounds with which the compound group represented by formulas (6.1) to (6.6) can be combined are not particularly limited, and in consideration of solubility at a low temperature, a transition temperature, electrical reliability, and birefringence, one type to two or more types are preferably combined, one type to three types are more preferably combined, one type to four types are more preferably combined, one type to five types are more preferably combined, and one type to six or more types are further more preferably combined.

In the liquid crystal composition of the present invention, in consideration of solubility at a low temperature, a transition temperature, electrical reliability, and birefringence, the content of the compound represented by formula (6.1) constituting the component (A) is preferably 2.5% by mass or greater, preferably 6% by mass or greater, more preferably 8% by mass or greater, and further more preferably 10% by mass or greater. In addition, the maximum content ratio is preferably 25% by mass or less, more preferably 20% by mass or less, and further more preferably 15% by mass or less.

In the liquid crystal composition of the present invention, in consideration of solubility at a low temperature, a transition temperature, electrical reliability, and birefringence, the content of the compound represented by formula (6.2) constituting the component (A) is preferably 5.5% by mass or greater, preferably 8% by mass or greater, more preferably 10% by mass or greater, and further more preferably 12% by mass or greater. In addition, the maximum content ratio is preferably 25% by mass or less, more preferably 21% by mass or less, and further more preferably 16% by mass or less.

In the liquid crystal composition of the present invention, in consideration of solubility at a low temperature, a transition temperature, electrical reliability, and birefringence, the content of the compound represented by formula (6.3) constituting the component (A) is preferably 1% by mass or greater, preferably 2% by mass or greater, more preferably 3% by mass or greater, and further more preferably 5% by mass or greater. In addition, the maximum content ratio is preferably 25% by mass or less, more preferably 20% by mass or less, and further more preferably 15% by mass or less.

In the liquid crystal composition of the present invention, in consideration of solubility at a low temperature, a transition temperature, electrical reliability, and birefringence, the content of the compound represented by formula (6.4) constituting the component (A) is preferably 2.5% by mass or greater, preferably 8% by mass or greater, more preferably 10% by mass or greater, and further more preferably 12% by mass or greater. In addition, the maximum content ratio is preferably 25% by mass or less, more preferably 20% by mass or less, and further more preferably 15% by mass or less.

In the liquid crystal composition of the present invention, in consideration of solubility at a low temperature, a transition temperature, electrical reliability, and birefringence, the content of the compound represented by formula (6.5) constituting the component (A) is preferably 8.5% by mass or greater, preferably 10% by mass or greater, more preferably 12% by mass, further more preferably 14% by mass or greater, and further more preferably 16% by mass or greater. In addition, the maximum content ratio is preferably 30% by mass or less, more preferably 25% by mass or less, and further more preferably 20% by mass or less.

In the liquid crystal composition of the present invention, in consideration of solubility at a low temperature, a transition temperature, electrical reliability, and birefringence, the content of the compound represented by formula (6.6) constituting the component (A) is preferably 1% by mass or greater, preferably 3% by mass or greater, more preferably 5% by mass or greater, further more preferably 8% by mass or greater, and further more preferably 12% by mass or greater. In addition, the maximum content ratio is preferably 35% by mass or less, more preferably 20% by mass or less, and further more preferably 15% by mass or less.

In addition, the liquid crystal composition of the present invention can also contain a compound selected from the compound group represented by formulas (7.1), (7.3), and (7.4) among the compounds represented by general formula (6) in the dielectrically positive component (A).

[Chem. 21]

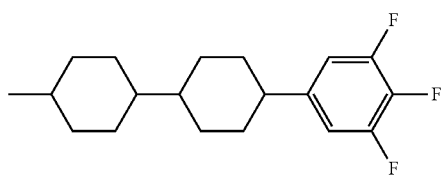
(7.1)

[Chem. 22]

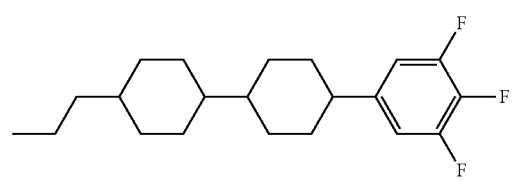
(7.3)

[Chem. 23]

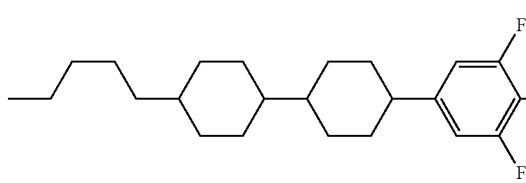
(7.4)

The types of compounds capable of being combined are not particularly limited, and one type or two types of these compounds are preferably contained, and one type to three types of these compounds are more preferably contained. These compounds are different in only a molecular weight according to a terminal alkyl group structure, and since viscosity and $T_{ni}$ change depending on the molecular weight, adjustment of the content is suitably performed. Furthermore, in consideration of solubility at a low temperature, electrical reliability, and birefringence, the content is desirably adjusted. The content of these compounds is preferably 2% by mass or greater, more preferably 4% by mass or greater, further more preferably 9% by mass or greater, further more preferably 13% by mass or greater, further more preferably 19% by mass or greater, and particularly preferably 25% by mass or greater with respect to the total amount of the liquid crystal composition of the present invention. In addition, the maximum content ratio is preferably 55% by mass or less, more preferably 45% by mass or less, and further more preferably 35% by mass or less.

In addition, the liquid crystal composition of the present invention can also contain a compound selected from the compound group represented by formulas (11.1) and (11.2) among the compounds represented by general formula (6) in the dielectrically positive component (A).

[Chem. 24]

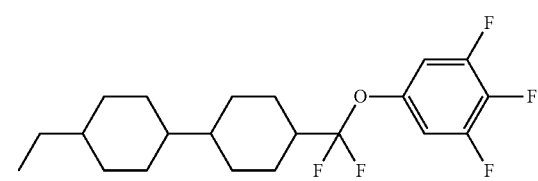
(11.1)

[Chem. 25]

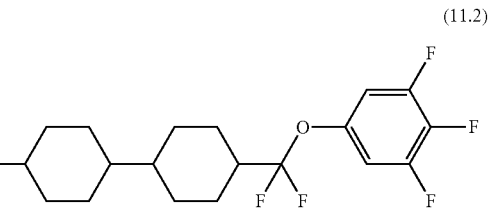
(11.2)

The types of compounds capable of being combined are not particularly limited, and in consideration of solubility at a low temperature, a transition temperature, electrical reliability, and birefringence, one type or two types of these compounds are preferably contained. Since these compounds are useful for obtaining a liquid crystal composition having comparatively large dielectric anisotropy (Δ∈) and low viscosity, in consideration of the required dielectric anisotropy, these compounds may preferably be used in suitable combination. The content of the compound represented by formula (11.1) or (11.2) is preferably 1% by mass or greater, more preferably 5% by mass or greater, more preferably 7% by mass or greater, more preferably 9% by mass or greater, more preferably 13% by mass or greater, more preferably 15% by mass or greater, further more preferably 17% by mass or greater, and particularly preferably 20% by mass or greater with respect to the total amount of the liquid crystal composition of the present invention. In addition, the maximum content ratio is preferably 45% by mass or less, more preferably 35% by mass or less, and further more preferably 30% by mass or less.

The liquid crystal composition of the present invention can contain one type or two or more types of compounds represented by general formula (8) in the dielectrically positive component (A).

[Chem. 26]

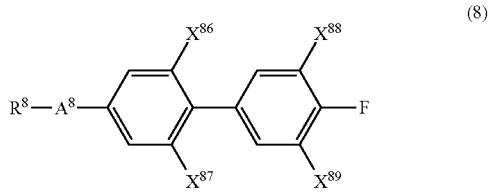
(8)

(In the formula, $R^8$ represents an alkyl group having 2 to 5 carbon atoms, $A^8$ represents a 1,4-phenylene group or a 1,4-cyclohexylene group, and each of $X^{86}$ to $X^{89}$ independently represents a hydrogen atom or a fluorine atom.) The types of compounds capable of being combined are not particularly limited, and one type to three types of these compounds are preferably contained, and one type to four or more types preferably contained.

The liquid crystal composition of the present invention preferably contains the compound represented by formula (8.1) or (8.2) among the compounds represented by general formula (8) in the dielectrically positive component (A).

[Chem. 27]

(8.1)

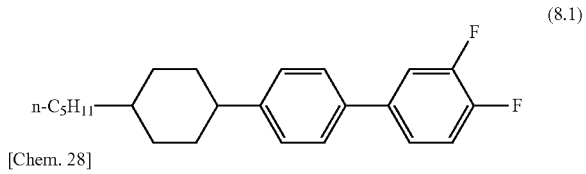

[Chem. 28]

(8.2)

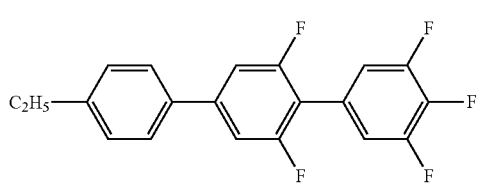

The component (A) may contain only one type of these compounds or may contain two types, and is preferably suitably combined depending on the required performance such as solubility at a low temperature, a transition temperature, electrical reliability, and birefringence. The content of the compound represented by formula (8.1) is preferably 3% by mass or greater, more preferably 5% by mass or greater, more preferably 7% by mass or greater, and more preferably 10% by mass or greater with respect to the total amount of the liquid crystal composition of the present invention. In addition, the maximum content ratio is preferably 25% by mass or less, more preferably 20% by mass or less, and further more preferably 15% by mass or less. The content of the compound represented by formula (8.2) is preferably 5% by mass or greater, more preferably 7% by mass or greater, more preferably 9% by mass or greater, and more preferably 12% by mass or greater with respect to the total amount of the liquid crystal composition of the present invention. In addition, the maximum content ratio is preferably 25% by mass or less, more preferably 20% by mass or less, and further more preferably 15% by mass or less.

In addition, the liquid crystal composition of the present invention can contain one type or two or more types of compounds selected from the group represented by general formula (12) in the dielectrically positive component (A).

[Chem. 29]

(12)

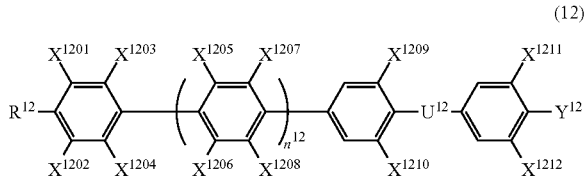

($R^{12}$ represents an alkyl group having 2 to 5 carbon atoms, each of $X^{1201}$ to $X^{1212}$ independently represents a fluorine atom or a hydrogen atom, $Y^{12}$ represents a fluorine atom or —$OCF_3$, $U^{12}$ represents a single bond or —$CF_2O$—, and n is 0 or 1.) The types of compounds capable of being combined are not particularly limited, and one type to three types of these compounds are preferably contained, one type to four types are more preferably contained, and one type to five or more types are particularly preferably contained.

The liquid crystal composition of the present invention preferably contains a compound selected from the compound group represented by formulas (12.1) to (12.4) among the compounds represented by general formula (12) in the dielectrically positive component (A).

[Chem. 30]

(12.1)

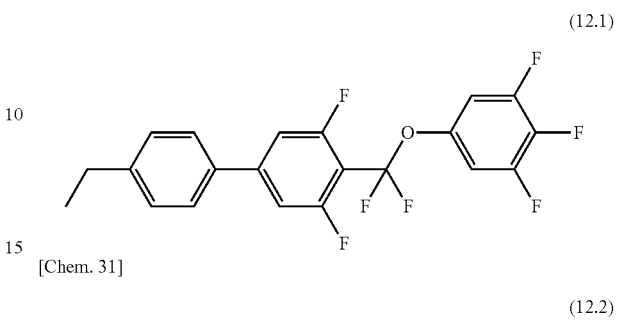

[Chem. 31]

(12.2)

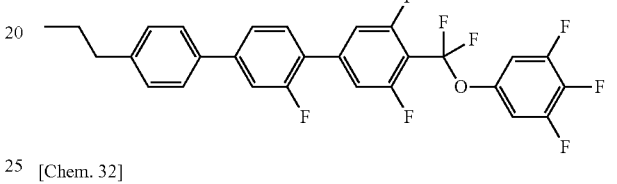

[Chem. 32]

(12.3)

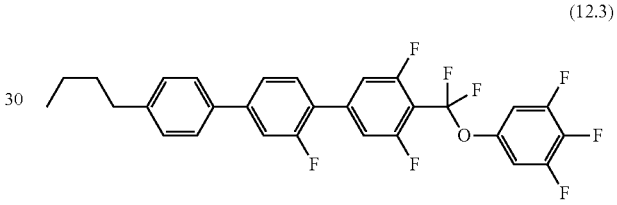

[Chem. 33]

(12.4)

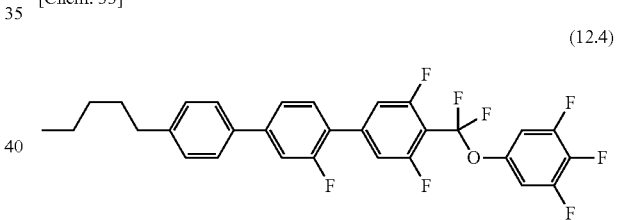

The component (A) may contain only one type of these compounds or may contain two types, and is preferably suitably combined depending on the required performance such as solubility at a low temperature, a transition temperature, electrical reliability, and birefringence. The types of compounds capable of being combined are not particularly limited, and one type or two types of these compounds are preferably contained, one type to three types are more preferably contained, and one type to four types are further more preferably contained. Since these compounds are useful for obtaining a liquid crystal composition having comparatively large dielectric anisotropy ($\Delta\varepsilon$) and low viscosity, in consideration of the required a transition temperature ($T_{ni}$), these compounds may preferably be used in suitable combination.

For example, the component (A) preferably contains the compound represented by formula (12.1) in a content of 1% by mass or greater, more preferably 3% by mass or greater, more preferably 5% by mass or greater, and particularly preferably 10% by mass or greater with respect to the total amount of the liquid crystal composition of the present invention. In addition, the maximum content ratio is preferably 40% by mass or less, more preferably 30% by mass or less, and further more preferably 20% by mass or less.

In addition, the component (A) preferably contains the compound represented by formula (12.2) in a content of 1% by mass or greater, more preferably 3% by mass or greater, more preferably 5% by mass or greater, and particularly preferably 10% by mass or greater with respect to the total amount of the liquid crystal composition of the present invention. In addition, the maximum content ratio is preferably 25% by mass or less, more preferably 20% by mass or less, and further more preferably 15% by mass or less.

Furthermore, the component (A) preferably contains the compound represented by formula (12.3) in a content of 2% by mass or greater, more preferably 4% by mass or greater, more preferably 6% by mass or greater, more preferably 8% by mass or greater, and particularly preferably 10% by mass or greater with respect to the total amount of the liquid crystal composition of the present invention. In addition, the maximum content ratio is preferably 25% by mass or less, more preferably 20% by mass or less, and further more preferably 15% by mass or less.

In addition, the component (A) preferably contains the compound represented by formula (12.4) in a content of 1% by mass or greater, more preferably 5% by mass or greater, more preferably 7% by mass or greater, more preferably 9% by mass or greater, and particularly preferably 12% by mass or greater with respect to the total amount of the liquid crystal composition of the present invention. In addition, the maximum content ratio is preferably 25% by mass or less, more preferably 20% by mass or less, and further more preferably 15% by mass or less.

In addition, the liquid crystal composition of the present invention can also contain a compound selected from the compound group represented by formulae (14.1), and (14.3) to (14.5) among the compound group represented by general formula (12) in the dielectrically positive component (A).

[Chem. 34]

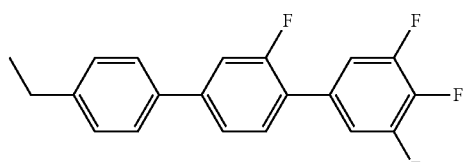

(14.1)

[Chem. 35]

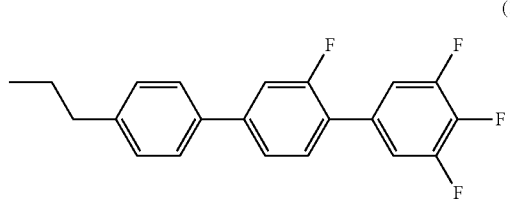

(14.3)

[Chem. 36]

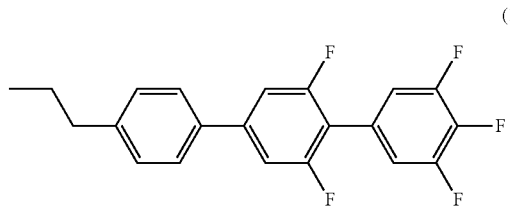

(14.4)

[Chem. 37]

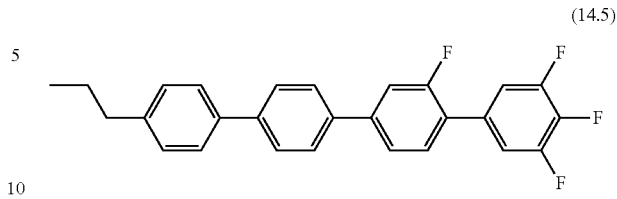

(14.5)

The types of compounds capable of being combined are not particularly limited, and in consideration of solubility, low-temperature storage stability, and $T_{ni}$, one type or two types of these compounds are preferably contained, one type to three types are more preferably contained, and one type to four types are further more preferably contained. In addition, the maximum content ratio is preferably 25% by mass or less, more preferably 20% by mass or less, and further more preferably 15% by mass or less.

The component (A) preferably contains the compound represented by formula (14.1) in a content of 3% by mass or greater, more preferably 5% by mass or greater, more preferably 7% by mass or greater, and particularly preferably 10% by mass or greater with respect to the total amount of the liquid crystal composition of the present invention. In addition, the maximum content ratio is preferably 25% by mass or less, more preferably 20% by mass or less, and further more preferably 15% by mass or less.

The component (A) preferably contains the compound represented by formula (14.3) in a content of 5% by mass or greater, more preferably 7% by mass or greater, more preferably 9% by mass or greater, and particularly preferably 11% by mass or greater with respect to the total amount of the liquid crystal composition of the present invention. In addition, the maximum content ratio is preferably 20% by mass or less, more preferably 17% by mass or less, and further more preferably 14% by mass or less.

The component (A) preferably contains a compound selected from the group consisting of the compound represented by formula (14.4) or (14.5) in a content of 2% by mass or greater, more preferably 6% by mass or greater, and particularly preferably 10% by mass or greater with respect to the total amount of the liquid crystal composition of the present invention. In addition, the maximum content ratio is preferably 20% by mass or less, more preferably 16% by mass or less, and further more preferably 12% by mass or less.

In addition, the liquid crystal composition of the present invention can also contain the compound represented by general formula (19) in the dielectrically positive component (A).

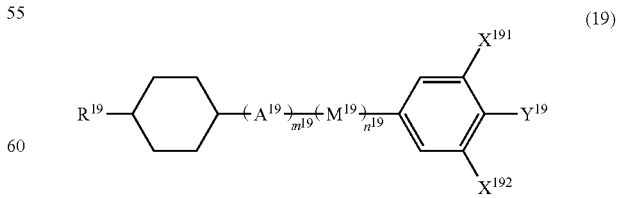

(19)

($R^{19}$ represents an alkyl group or an alkenyl group having 2 to 5 carbon atoms, each of $X^{191}$ and $X^{192}$ independently represents a fluorine atom or a hydrogen atom, $Y^{19}$ represents a fluorine atom, a chlorine atom, or —$OCF_3$, each of $A^{19}$ and $M^{19}$ independently represents a 1,4-cyclohexylene group, a 1,4-phenylene group, a 2,5-difluoro-1,4-phenylene group, or a 2-fluoro-1,4-phenylene group, and $m^{19}$ and $n^{19}$ represent 0 or 1.) The component (A) may contain only one type of these compounds or may contain two or more types, and is preferably suitably combined depending on the required performance such as solubility at a low temperature, a transition temperature, electrical reliability, and birefringence. The types of compounds capable of being combined are not particularly limited, and one type to three types of these compounds are preferably contained, one type to four types are more preferably contained, one type to five types are more preferably contained, one type to six types are more preferably contained, one type to seven types are more preferably contained, and one type to eight or more types are further more preferably contained.

In addition, the liquid crystal composition of the present invention can also contain one type or two or more types of compounds selected from the compound group represented by formulas (19.1) to (19.6) among the compounds represented by general formula (19) in the dielectrically positive component (A).

[Chem. 38]

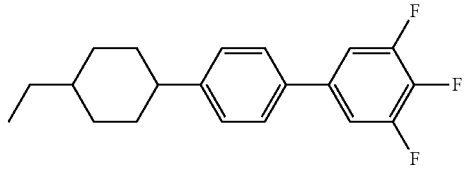
(19.1)

[Chem. 39]

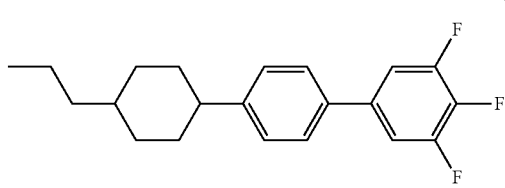
(19.2)

[Chem. 40]

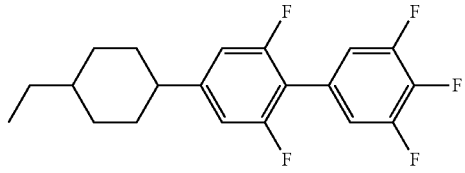
(19.3)

[Chem. 41]

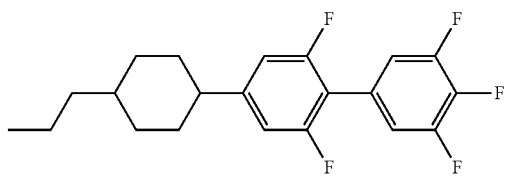
(19.4)

[Chem. 42]

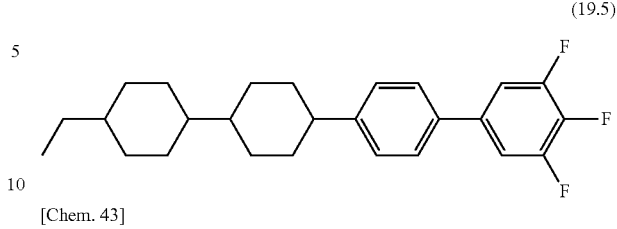
(19.5)

[Chem. 43]

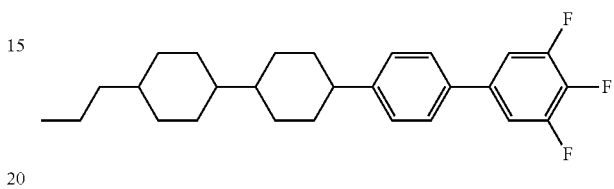
(19.6)

The types of compounds capable of being combined are not particularly limited, and one type to three types of these compounds are preferably contained, one type to four types are more preferably contained, one type to five types are more preferably contained, and one type to six types are particularly preferably contained depending on the required performance such as solubility at a low temperature, a transition temperature, electrical reliability, and birefringence.

Furthermore, the component (A) preferably contains the compound represented by formula (19.2) in a content of 7% by mass or greater, more preferably 9% by mass or greater, and particularly preferably 11% by mass or greater with respect to the total amount of the liquid crystal composition of the present invention. In addition, the maximum content ratio is preferably 20% by mass or less, more preferably 16% by mass or less, and further more preferably 13% by mass or less.

Furthermore, the component (A) preferably contains the compound represented by formula (19.5) in a content of 2% by mass or greater, more preferably 4% by mass or greater, and particularly preferably 6% by mass or greater with respect to the total amount of the liquid crystal composition of the present invention. In addition, the maximum content ratio is preferably 20% by mass or less, more preferably 16% by mass or less, and further more preferably 13% by mass or less.

Furthermore, the component (A) preferably contains the compound represented by formula (19.6) in a content of 3% by mass or greater, more preferably 5% by mass or greater, and particularly preferably 7% by mass or greater with respect to the total amount of the liquid crystal composition of the present invention. In addition, the maximum content ratio is preferably 20% by mass or less, more preferably 16% by mass or less, and further more preferably 13% by mass or less.

In addition, the component (A) preferably contains the compound represented by formulas (19.1), (19.3), and (19.4) in a content of 4.5% by mass or greater, more preferably 5.5% by mass or greater, and particularly preferably 8% by mass or greater with respect to the total amount of the liquid crystal composition of the present invention. In addition, the maximum content ratio is preferably 20% by mass or less, and more preferably 16% by mass or less.

The liquid crystal composition of the present invention can also contain one type or two or more types of compounds selected from the compound group represented by formulae (20.1), (20.3), and (20.6) to (20.8) among the compounds represented by general formula (19) in the dielectrically positive component (A).

[Chem. 44]

[Chem. 45]

[Chem. 46]

[Chem. 47]

[Chem. 48]

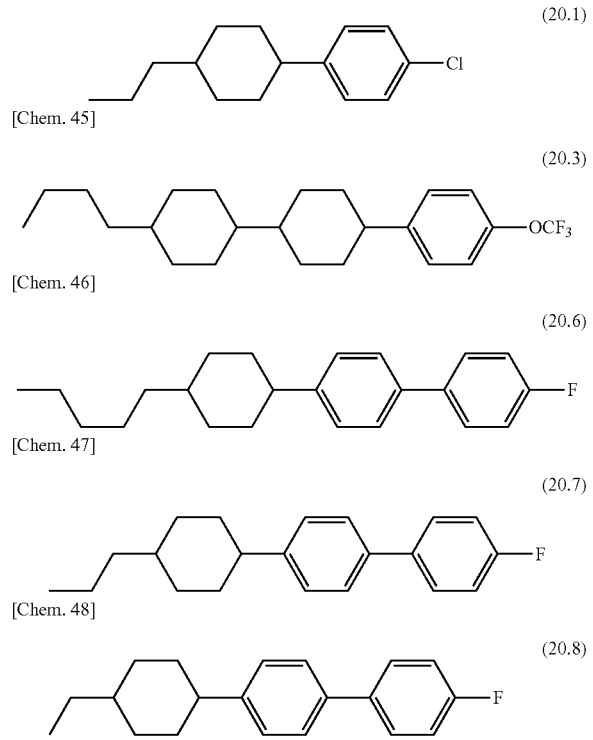

The types of compounds capable of being combined are not particularly limited, and in consideration of viscosity and dielectric anisotropy, one type to three types of these compounds are preferably contained, and one type to four or more types are more preferably contained.

The component (A) preferably contains the compound represented by formula (20.1) in a content of 1% by mass or greater, more preferably 3% by mass or greater, and further more preferably 5% by mass or greater with respect to the total amount of the liquid crystal composition of the present invention. In addition, the maximum content ratio is preferably 20% by mass or less, more preferably 16% by mass or less, and further more preferably 12% by mass or less.

In addition, the component (A) preferably contains the compound represented by formulas (20.3), (2.7), and (2.8) in a content of 0.5% by mass or greater, more preferably 3% by mass or greater, further more preferably 5% by mass or greater, and particularly preferably 8% by mass or greater with respect to the total amount of the liquid crystal composition of the present invention. In addition, the maximum content ratio is preferably 20% by mass or less, more preferably 16% by mass or less, and further more preferably 12% by mass or less.

Furthermore, in consideration of $T_{ni}$, it is preferable that the content of the compound represented by formula (20.6) be 0.5% by mass or greater and 4.5% by mass or less with respect to the total amount of the liquid crystal composition of the present invention since viscosity is low, and liquid crystal dropping stability is improved.

In addition, the liquid crystal composition of the present invention can also contain one type or two types of compounds selected from the compound group represented by formula (18.1) or (18.2) among the compounds represented by general formula (19) in the dielectrically positive component (A).

[Chem. 49]

[Chem. 50]

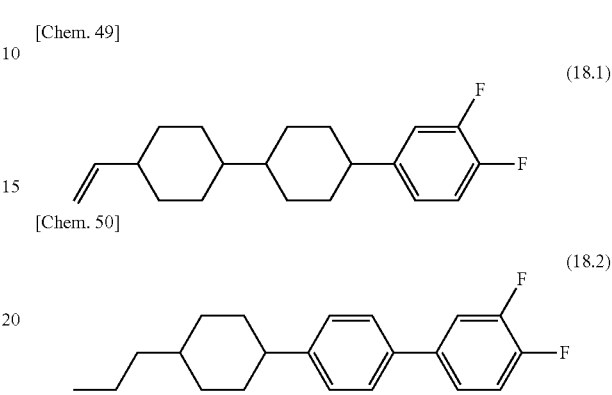

The types of compounds capable of being combined are not particularly limited, and one type or two types of these compounds are more preferably contained depending on the required performance such as solubility at a low temperature, a transition temperature, electrical reliability, and birefringence. In addition, the component (A) preferably contains the compound represented by formula (18.1) or (18.2) in a content of 5% by mass or greater, more preferably 7% by mass or greater, further more preferably 9% by mass or greater, and particularly preferably 12% by mass or greater with respect to the total amount of the liquid crystal composition of the present invention. In addition, the maximum content ratio is preferably 25% by mass or less, more preferably 20% by mass or less, and further more preferably 15% by mass or less.

The liquid crystal composition of the present invention contains the component (B) which is a dielectrically neutral component. The component (B) is constituted with a compound of which dielectric anisotropy is greater than −2 and less than +2. The component (B) of the liquid crystal composition of the present invention contains the compound represented by formula (40).

[Chem. 51]

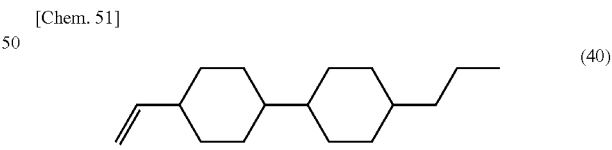

In the liquid crystal composition of the present invention, the content of the compound represented by formula (40) constituting the component (B) is preferably 15% by mass or greater, more preferably 18% by mass, more preferably 27% by mass or greater, more preferably 29% by mass or greater, more preferably 31% by mass or greater, more preferably 35% by mass or greater, more preferably 39% by mass or greater, more preferably 41% by mass or greater, more preferably 45% by mass or greater, more preferably 48% by mass or greater, and particularly preferably 50% by mass or greater with respect to the total amount of the liquid crystal composition of the present invention. In addition, the maximum content ratio is preferably 75% by mass or less, more preferably 65% by mass or less, further more preferably 60% by mass or less, and particularly preferably 55% by mass or less.

The liquid crystal composition of the present invention can also contain one type or two or more types of compounds represented by general formula (16) in the dielectrically neutral component (B).

[Chem. 52]

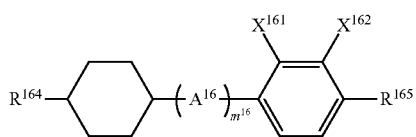
(16)

(In the formula, represents an alkyl group having 2 to 5 carbon atoms, $R^{165}$ represents an alkyl group or an alkoxy group having 1 to 5 carbon atoms, each of $X^{161}$ and $X^{162}$ independently represents a hydrogen atom or a fluorine atom, $A^{16}$ represents a 1,4-phenylene group or a 1,4-cyclohexylene group, and $m^{16}$ represents 0 or 1.) The types of compounds capable of being combined are not particularly limited, and one type to three types of these compounds are preferably contained, one type to four types are more preferably contained, and one type to five or more types are particularly preferably contained depending on the required performance such as solubility at a low temperature, a transition temperature, electrical reliability, and birefringence.

The compound represented by formula (16.4) among the compounds represented by general formula (16) is particularly preferably contained.

[Chem. 53]

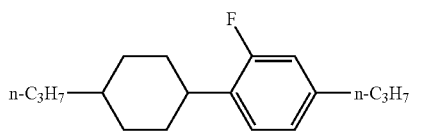
(16.4)

The content is preferably adjusted depending on the required performance such as solubility at a low temperature, a transition temperature, electrical reliability, and birefringence, and the content is preferably 1% by mass or greater, more preferably 3% by mass or greater, and further more preferably 5% by mass or greater. In addition, the maximum content ratio is preferably 20% by mass or less, more preferably 15% by mass or less, and further more preferably 10% by mass or less.

In addition, the liquid crystal composition of the present invention can also contain one type or two or more types of compounds selected from the group represented by formula (16.1) or (16.3) among the compounds represented by general formula (16) in the dielectrically neutral component (B).

[Chem. 54]

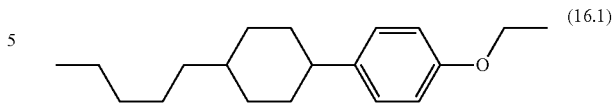
(16.1)

[Chem. 55]

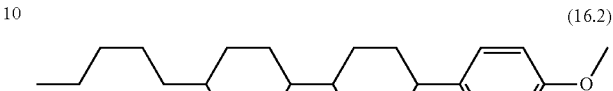
(16.2)

[Chem. 56]

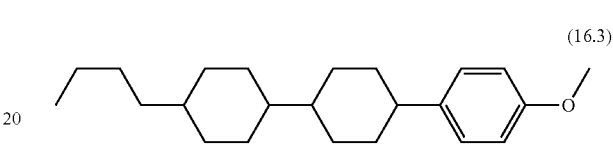
(16.3)

The types of compounds capable of being combined are not particularly limited, and one type to three types are preferably combined depending on the required performance such as solubility at a low temperature, a transition temperature, electrical reliability, and birefringence. Furthermore, in consideration of the required solubility, the content thereof is preferably 3% by mass or greater, more preferably 6% by mass or greater, and particularly preferably 10% by mass or greater with respect to the total amount of the liquid crystal composition of the present invention. In addition, the maximum content ratio is preferably 25% by mass or less, more preferably 20% by mass or less, and further more preferably 15% by mass or less.

In addition, the liquid crystal composition of the present invention can contain the compound represented by formula (13.1) among the compounds represented by general formula (16) in the dielectrically neutral component (B).

[Chem. 57]

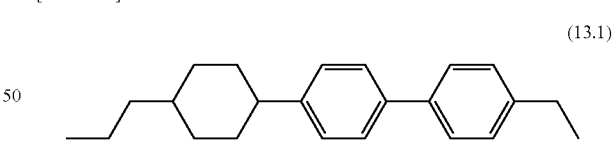
(13.1)

The content is preferably adjusted depending on the required performance such as solubility at a low temperature, a transition temperature, electrical reliability, and birefringence, and the content is preferably 4% by mass or greater, more preferably 6% by mass or greater, and further more preferably 10% by mass or greater. In addition, the maximum content ratio is preferably 23% by mass or less, more preferably 18% by mass or less, and further more preferably 13% by mass or less.

The liquid crystal composition of the present invention may also contain one type or two or more types of compounds represented by general formula (3) in the dielectrically neutral component (B).

[Chem. 58]

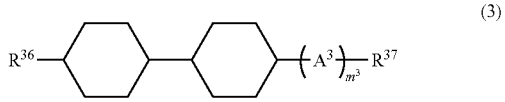

(3)

($R^{36}$ represents an alkenyl group having 2 to 5 carbon atoms, $R^{37}$ represents an alkyl group having 1 to 5 carbon atoms, $A^3$ represents a 1,4-cyclohexylene group or a 1,4-phenylene group, and $m^3$ represents 0 or 1.) The types of compounds capable of being combined are not particularly limited, and one type to three types of these compounds are preferably contained, one type to four types are more preferably contained, and one type to five or more types are particularly preferably contained depending on the required performance such as solubility at a low temperature, a transition temperature, electrical reliability, and birefringence.

The compound represented by formulas (3.1) to (3.3),

[Chem. 59]

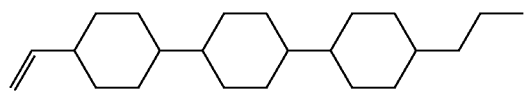

(3.1)

[Chem. 60]

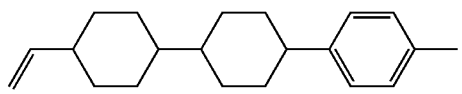

(3.2)

[Chem. 61]

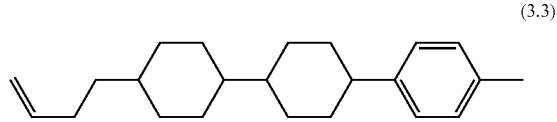

(3.3)

among the compounds represented by general formulas (3) is preferably contained.

The component (B) may contain the compound represented by formula (3.2), the compound represented by formula (3.3), both the compound represented by formula (3.2) and the compound represented by formula (3.3), and all the compounds represented by formulas (3.1) to (3.3) depending on the required performance such as solubility at a low temperature, a transition temperature, electrical reliability, and birefringence. The content of the compound represented by formula (3.1) or (3.2) constituting the component (B) is preferably 3% by mass, more preferably 5% by mass or greater, more preferably 7% by mass or greater, more preferably 9% by mass or greater, more preferably 11% by mass or greater, more preferably 14% by mass or greater, further more preferably 16% by mass or greater, further more preferably 18% by mass or greater, and particularly preferably 21% by mass or greater with respect to the total amount of the liquid crystal composition of the present invention. In addition, the maximum content ratio is preferably 40% by mass or less, more preferably 30% by mass or less, and further more preferably 25% by mass or less. In addition, the content of the compound represented by formula (3.3) constituting the component (B) is preferably 3% by mass, more preferably 5% by mass or greater, further more preferably 8% by mass or greater, further more preferably 10% by mass or greater, further more preferably 12% by mass or greater, further more preferably 15% by mass or greater, further more preferably 17% by mass or greater, and particularly preferably 19% by mass or greater with respect to the total amount of the liquid crystal composition of the present invention. In addition, the maximum content ratio is preferably 40% by mass or less, more preferably 30% by mass or less, and further more preferably 25% by mass or less. In a case where the component (B) contains both the compound represented by formula (3.2) and the compound represented by formula (3.3), the total of both the compounds is preferably 15% by mass or greater, more preferably 19% by mass or greater, further more preferably 26% by mass or greater, and particularly preferably 30% by mass or greater with respect to the total amount of the liquid crystal composition of the present invention. In addition, the maximum content ratio is preferably 45% by mass or less, more preferably 40% by mass or less, and further more preferably 35% by mass or less.

In addition, the liquid crystal composition of the present invention can also contain a compound selected from the compound group represented by formulas (4.2) to (4.4) among the compounds represented by general formula (3) in the dielectrically neutral component (B).

[Chem. 62]

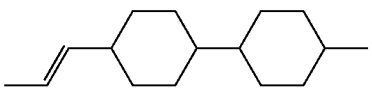

(4.2)

[Chem. 63]

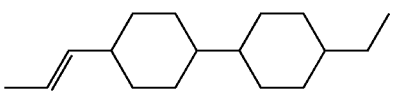

(4.3)

[Chem. 64]

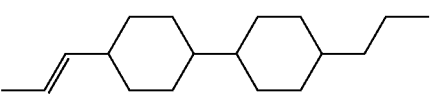

(4.4)

The component (B) may contain only one type of these compounds or may contain two or more types, and is preferably suitably combined depending on the required performance. The types of compounds capable of being combined are not particularly limited, and one type or two types of these compounds are preferably contained, one type to three types are particularly preferably contained, and the content is preferably 2% by mass or greater, more preferably 4% by mass or greater, more preferably 6% by mass or greater, more preferably 8% by mass or greater, more preferably 10% by mass or greater, more preferably 12% by mass or greater, further more preferably 14% by mass or greater, further more preferably 16% by mass or greater, and particularly preferably 20% by mass or greater with respect to the total amount of the liquid crystal composition of the present invention depending on the required performance such as solubility at a low temperature, a transition temperature, electrical reliability, and birefringence. In addition, the maximum content ratio is preferably 45% by mass or less, more preferably 35% by mass or less, and further more preferably 25% by mass or less.

In addition, the liquid crystal composition of the present invention can also contain a compound selected from the compound group represented by formula (21.1) or (21.2) among the compounds represented by general formula (3) in the dielectrically neutral component (B).

[Chem. 65]

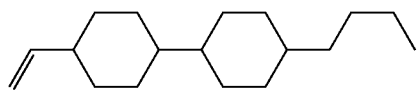
(21.1)

[Chem. 66]

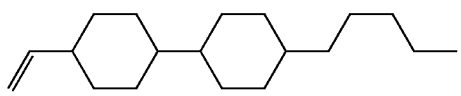 [SMILES: C=CC1CCC(C2CCC(CCCCC)CC2)CC1]
(21.2)

The types of compounds capable of being combined are not particularly limited, and in consideration of $T_{rd}$ and solubility, the compounds are preferably used in suitable combination, and the content is preferably 2% by mass or greater, more preferably 4% by mass or greater, more preferably 6% by mass or greater, more preferably 8% by mass or greater, more preferably 10% by mass or greater, more preferably 12% by mass or greater, further more preferably 14% by mass or greater, further more preferably 16% by mass or greater, and particularly preferably 20% by mass or greater with respect to the total amount of the liquid crystal composition of the present invention. In addition, the maximum content ratio is preferably 45% by mass or less, more preferably 35% by mass or less, and further more preferably 25% by mass or less.

In addition, the liquid crystal composition of the present invention can also contain one type or two or more types of compounds represented by general formula (11) in the dielectrically neutral component (B).

[Chem. 67]

(11)

(In the formula, each of $R^{11}$ and $R^{12}$ independently represents a linear alkyl group or a linear alkenyl group having 1 to 10 carbon atoms.) The types of compounds capable of being combined are not particularly limited, and one type to three types of these compounds are preferably contained, one type to four types are more preferably contained, and one type to five or more types are particularly preferably contained depending on the required performance such as solubility at a low temperature, a transition temperature, electrical reliability, and birefringence. In addition, the maximum content ratio is preferably 35% by mass or less, more preferably 25% by mass or less, and further more preferably 15% by mass or less.

As the compound represented by formula (11), specifically, the following compounds can be suitably used.

[Chem. 68]

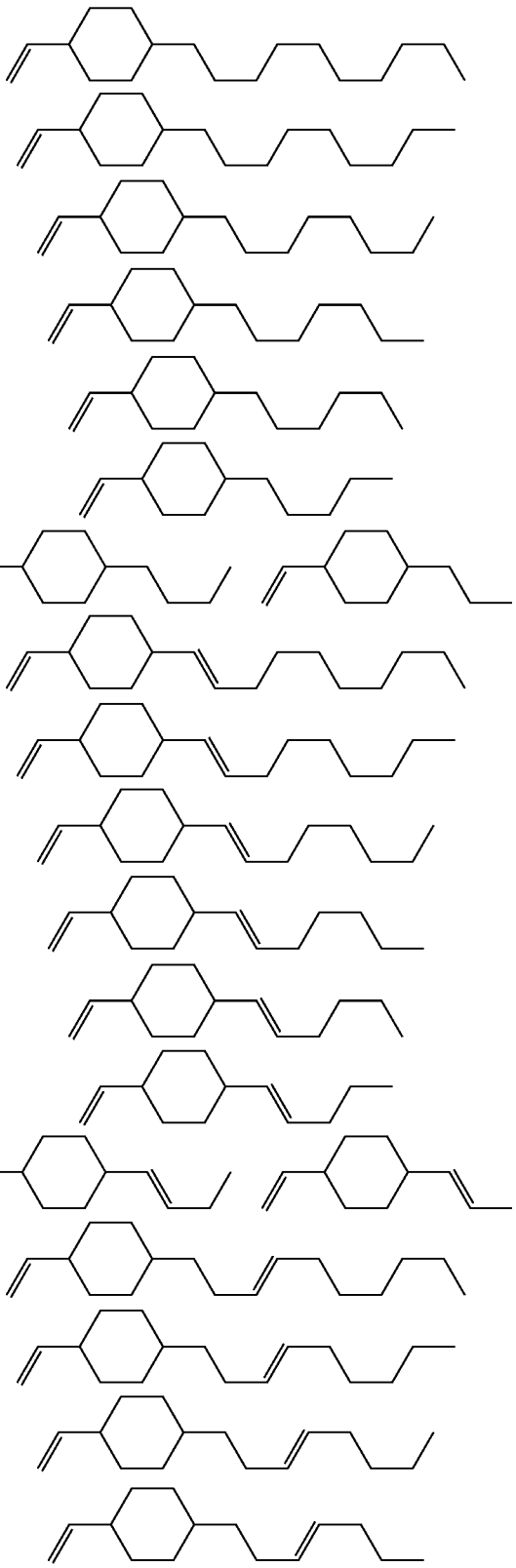

-continued
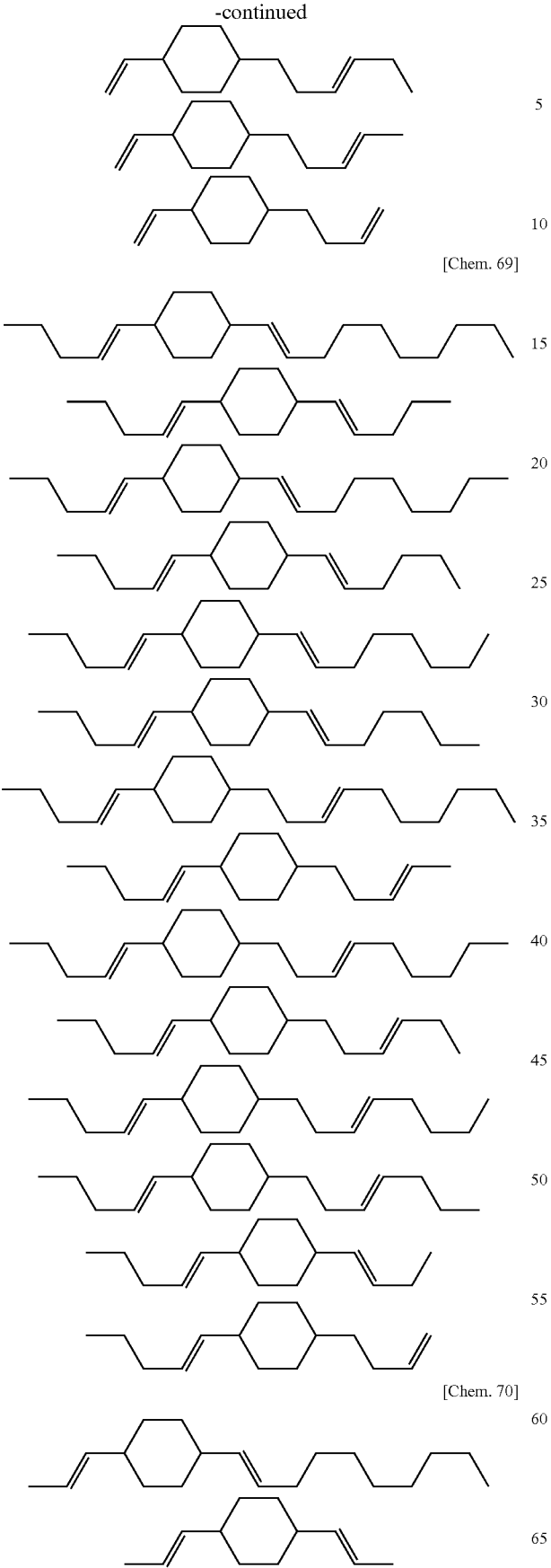
[Chem. 69]
[Chem. 70]
-continued
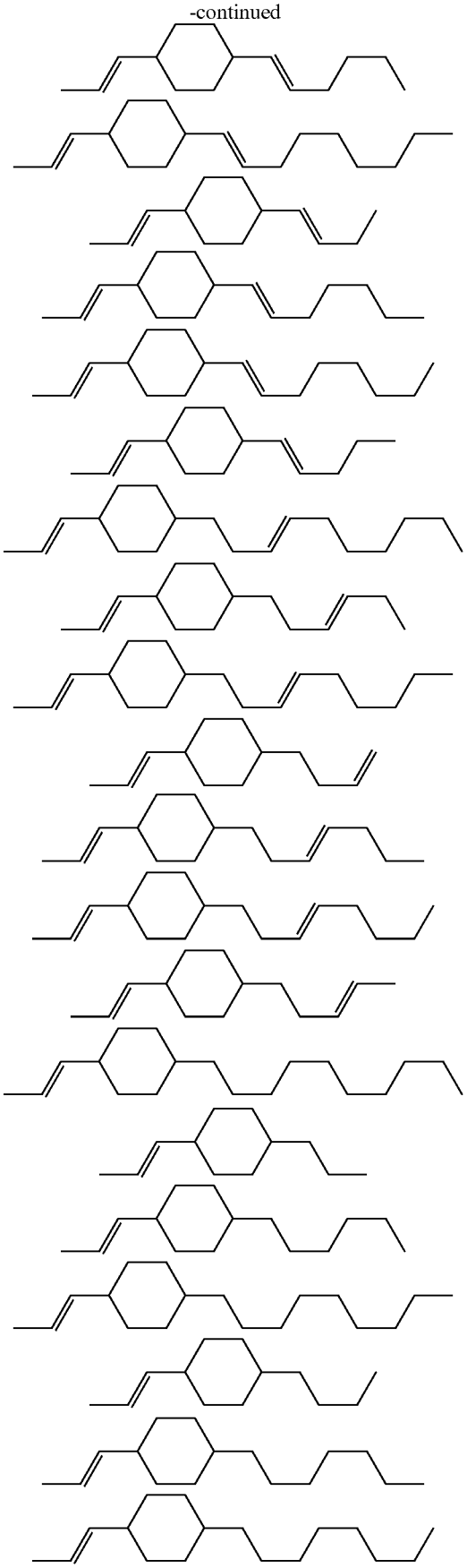

-continued

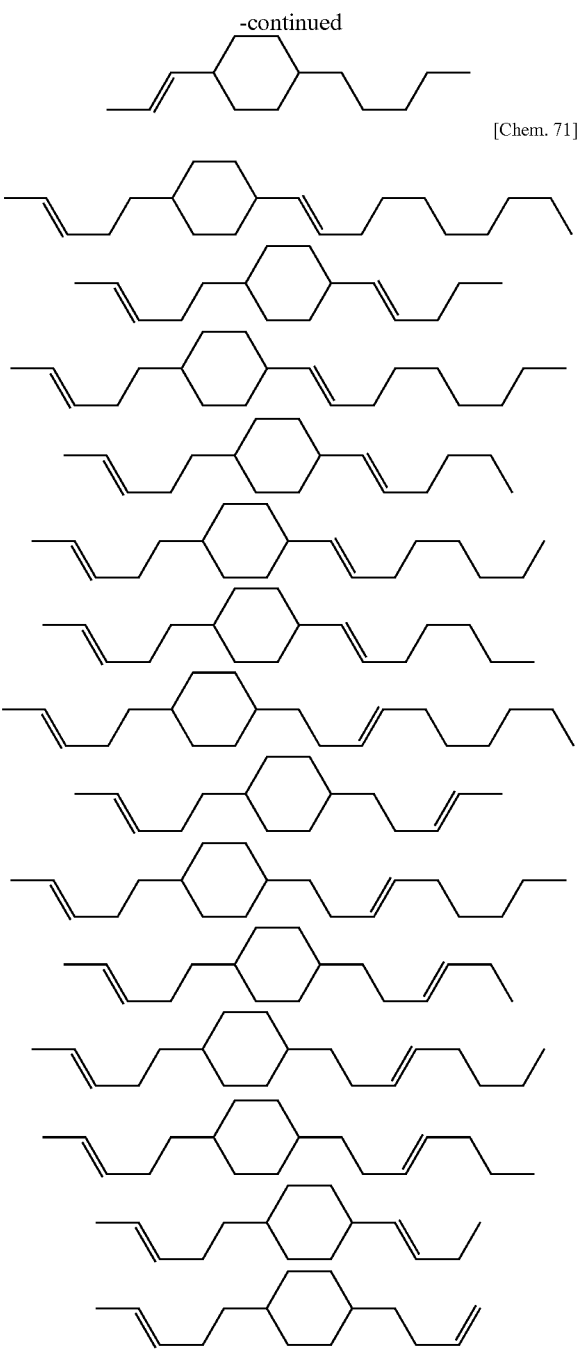

In addition, the liquid crystal composition of the present invention can contain one type or two or more types of compounds selected from the group represented by general formula (9) in the dielectrically neutral component (B).

[Chem. 72]

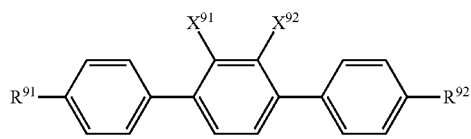

(9)

(In the formula, each of $R^{91}$ and $R^{92}$ independently represents an alkyl group having 2 to 5 carbon atoms or an alkenyl group having 2 to 5 carbon atoms, and each of $X^{91}$ and $X^{92}$ independently represents a hydrogen atom or a fluorine atom.) The types of compounds capable of being combined are not particularly limited, and one type to three types of these compounds are preferably contained, one type to four types are more preferably contained, one type to five types are further more preferably contained, and one type to six or more types are particularly preferably contained depending on the required performance such as solubility at a low temperature, a transition temperature, electrical reliability, and birefringence.

One type or two or more types of compounds selected from the compound group represented by formulas (9.1) to (9.3), (10.7) and (10.8) among the compounds represented by general formula (9) are preferably contained.

[Chem. 73]

(9.1)

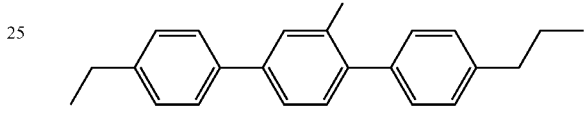

[Chem. 74]

(9.2)

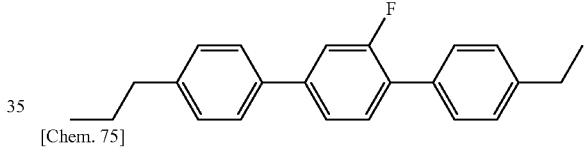

[Chem. 75]

(9.3)

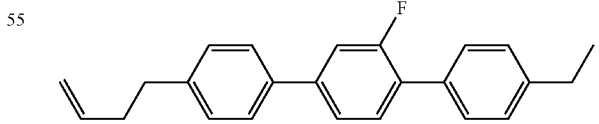

[Chem. 76]

(10.7)

[Chem. 77]

(10.8)

The component (B) may contain only one type of these compounds or may contain two or more types, and is preferably suitably combined depending on the required performance such as solubility at a low temperature, a transition temperature, electrical reliability, and birefringence. The types of compounds capable of being combined are not particularly limited, and one type to three types are preferably contained, and one type to four or more types are more preferably contained. The content of the compound represented by formula (9.1) or (9.2) is preferably 11% by mass or greater, more preferably 13% by mass or greater, and further more preferably 15% by mass or greater with respect to the total amount of the liquid crystal composition of the present invention. In addition, the maximum content ratio is preferably 35% by mass or less, more preferably 25% by mass or less, and further more preferably 20% by mass or less. In addition, the content of the compound represented by formula (10.7) or (10.8) is preferably 0.5% by mass or greater, and more preferably 2% by mass or greater. In addition, the maximum content ratio is preferably 25% by mass or less, more preferably 15% by mass or less, and further more preferably 10% by mass or less. Furthermore, the content of the compound represented by formula (9.3) is preferably 5% by mass or greater, more preferably 7% by mass or greater, and further more preferably 9% by mass or greater with respect to the total amount of the liquid crystal composition of the present invention. In addition, the maximum content ratio is preferably 30% by mass or less, more preferably 20% by mass or less, and further more preferably 15% by mass or less.

In addition, the liquid crystal composition of the present invention can also contain a compound selected from the compound group represented by formulas (10.1) to (10.6) among the compounds represented by general formula (9) in the dielectrically neutral component (B).

[Chem. 78]

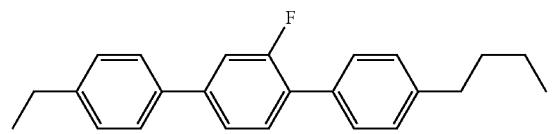

(10.1)

[Chem. 79]

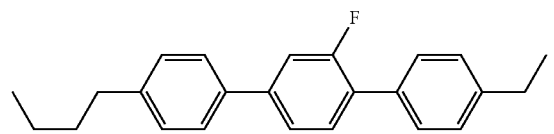

(10.2)

[Chem. 80]

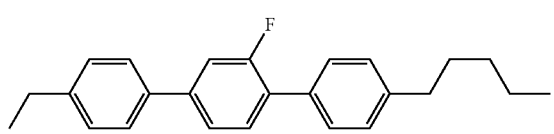

(10.3)

[Chem. 81]

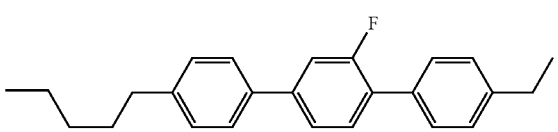

(10.4)

[Chem. 82]

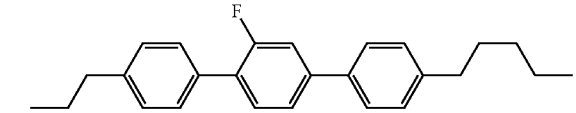

(10.5)

[Chem. 83]

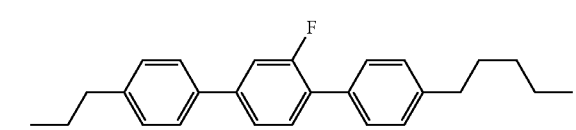

(10.6)

The component (B) may contain only one type of these compounds or may contain two or more types, and is preferably suitably combined depending on the required refractive index anisotropy and solubility at room temperature and under a freezing point. Since the solubility is affected by the structure of an alkyl group at both ends of the compound, attention is required. For example, the neutral component (B) preferably contains the compound represented by formula (10.1) or (10.2) in a content of 0.5% by mass or greater and less than 14% by mass, more preferably 2.5% by mass or greater and less than 14% by mass, further more preferably 4.5% by mass or greater and less than 14% by mass, and particularly preferably 8.5% by mass or greater and less than 14% by mass with respect to the total amount of the liquid crystal composition of the present invention; the neutral component (B) preferably contains the compound represented by formula (10.3) or (10.4) in a content of 0.5% by mass or greater and less than 17% by mass, more preferably 6% by mass or greater and less than 17% by mass, more preferably 8% by mass or greater and less than 17% by mass, further more preferably 10% by mass or greater and less than 17% by mass, further more preferably 12% by mass or greater and less than 17% by mass, and particularly preferably 14% by mass or greater and less than 16% by mass with respect to the total amount of the liquid crystal composition of the present invention; or the neutral component (B) preferably contains the compound represented by formula (10.5) or (10.6) in a content of 5.5% by mass or greater and less than 15% by mass, and more preferably 9% by mass or greater and less than 14% by mass with respect to the total amount of the liquid crystal composition of the present invention. The types of compounds capable of being combined are not particularly limited, and one type to three types of these compounds are preferably contained, one type to four types are more preferably contained, and one type to five or more types are particularly preferably contained. In addition, since it is also effective for solubility that the molecular weight distribution of the selected compound be wide, for example, one type of the compound is selected from the compounds represented by formula (10.1) or (10.2), one compound is selected from the compounds represented by formula (10.3) or (10.4), and one type of the compound is selected from the compounds represented by formula (10.5) or (10.6), and these compounds are preferably suitably combined. In addition, the liquid crystal composition of the present invention can contain one type or two or more types of compounds represented by general formula (15) in the dielectrically neutral component (B).

[Chem. 84]

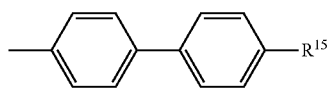
(15)

(In the formula, $R^{15}$ each independently represents an alkyl group having 2 to 5 carbon atoms or an alkenyl group having 2 to 5 carbon atoms.) The types of compounds capable of being combined are not particularly limited, and one type to three types of these compounds are preferably contained, and one type to four or more types are more preferably contained depending on the required performance such as solubility at a low temperature, a transition temperature, electrical reliability, and birefringence. One type or two or more types of compounds selected from the compound group represented by formula (15.2) to (15.4) among the compounds represented by general formula (15) are preferably contained.

[Chem. 85]

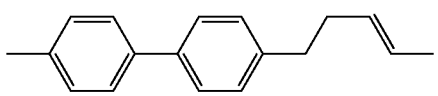
(15.2)

[Chem. 86]

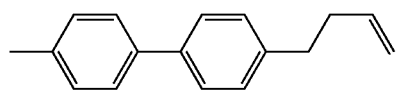
(15.3)

[Chem. 87]

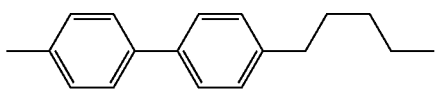 [SMILES: CCCCCc1ccc(-c2ccc(C)cc2)cc1]
(15.4)

The types of compounds capable of being combined are not particularly limited, and in consideration of refractive index anisotropy and $T_{ni}$, one type to three types are preferably contained. The component (B) preferably contains a compound selected from the group consisting of the compound represented by formulas (15.1) to (15.3) in a content of 5% by weight or greater, more preferably 7% by weight or greater, more preferably 10% by weight or greater, further more preferably 13% by weight or greater, and particularly preferably 16% by weight or greater with respect to the total amount of the liquid crystal composition of the present invention. In addition, the maximum content ratio is preferably 30% by mass or less, more preferably 25% by mass or less, and further more preferably 20% by mass or less.

In addition, the liquid crystal composition of the present invention can contain one type or two or more types of compounds represented by general formula (30) in the dielectrically neutral component (B).

[Chem. 88]

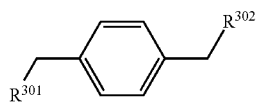
(30)

(In the formula, each of $R^{301}$ and $R^{302}$ independently represents a linear alkyl group or a linear alkenyl group having 1 to 10 carbon atoms.) The types of compounds capable of being combined are not particularly limited, and one type to three types of these compounds are preferably contained, one type to four types are more preferably contained, and one type to five or more types are particularly preferably contained depending on the required performance such as solubility at a low temperature, a transition temperature, electrical reliability, and birefringence. In addition, the maximum content ratio is preferably 35% by mass or less, more preferably 25% by mass or less, and further more preferably 15% by mass or less.

As the compound represented by general formula (30), specifically, the following compounds can be suitably used.

[Chem. 89]

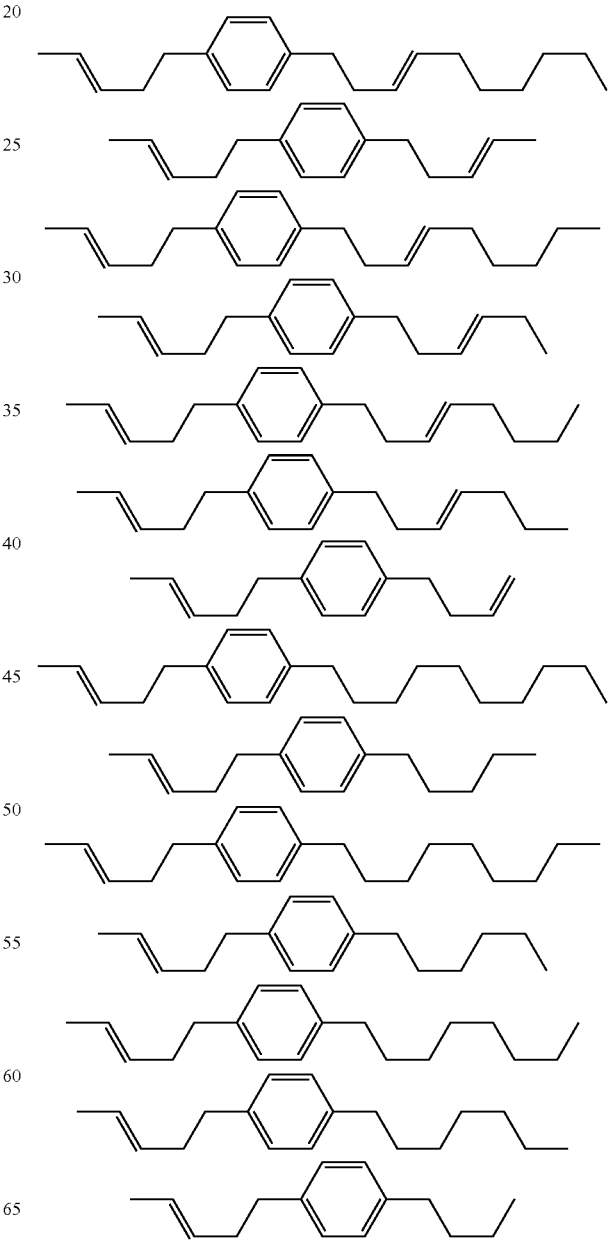

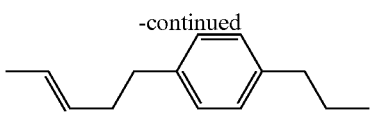

In addition, the liquid crystal composition of the present invention can also contain a compound selected from the compound group represented by formulas (17.1) to (17.3) among the compounds represented by general formula (13) in the dielectrically neutral component (B).

[Chem. 90]

[Chem. 93]

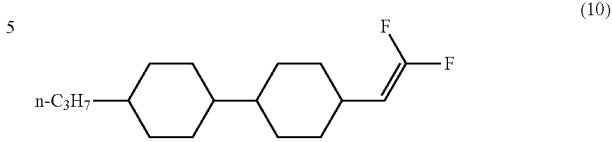
(10)

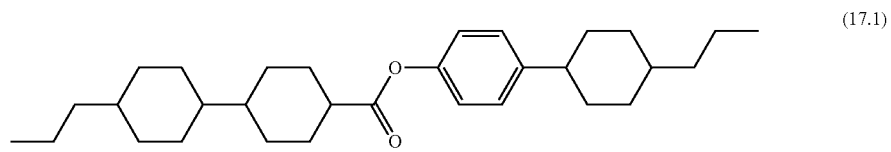
(17.1)

[Chem. 91]

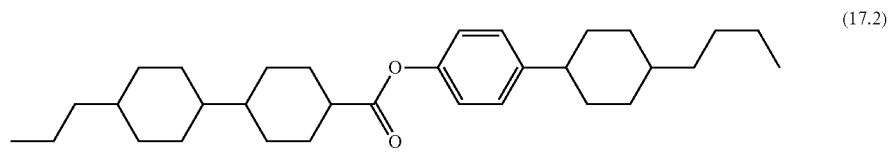
(17.2)

[Chem. 92]

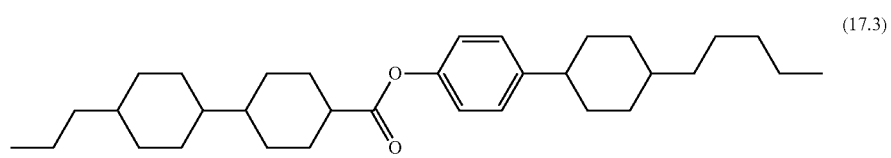
(17.3)

The types of compounds capable of being combined are not particularly limited, and in consideration of $T_{ni}$, solubility, and birefringence ($\Delta n$), the compounds are preferably used in suitable combination. In particular, one type or two or three types of compounds are preferably used in combination. The content thereof is preferably 0.5% by weight or greater and less than 16% by mass, more preferably 1% by weight or greater and less than 12% by mass, further more preferably 11% by weight or greater and less than 6% by mass, and particularly preferably 1% by weight or greater and less than 4% by mass with respect to the total amount of the liquid crystal composition of the present invention.

As the liquid crystal composition of the present invention, a composition containing the component (A) in a content of 73% by mass or greater, or a composition containing the component (B) in a content of 81% by mass or greater can also be suitably used.

In addition, the liquid crystal composition of the present invention can also contain the compound represented by formula (10).

The content of the compound represented by formula (10) in the component (B) is preferably adjusted depending on the required performance such as solubility at a low temperature, a transition temperature, electrical reliability, and birefringence, and the component (B) preferably contains the compound in a content of 11% by mass or greater, more preferably 15% by mass or greater, more preferably 23% by mass or greater, further more preferably 26% by mass or greater, and particularly preferably 28% by mass or greater with respect to the total amount of the liquid crystal composition of the present invention.

In the liquid crystal composition of the present invention, $\Delta\varepsilon$ at 25° C. is +3.5 or greater, and more preferably +3.5 to +20.0, and further more preferably +3.5 to +15.0. An at 25° C. is 0.08 to 0.14, and more preferably 0.09 to 0.13. In more detail, in the case of corresponding to a thin cell gap, 0.10 to 0.13 is preferable, and in the case of corresponding to a thick cell gap, 0.08 to 0.10 is preferable. η at 20° C. is 10 mPa·s to 45 mPa·s, more preferably 10 mPa·s to 25 mPa·s, and particularly preferably 10 mPa·s to 20 mPa·s. $T_{ni}$ is at 60° C. to 120° C., more preferably 70° C. to 110° C., and particularly preferably 75° C. to 90° C.

The liquid crystal composition of the present invention may contain a general nematic liquid crystal, smectic liquid crystal, cholesteric liquid crystal other than compounds described above.

In the liquid crystal composition of the present invention, in order to manufacture a liquid crystal display element of a PS mode, a horizontal electric field type PSA mode, or a horizontal electric field type PSVA mode, a polymerizable compound can be contained. As the polymerizable compound capable of being used, a photopolymerizable monomer which is polymerized by energy rays such as light is exemplified, and as the structure, a polymerizable compound having a liquid crystal skeleton in which a plurality of six-membered rings is connected such as biphenyl derivatives and terphenyl derivatives is exemplified. In addition, specifically, a bifunctional monomer represented by general formula (V) is preferable.

[Chem. 94]

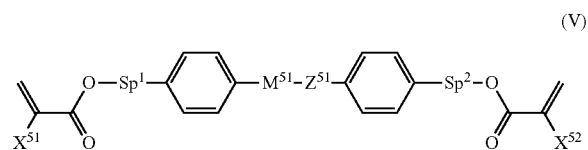

(V)

(In the formula, each of $X^{51}$ and $X^{52}$ independently represents a hydrogen atom or a methyl group, each of $Sp^1$ and $Sp^2$ independently represents a single bond, an alkylene group having 1 to 8 carbon atoms or —O—$(CH_2)_s$— (In the formula, s represents an integer of 2 to 7, and an oxygen atom is bonded to an aromatic ring.), $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, $CH_2CH_2$—COO—, $CH_2CH_2$—OCO—, —COO—$CH_2$—, —OCO—$CH_2$—, —$CH_2$—COO—, —$CH_2$—OCO—, —$CY^1$=$CY^2$— (In the formula, each of $Y^1$ and $Y^2$ independently represents a fluorine atom or a hydrogen atom.), —C≡C— or a single bond, $M^{51}$ represents a 1,4-phenylene group, a trans-1,4-cyclohexylene group, or a single bond, and any hydrogen atom in the all 1,4-phenylene groups in the formula may be substituted with a fluorine atom.)

Both diacrylate derivatives in which both $X^{51}$ and $X^{52}$ represent hydrogen atoms and dimethacrylate derivatives in which both $X^{51}$ and $X^{52}$ have methyl groups are preferable, and compounds in which one of $X^{51}$ and $X^{52}$ represents a hydrogen atom, and the other represents a methyl group are also preferable. In regard to a polymerization rate of these compounds, diacrylate derivatives are the fastest, dimethacrylate derivatives are slow, and asymmetric compounds are therebetween. It is possible to use a more preferable embodiment depending on the use thereof. In a PSA display element, dimethacrylate derivatives are particularly preferable.

Each of $Sp^1$ and $Sp^2$ independently represents a single bond, an alkylene group having 1 to 8 carbon atoms or —O—$(CH^2)_s$—, and in a PSA display element, at least one of $Sp^1$ and $Sp^2$ is preferably a single bond, and compounds in which both represent a single bond, or an embodiment in which one of $Sp^1$ and $Sp^2$ represents a single bond, and the other represents an alkylene group having 1 to 8 carbon atoms or —O—$(CH_2)_s$— are preferable. In this case, an alkyl group having 1 to 4 carbon atoms is preferable, and s is preferably 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

$M^{51}$ represents a 1,4-phenylene group or a trans-1,4-cyclohexylene group in which an arbitrary hydrogen atom may be substituted with a fluorine atom, or a single bond, and a 1,4-phenylene group or a single bond is preferable. In a case where C represents a ring structure other than a single bond, $Z^{51}$ is also preferably a linking group other than a single bond, and in a case where $M^{51}$ is a single bond, $Z^{51}$ is preferably a single bond.

From these points of view, in general formula (V), as the ring structures between $Sp^1$ and $Sp^2$, specifically, the structures described below are preferable.

In general formula (V), $M^{51}$ represents a single bond, in a case where the ring structure is formed of two rings, the ring structure between $Sp^1$ and $Sp^2$ preferably represents the following formulas (Va-1) to (Va-5), more preferably represents formulas (Va-1) to (Va-3), and particularly preferably represents formula (Va-1).

[Chem. 95]

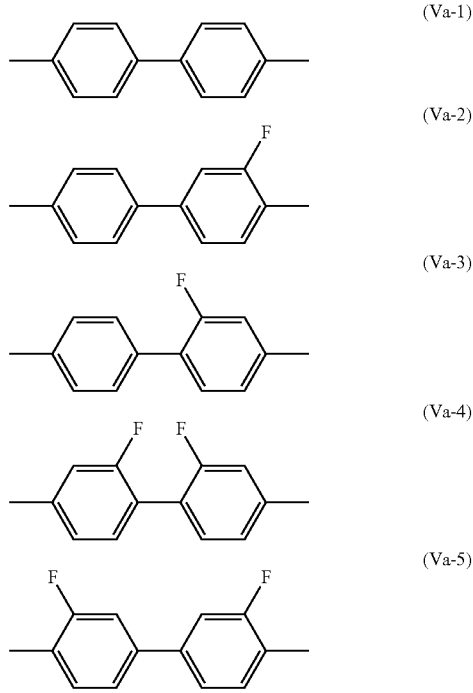

(In the formula, both ends are bonded to $Sp^1$ or $Sp^2$.)

In polymerizable compounds including these skeletons, since a force for restricting the alignment after polymerization is optimal to a PSA type liquid crystal display element, and an excellent alignment state is obtained, display unevenness is suppressed, or is not generated at all.

Based on what has been described above, as the polymerizable monomer, general formulas (V-1) to (V-4) are particularly preferable, and among these, general formula (V-2) is most preferable.

[Chem. 96]

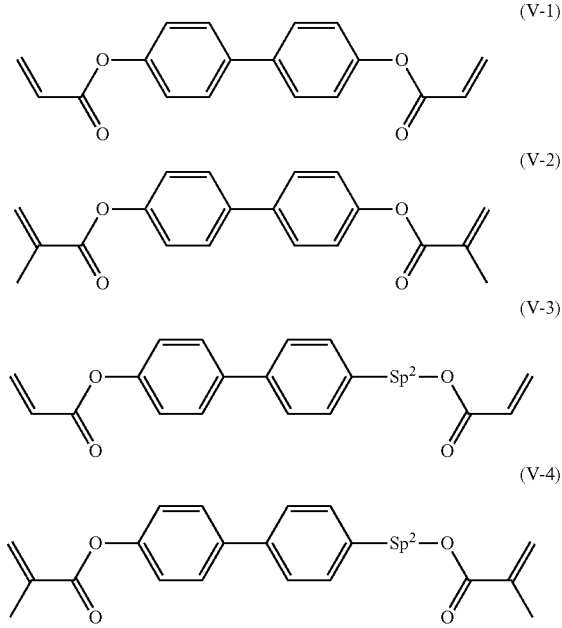

(In the formula, Sp² represents an alkylene group having 2 to 5 carbon atoms.)

In the case of adding a monomer to the liquid crystal composition of the present invention, polymerization proceeds even when a polymerization initiator is not present, however, the polymerization initiator may be contained in order to promote the polymerization. Examples of the polymerization initiator include benzoin ethers, benzophenones, acetophenones, benzyl ketals and acyl phosphine oxides.

The polymerizable compound-containing liquid crystal composition of the present invention has a liquid crystal alignment capability by polymerizing a polymerizable compound included therein using ultraviolet ray irradiation, and is used in the liquid crystal display element which controls the light transmission amount using birefringence of the liquid crystal composition. The composition is useful for the liquid crystal display element such as an AM-LCD (active matrix liquid crystal display element), a TN (nematic liquid crystal display element), an STN-LCD (super twisted nematic liquid crystal display element), an OCB-LCD and an IPS-LCD (in-plane switching liquid crystal display element), is particularly useful for the AM-LCD, and can be used for a transmissive or reflective liquid crystal display element.

As two substrates of the liquid crystal cell used in the liquid crystal display element, glass or a transparent material having flexibility such as plastic can be used, and the other substrate may be an opaque material such as silicon. For example, a transparent substrate having a transparent electrode layer can be obtained by sputtering indium tin oxide (ITO) onto a transparent substrate such as a glass plate.

For example, a color filter can be produced by a pigment dispersion method, a printing method, an electrodeposition method, or a staining method. A method for producing the color filter by the pigment dispersion method will be described as an example. A curable coloring composition for a color filter is coated onto the transparent substrate, a patterning process is performed, and heating or light irradiation is performed for curing. By performing the step on each of three colors of red, green, and blue, it is possible to produce a pixel portion for the color filter. In addition, a pixel electrode in which an active element such as a TFT, a thin-film diode, and a metal insulator metal specific resistance element is provided may be installed on the substrate.

The above-described substrate is faced such that the transparent electrode layer becomes the inner side. At that time, the space between substrates may be adjusted through a spacer. At this time, the thickness of the obtained light adjusting layer is preferably adjusted to be in a range of 1 μm to 100 μm. The thickness is still more preferably in the range of 1.5 μm to 10 μm, and in a case where a polarizing plate is used, the product of the refractive index anisotropy Δn of the liquid crystal and the cell thickness d is preferably adjusted such that the contrast is at a maximum. Moreover, in a case where there are two polarizing plates, a polarization axis of each polarizing plate can be adjusted such that a viewing angle and a contrast are excellent. In addition, a phase difference film for widening the viewing angle can be also used. For example, as the spacer, a post spacer consisting of glass particles, plastic particles, alumina particles, photoresist material, and the like is exemplified. Thereafter, a sealing agent such as an epoxy-based thermosetting composition is screen-printed onto the substrate in a form provided with a liquid crystal injection port, the substrates are bonded to each other and heated, whereby the sealing agent is heat-cured.

As a method for sandwiching the polymerizable compound-containing liquid crystal composition between two substrates, a general vacuum injection method or an ODF method can be used. In the vacuum injection method, dropping marks are unlikely to be generated, but there is a problem in that injection marks may remain. In the present invention, the display element which is manufactured using the ODF method can be suitably used. In the liquid crystal display element manufacturing step by the ODF method, a sealing agent of an epoxy-based photo-heat combination curable type is drawn in a closed loop bank shape on either one substrate of a back plane or the other substrate of a front plane using a dispenser, and after dropping a predetermined amount of the liquid crystal composition in a degassed state therein, the front plane and the back plane are joined, whereby a liquid crystal display element can be manufactured. Since dropping of the liquid crystal composition in the ODF step can be stably performed, the liquid crystal composition of the present invention can be suitably used.

As a method for polymerizing a polymerizable compound, since an appropriate polymerization rate is desirable in order to obtain an excellent alignment capability of a liquid crystal, a method in which polymerization is performed by conducting irradiation of active energy rays such as ultraviolet rays or electron beams singly, in combination thereof, or sequentially is preferable. In a case where ultraviolet rays are used, a polarized light source may be used, and a non-polarized light source may be used. In addition, in a case where polymerization is performed in a state where the polymerizable compound-containing liquid crystal composition is sandwiched between two substrates, appropriate transparency with respect to active energy rays is necessarily applied to at least the substrate of the irradiation surface side. In addition, a method in which after polymerizing only a specific portion using a mask during light irradiation, an alignment state of the unpolymerized portion is changed by changing conditions such as an electric field, a magnetic field, or temperature, and irradiation of active energy rays is further performed for polymerization may be used. In particular, when ultraviolet ray exposure is performed, the ultraviolet ray exposure is preferably performed while applying an AC electric field to the polymerizable compound-containing liquid crystal composition. The AC electric field to be applied is preferably an alternating current having a frequency in a range of 10 Hz to 10 kHz, more preferably in a range of 60 Hz to 10 kHz, and voltage is selected according to a desired pretilt angle of the liquid crystal display element. In other words, the pretilt angle of the liquid crystal display element can be controlled by an applied voltage. In the liquid crystal display element of a horizontal electric field type MVA mode, the pretilt angle is preferably controlled to be in a range of 80° to 89.9° from the viewpoint of alignment stability and contrast.

The temperature at the time of the irradiation is preferably in a temperature range in which a liquid crystal state of the liquid crystal composition of the present invention is maintained. The polymerization is preferably performed at a temperature around room temperature, that is, typically, at a temperature in a range of 15° C. to 35° C. As a lamp for generating ultraviolet rays, a metal halide lamp, a high pressure mercury lamp, and an ultrahigh pressure mercury lamp can be used. In addition, as the wavelength of ultraviolet rays used for irradiation, ultraviolet rays in a wavelength range which is not an absorption wavelength range of the liquid crystal composition are preferably used for irradiation, and if necessary, ultraviolet rays are preferably cut to use.

The intensity of ultraviolet rays used for irradiation is preferably in a range of 0.1 mW/cm$^2$ to 100 W/cm$^2$, and more preferably in a range of 2 mW/cm$^2$ to 50 W/cm$^2$. The amount of energy of ultraviolet rays used for irradiation can be suitably adjusted, and is preferably in a range of 10 mJ/cm$^2$ to 500 J/cm$^2$, and more preferably in the range of 100 mJ/cm$^2$ to 200 J/cm$^2$. When ultraviolet ray irradiation is performed, the intensity may be changed. The irradiation time of ultraviolet rays is suitably selected according to the intensity of ultraviolet rays used for irradiation, and is preferably in a range of 10 seconds to 3,600 seconds, and more preferably in a range of 10 seconds to 600 seconds.

The liquid crystal display element using the liquid crystal composition of the present invention is a useful one which satisfies both high speed response and suppression of display defects, and in particular, is useful for the liquid crystal display element for active matrix driving, and can be applied to a liquid crystal display element for a VA mode, a PSVA mode, a PSA mode, an IPS mode, or an ECB mode.

Hereinafter, the preferred embodiments of the liquid crystal display device according to the present invention will be described in detail with reference to the drawings.

FIG. 1 is a cross-sectional view showing a liquid crystal display element having two substrates facing each other, a seal material provided between the substrates, and a liquid crystal sealed in the sealing region surrounded by the seal material.

In particular, a specific embodiment of the liquid crystal display element having a back plane in which a TFT layer 102 and a pixel electrode 103 are provided on a substrate a 100, and a passivation film 104 and an alignment film a 105 are provided thereon, a front plane in which a black matrix 202, a color filter 203, a planarization film (overcoat layer) 201, and a transparent electrode 204 are provided on a substrate b 200, and an alignment film b 205 is provided thereon, and which is disposed to face the back plane, a seal material 301 provided between the substrates, and a liquid crystal layer 303 sealed in a sealing region surrounded by the seal material, and provided with a projection 304 on the substrate surface with which the seal material 301 comes into contact is shown.

The substrate a or the substrate b is not particularly limited as long as the material is substantially transparent, and glass, ceramics, plastics, and the like can be used. As the plastic substrate, cellulose, cellulose derivatives such as triacetyl cellulose, and diacetyl cellulose, polycycloolefin derivatives, polyesters such as polyethylene terephthalate and polyethylene naphthalate, polyolefins such as polypropylene and polyethylene, polycarbonate, polyvinyl alcohol, polyvinyl chloride, polyvinylidene chloride, polyamide, polyimide, polyimideamide, polystyrene, polyacrylate, polymethyl methacrylate, polyether sulfone, polyarylate, and inorganic-organic composite materials such as a glass fiber-epoxy resin, and a glass fiber-acrylic resin can be used.

Moreover, when a plastic substrate is used, a barrier film is preferably provided. The function of the barrier film is to reduce moisture permeability of the plastic substrate, and to improve the reliability of the electrical characteristics of the liquid crystal display element. As the barrier film, which is not particularly limited as long as the transparency is high and the water vapor permeability is low in respective barrier films, a thin film formed by a vapor deposition or sputtering, chemical vapor deposition method (CVD method) using an inorganic material such as silicon oxide is generally used.

In the present invention, the material of the substrate a or the substrate b may be the same, or different, and it is not particularly limited. If a glass substrate is used, a liquid crystal display element having excellent heat resistance and dimensional stability can be produced, and therefore the glass substrate is preferably used. In addition, if a plastic substrate is used, the plastic substrate is suitable for manufacturing by a roll-to-roll method, and reducing weight or obtaining flexibility, and therefore the plastic substrate is preferably used. In addition, for the purpose of imparting flatness and heat resistance, it is possible to obtain excellent results by combining the plastic substrate and the glass substrate.

Moreover, in the examples described below, a substrate is used as the material of the substrate a 100 or substrate b 200.

In the back plane, the TFT layer 102 and the pixel electrode 103 are provided on the substrate a 100. These are manufactured by a general array process. The back plane is obtained by providing the passivation film 104 and the alignment film a 105 thereon.

The passivation film 104 (also referred to as inorganic protective film) is a film to protect the TFT layer, and in general, nitride film ($SiN_x$), oxide film ($SiO_x$), or the like is formed by the chemical vapor deposition (CVD) technique.

In addition, the alignment film a 105 is a film having a function of aligning the liquid crystal, and generally, a polymeric material such as polyimide is used in many cases. As a coating solution, an alignment agent solution consisting of a polymeric material and a solvent is used. Since the alignment film has the possibility of inhibiting the adhesive force with a seal material, the alignment film is pattern-coated in the sealing region. In coating, a printing method such as a flexographic printing method or a liquid droplet discharge method such as an ink-jet is used. After the solvent of the coated alignment agent solution is evaporated by temporary drying, the coated alignment agent solution is cross-linked and cured by baking. Thereafter, the alignment processing is performed in order to give the aligning function.

The alignment processing is performed by a rubbing method in general. By rubbing the polymer film formed as described above in one direction using a rubbing cloth made of fibers such as rayon, a liquid crystal alignment capability is generated.

In addition, a photo-alignment method can also be used. The photo-alignment method is a method of generating the alignment capability by irradiation of polarized light on the alignment layer including an organic material having photosensitivity, and generation of scratches and dust on the substrate by the rubbing method does not occur. As the organic material in the photo-alignment method, a material containing a dichroic dye is exemplified. As the dichroic dye, a dye having a group generating a photoreaction which is the origin of the liquid crystal alignment capability (hereinafter, referred to as photo-alignment group), such as an alignment induction of molecules or an isomerization reaction by Weigert's effect due to photodichroism (example: azobenzene group), a dimerization reaction (example: cinnamoyl group), a photocrosslinking reaction (example: benzophenone group), or a photodegradation reaction (example: polyimide group) can be used. After the solvent of the coated alignment agent solution is evaporated by temporary drying, it is possible to obtain an alignment film having an alignment capability in an arbitrary direction by irradiation of light (polarized light) having an arbitrary polarization.

On the other hand, the front plane is provided with the black matrix 202, the color filter 203, the planarization film 201, the transparent electrode 204, and the alignment film b 205 on the substrate b 200.

For example, the black matrix 202 is produced by the pigment dispersion method. In particular, a color resin liquid in which a black colorant for forming a black matrix is homogeneously dispersed is coated on the substrate b 200 provided with a barrier film 201 to form a coloration layer. Subsequently, the coloration layer is baked to cure. A photoresist is coated on this, and the resultant product is pre-baked. After the photoresist is exposed through a mask pattern, development is performed to pattern the coloration layer. After this, the photoresist layer is peeled off, and the coloration layer is baked to complete the black matrix 202.

Alternatively, a photoresist type pigment dispersion may be used. In this case, the photoresist type pigment dispersion is coated, the resultant product is pre-baked and exposed through a mask pattern, and development is performed to pattern the coloration layer. After this, the photoresist layer is peeled off, and the coloration layer is baked to complete the black matrix 202.

The color filter 203 is produced by the pigment dispersion method, the electrodeposition method, the printing method, or the staining method or the like. To provide an example of the pigment dispersion method, a color resin liquid in which a pigment (for example, red) is homogeneously dispersed is coated on the substrate b 200, the resultant product is baked to cure, the photoresist is coated on this, and the resultant product is pre-baked. After the photoresist is exposed through a mask pattern, by developing, patterning is performed. After this, the photoresist layer is peeled off, and baking is performed again to complete the (red) color filter 203. There is no particular limitation of the order of colors which are produced. In the same manner, a green color filter 203 and a blue color filter 203 are formed.

The transparent electrode 204 is provided on the color filter 203 (the overcoat layer 201 is provided on the color filter 203 for surface planarization, if necessary). The transparent electrode 204 preferably has high transmittance, and low electric resistance. The transparent electrode 204 is manufactured by forming an oxide film such as ITO by a sputtering method or the like.

In addition, in order to protect the transparent electrode 204, a passivation film may also be provided on the transparent electrode 204.

The alignment film b 205 is the same as the alignment film a 105 described above.

A specific aspect of the back plane and the front plane used in the present invention has been described above, however, the application is not limited to the specific aspect, and modifications thereof may be made according to the desired liquid crystal display element without restriction.

A shape of the post spacer is not particularly limited, and the horizontal cross-section thereof can be various shapes such as a circular shape and a polygonal shape including a quadrangular shape and the like. In consideration of a misalignment margin during a process, the horizontal cross-section is particularly preferably a circular shape or a regular polygonal shape. In addition, the shape of the projection is preferably a truncated cone shape or a truncated pyramid shape.

The material of the post spacer is not particularly limited as long as it is a material which is not dissolved in a seal material, an organic solvent used in the seal material, or the liquid crystal, and in terms of processing and reducing weight, a synthetic resin (curable resin) is preferable. On the other hand, by a method by photolithography or a droplet discharge method, the projection can be provided on a surface with which the seal material on a first substrate comes into contact. For this reason, a photocurable resin which is suitable for the method by photolithography or the droplet discharge method is preferably used.

As an example, a case where the front post spacer is obtained by the photolithography method will be described.

A resin solution (not including colorant) for forming the post spacer is coated on the transparent electrode 204 of the front plane. Subsequently, the resin layer is baked to cure. A photoresist is coated on this, and the resultant product is pre-baked. After the photoresist is exposed through a mask pattern, development is performed to pattern the resin layer. After this, the photoresist layer is peeled off, and the resin layer is baked to complete the post spacer.

The formation position of the post spacer can be determined at a desired position by the mask pattern. Therefore, it is possible to simultaneously make both the inside of the sealing region and the outside of the sealing region (seal material coated portion) of the liquid crystal display element. In addition, the post spacer is preferably formed so as to be positioned on the black matrix to prevent quality degradation of the sealing region. The post spacer produced by the photolithography method as described above is referred to as a column spacer or a photospacer.

As the material of the spacer, a negative type water soluble resin such as a PVA-Stilbazo photosensitive resin, and a mixture of a polyfunctional acryl-based monomer, acrylic acid copolymer, a triazole-based initiator, and the like are used. Alternatively, a color resin in which a colorant is dispersed in a polyimide resin may be also be used. It is possible to obtain a spacer formed of a known material according to compatibility with the liquid crystal to be used and the seal material, and there is no particular limitation in the present invention.

In this manner, after providing the post spacer on a surface which is the sealing region on the front plane, the seal material (301 in FIG. 1) is coated on the surface with which the seal material of the back plane comes into contact.

The material of the seal material is not particularly limited, and a curable resin composition in which a polymerization initiator is added to an epoxy-based or acryl-based photocurable, a thermosetting, or a photo-heat combination curable resin is used. In addition, fillers formed of an inorganic substance or an organic substance may be added in order to control moisture permeability, elastic modulus, viscosity, and the like. The shape of these fillers, which is not particularly limited, is spherical, fibrous, or amorphous. Furthermore, a spherical or fibrous gap material having a monodisperse diameter is mixed in order to excellently control a cell gap, or a fibrous material that is likely to be entangled with a projection on the substrate may be mixed in order to further enhance adhesive force with the substrate. The diameter of the fibrous material used at this time is desirably ⅕ to 1/10 or less of the cell gap, and the length of the fibrous material is desirably shorter than the seal coating width.

In addition, the material of the fibrous material is not particularly limited as long as a predetermined shape is obtained, and synthetic fibers including cellulose, polyamide, and polyester, or inorganic materials such as glass and carbon can be suitably selected as the material.

As the method of coating the seal material, a printing method and a dispensing method are exemplified, and the dispensing method in which a small amount of the seal material is used is desirable. The coating position of the seal material is generally on the black matrix such that the sealing region is not adversely affected. As the seal material coating shape, a closed loop shape is used in order to form a liquid crystal dropping region of a next step (such that a liquid crystal is not leaked).

A liquid crystal is dropped to the closed loop shape (sealing region) of the front plane coated with the seal material. In general, a dispenser is used. The amount of liquid crystal to be dropped is basically the same amount of the volume obtained by multiplying a height of the post spacer and a seal coating area in order to match the amount of liquid crystal to be dropped to the liquid crystal cell volume. However, in consideration of liquid crystal leakage and optimization of display characteristics in the cell bonding step, the amount of liquid crystal to be dropped may be suitably adjusted, or the liquid crystal dropping position may be dispersed.

Next, the back plane is bonded to the front plane on which the seal material is coated and a liquid crystal is dropped. Specifically, the front plane and the back plane are adsorbed to a stage having a mechanism for adsorbing the substrate as an electrostatic chuck, and the alignment film b of the front plane and the alignment film a of the back plane are disposed to face each other at a position (distance) with which the seal material and the other substrate do not come into contact. In this state, the inside of the system is decompressed. After compression ends, while checking the bonding position of the front plane and the back plane, the positions of both substrates are adjusted (alignment operation). After adjustment of the bonding position ends, the substrate is caused to approach a position where the seal material on the front plane and the back plane come into contact with each other. In this state, an inert gas is introduced into the inside of the system, and the reduced pressure of the inside of the system is slowly returned to atmospheric pressure. At this time, the front plane and the back plane are bonded to each other by atmospheric pressure, and the cell gap is formed at a position of height of the post spacer. In this state, irradiation of ultraviolet rays is performed to the seal material to cure the seal material, whereby a liquid crystal cell is formed.

Thereafter, if necessary, a heating step is added to promote curing of the seal material. In order to enhance the adhesive force or improve the reliability of electrical characteristics of the sealing material, a heating step is added in many cases.

EXAMPLES

Hereinafter, the present invention will be described in more detail with examples, but the present invention is not limited to the examples. In addition, "%" in the compositions of the following examples and the comparative examples means "% by mass".

In the examples, the measured characteristics are as follows.

$T_{ni}$: A nematic phase-isotropic liquid phase transition temperature (° C.)

Δn: Refractive index anisotropy at 25° C. (another name: birefringence)

Δ∈: Dielectric anisotropy at 25° C.

η: Viscosity (mPa·s) at 20° C.

γ1: Rotational viscosity (mPa·s) at 25° C.

VHR: Voltage holding ratio (%) at 60° C. under the conditions of a frequency of 60 Hz and an applied voltage of 1 V Burn-in: After displaying a predetermined fixed pattern in the display area for 1,000 hours, by visually inspecting the afterimage level of the fixed pattern at the time when the full screen was uniformly displayed, the evaluation of the burn-in on a liquid crystal display element was performed on a scale of four stages described below.

A: Afterimage was not observed.

B: Afterimage was very slightly observed, however it was an acceptable level.

C: Afterimage was observed, and it was an unacceptable level.

D: Afterimage was observed, and it was a very severe level.

Dropping mark: By visually inspecting the dropping marks which comes up to the surface whitely in the case where the entire surface was displayed in black, the evaluation of the dropping marks on a liquid crystal display device was performed on a scale of four stages described below.

A: Afterimage was not observed.

B: Afterimage was very slightly observed, however it was an acceptable level.

C: Afterimage was observed, and it was an unacceptable level.

D: Afterimage was observed, and it was a very severe level.

Process compatibility: In ODF process, dropping the liquid crystal by 50 pL at one time was performed 100,000 times using a constant volume metering pump, the change in the amount of liquid crystal dropped by every 100 times of the following "0 to 100 times, 101 to 200 times, 201 to 300 times, . . . , 99,901 to 100,000 times" was evaluated as the process compatibility on a scale of four stages described below.

A: Change was extremely small (liquid crystal display element can be stably prepared).

B: Change was slightly observed, however it was an acceptable level.

C: Change was observed, and it was an unacceptable level (yield was deteriorated by generation of spots).

D: Change was observed, and it was a very severe level (liquid crystal leakage or vacuum bubbles are generated).

Solubility at a low temperatures: After preparing a liquid crystal composition, 1 g of the liquid crystal composition was weighed and placed in a sample bottle of 2 mL, the temperature change having one cycle, that is, "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid crystal composition was visually observed, and the evaluation of the solubility at a low temperature was performed on a scale of four stages described below.

A: Precipitates were not observed for 600 hours or longer.

B: Precipitates were not observed for 300 hours or longer.

C: Precipitates were observed within 150 hours or shorter.

D: Precipitates were observed within 75 hours or shorter.

Moreover, in the examples, the following abbreviations were used for describing the compounds.

(Ring Structure)

[Chem. 97]

Cy, Ph, Ph1, Ph3, Ma, Oc, Py, Np, Np1, Np3

(Side Chain Structure and Linking Structure)

TABLE 1

| n of terminal (number) | $C_nH_{2n+1}$— |
|---|---|
| -ndOFF— | —$(CH_2)_{n-1}$—HC=CFF |
| -2- | —$CH_2CH_2$— |
| -1O— | —$CH_2O$— |
| —O1- | —$OCH_2$— |
| —V— | —CO— |
| —VO— | —COO— |
| —CFFO— | —$CF_2O$— |
| —F | —F |
| —Cl | —Cl |
| —OCFFF | —$OCF_3$ |
| —CFFF | —$CF_3$ |
| —On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_m$— |
| —Ondm | —O—$(CH_2)_{n-1}$—HC=CH— |
| -ndm- | —$(CH_2)_{n-1}$—HC=CH—$(CH_2)_{m-1}$ |
| —CN | —C≡N |
| -T- | —C≡C— |

Example 1

The following liquid crystal composition LC-1 was prepared.

[Chem. 98]

| Chemical structure | Ratio (%) | Abbreviated name |
|---|---|---|
| | 29 | 0d1-Cy-Cy-3 |
| | 8 | 0d1-Cy-Cy-5 |
| | 13 | 1d1-Cy-Cy-3 |
| | 2 | 1-Ph—Ph-5 |

-continued
[Chem. 98]
| Chemical structure | Ratio (%) | Abbreviated name |
|---|---|---|
| 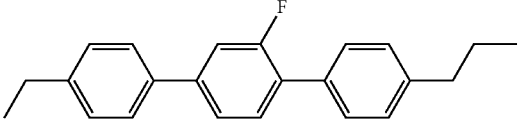 [SMILES: CCCc1ccc(-c2ccc(-c3ccc(CC)cc3)cc2F)cc1] | 6 | 2-Ph—Ph1—Ph-3 |
| 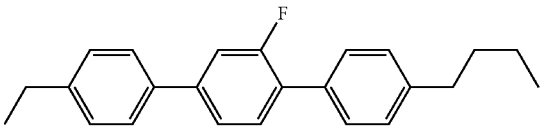 [SMILES: CCCCc1ccc(-c2ccc(-c3ccc(CC)cc3)cc2F)cc1] | 6 | 2-Ph—Ph1—Ph-4 |
| 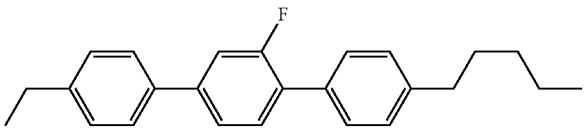 [SMILES: CCCCCc1ccc(-c2ccc(-c3ccc(CC)cc3)cc2F)cc1] | 6 | 2-Ph—Ph1—Ph-5 |
| 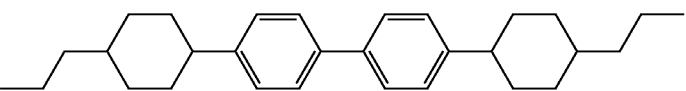 [SMILES: CCCC1CCC(c2ccc(-c3ccc(C4CCC(CCC)CC4)cc3)cc2)CC1] | 4 | 3-Cy-Ph—Ph-Cy-3 |
| 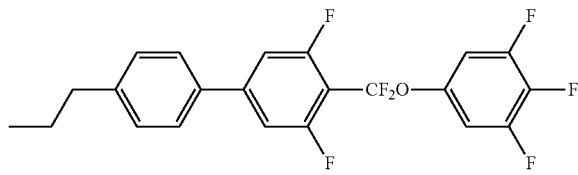 | 4 | 3-Ph—Ph3—CFFO—Ph3—F |
| 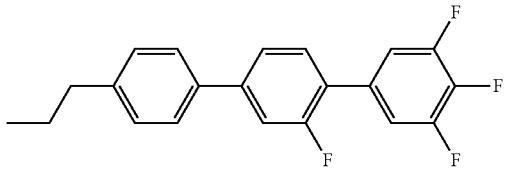 [SMILES: CCCc1ccc(-c2ccc(-c3cc(F)c(F)c(F)c3)c(F)c2)cc1] | 9 | 3-Ph—Ph1—Ph3—F |
| 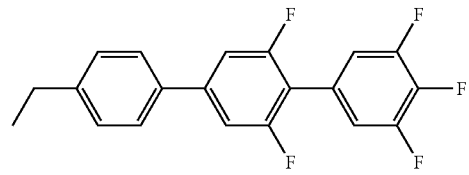 [SMILES: CCc1ccc(-c2cc(F)c(-c3cc(F)c(F)c(F)c3)c(F)c2)cc1] | 7 | 2-Ph—Ph3—Ph3—F |
| 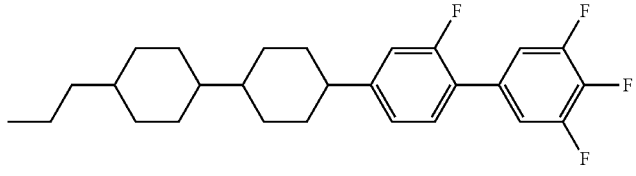 [SMILES: CCCC1CCC(C2CCC(c3ccc(-c4cc(F)c(F)c(F)c4)c(F)c3)CC2)CC1] | 3 | 3-Cy-Cy-Ph1—Ph3—F |
| 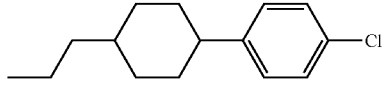 [SMILES: CCCC1CCC(c2ccc(Cl)cc2)CC1] | 3 | 3-Cy-Ph—Cl |

The values of the physical properties of LC-1 were as follows.

TABLE 2

| | |
|---|---|
| $T_{ni}$ | 74.3 |
| $\Delta n$ | 0.121 |
| $\Delta \epsilon$ | 4.1 |
| $\eta$ | 10.3 |
| $\gamma 1$ | 42 |

While an initial VHR of the liquid crystal composition LC-1 was 99.2%, a VHR after being left at a high temperature of 150° C. for 1 hour was 98.8%. When the solubility at a low temperature was evaluated, excellent performance was exhibited as shown in the following table. In addition, using the liquid crystal composition LC-1, a liquid crystal display element was manufactured by the ODF process, and when burn-in, dropping marks, and process compatibility were examined using the above-described method, excellent results were exhibited as shown below.

TABLE 3

| | |
|---|---|
| Evaluation of burn-in | A |
| Evaluation of dropping marks | A |
| Evaluation of process compatibility | A |
| Evaluation of solubility at a low temperature | A |

Comparative Example 1

The liquid crystal composition LC-2 described below which does not contain the compound represented by formula (2.1) was prepared.

[Chem. 99]

| Chemical structure | Ratio (%) | Abbreviated name |
|---|---|---|
| | 29 | 0d1-Cy-Cy-2 |
| | 8 | 0d1-Cy-Cy-5 |
| | 13 | 1d1-Cy-Cy-3 |
| | 2 | 1-Ph—Ph-5 |
| | 6 | 2-Ph—Ph1—Ph-3 |
| | 6 | 2-Ph—Ph1—Ph-4 |
| | 6 | 2-Ph—Ph1—Ph-5 |
| | 4 | 3-Cy-Ph—Ph-Cy-3 |
| | 4 | 3-Ph—Ph3—CFFO—Ph3—F |

-continued

[Chem. 99]

| Chemical structure | Ratio (%) | Abbreviated name |
|---|---|---|
| 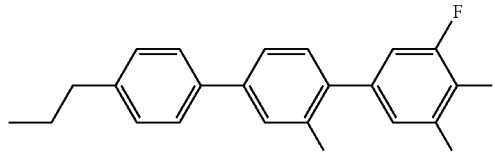 | 9 | 3-Ph—Ph1—Ph3—F |
| 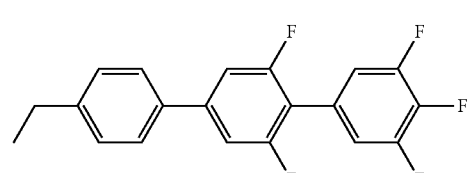 | 7 | 2-Ph—Ph3—Ph3—F |
| 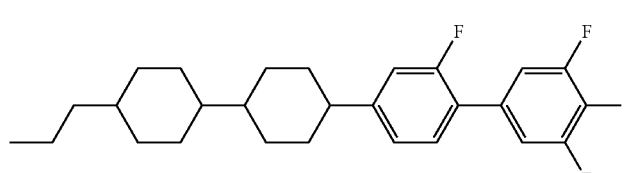 | 3 | 3-Cy-Cy-Ph1—Ph3—F |
| 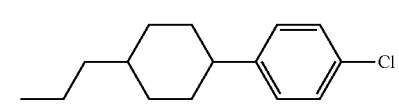 [SMILES: CCCC1CCC(c2ccc(Cl)cc2)CC1] | 3 | 3-Cy-Ph—Cl |

The values of the physical properties of LC-2 were as follows.

TABLE 4

| | |
|---|---|
| $T_{ni}$ | 68.2 |
| $\Delta n$ | 0.119 |
| $\Delta \epsilon$ | 4.1 |
| $\eta$ | 10.3 |
| $\gamma 1$ | 42 |

It was found that the liquid crystal composition LC-2- which does not contain the compound represented by formula (2.1) has lower $T_{ni}$ and $\Delta n$ compared to those of the liquid crystal composition LC-1 which contains the compound represented by formula (2.1). While the initial VHR of the liquid crystal composition LC-2 was 99.0%, the VHR after being left at a high temperature of 150° C. for 1 hour was 97.7%. When the solubility at a low temperature was evaluated, the precipitates were observed early compared to LC-1 as shown in the following table.

In addition, using the liquid crystal composition LC-2, a liquid crystal display element was manufactured, and when burn-in, dropping marks, and process compatibility were measured using the above-described method, poor results were exhibited compared to the example 1 as shown below.

TABLE 5

| | |
|---|---|
| Evaluation of burn-in | B |
| Evaluation of dropping marks | D |
| Evaluation of process compatibility | D |
| Evaluation of solubility at a low temperature | C |

Example 2

The following liquid crystal composition LC-3 was prepared.

[Chem. 100]

| Chemical structure | Ratio (%) | Abbreviated name |
|---|---|---|
| 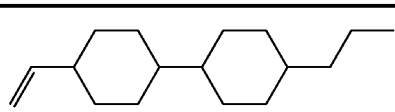 | 48 | 0d1-Cy-Cy-3 |
| 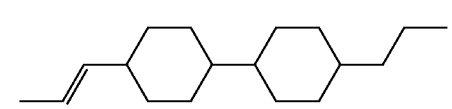 | 4 | 1d1-Cy-Cy-3 |

-continued
[Chem. 100]
| Chemical structure | Ratio (%) | Abbreviated name |
|---|---|---|
|  | 8 | 1-Ph—Ph—3d1 |
| 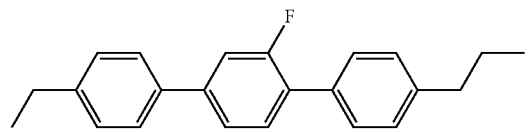 [SMILES: CCCc1ccc(-c2ccc(-c3ccc(CC)cc3)cc2F)cc1] | 8 | 2-Ph—Ph1—Ph-3 |
| 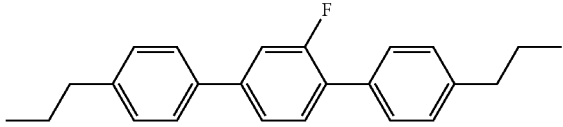 | 7 | 3-Ph—Ph1—Ph-3 |
| 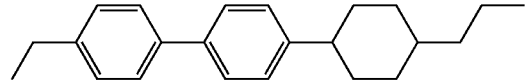 [SMILES: CCCC1CCC(c2ccc(-c3ccc(CC)cc3)cc2)CC1] | 7 | 2-Ph—Ph-Cy-3 |
| 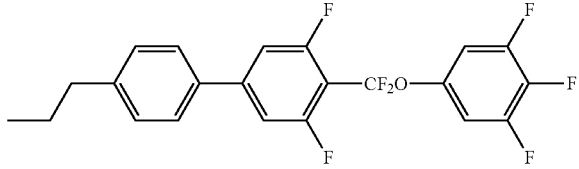 | 4 | 3-Ph—Ph3—CFFO—Ph3—F |
| 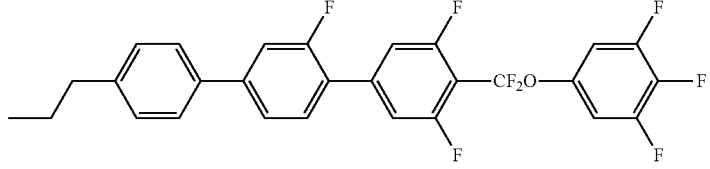 | 5 | 3-Ph—Ph1—Ph3—CFFO—Ph3—F |
| 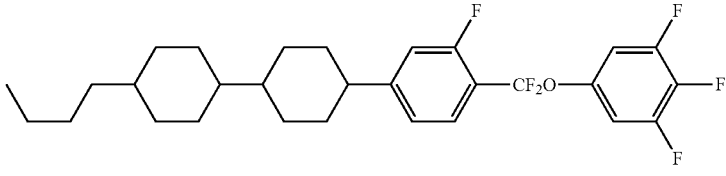 | 3 | 4-Cy-Cy-Ph1—CFFO—Ph3—F |
| 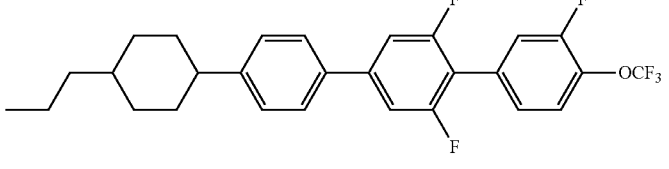 | 6 | 3-Cy-Ph—Ph3—Ph2—OCFFF |

The values of the physical properties of LC-3 were as follows.

TABLE 6

| | |
|---|---|
| $T_{ni}$ | 75.1 |
| Δn | 0.120 |
| Δε | 4.6 |
| η | 13 |
| γ1 | 44 |

While the initial VHR of the liquid crystal composition LC-3 was 99.4%, the VHR after being left at a high temperature of 150° C. for 1 hour was 99.0%. When the solubility at a low temperature was evaluated, excellent performance was exhibited as shown in the following table. In addition, using the liquid crystal composition LC-3, a liquid crystal display element was manufactured by the ODF process, and when burn-in, dropping marks, and process compatibility were examined using the above-described method, excellent results were exhibited as shown below.

TABLE 7

| | |
|---|---|
| Evaluation of burn-in | A |
| Evaluation of dropping marks | A |
| Evaluation of process compatibility | A |
| Evaluation of solubility at a low temperature | A |

Comparative Example 2

The liquid crystal composition LC-4 described below which does not contain the compound represented by formula (1) was prepared.

[Chem. 101]

| Chemical structure | Ratio (%) | Abbreviated name |
|---|---|---|
| 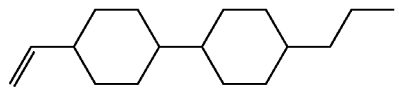 [SMILES: C=CC1CCC(C2CCC(CCC)CC2)CC1] | 48 | 0d1-Cy-Cy-3 |
| 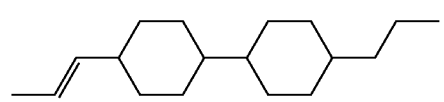 [SMILES: C/C=C/C1CCC(C2CCC(CCC)CC2)CC1] | 4 | 1d1-Cy-Cy-3 |
| 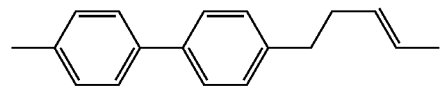 | 8 | 1-Ph—Ph—3d1 |
| 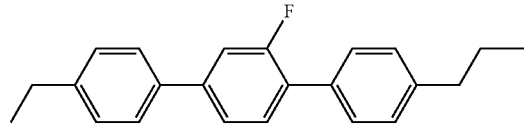 [SMILES: CCCc1ccc(-c2ccc(-c3ccc(CC)cc3)cc2F)cc1] | 8 | 2-Ph—Ph1—Ph-3 |
| 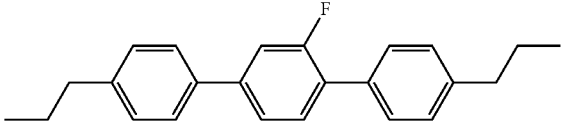 [SMILES: CCCc1ccc(-c2ccc(-c3ccc(CCC)cc3)c(F)c2)cc1] | 7 | 3-Ph—Ph1—Ph-3 |
| 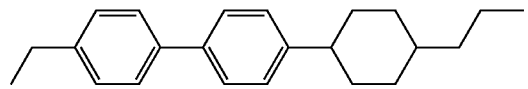 | 7 | 2-Ph—Ph-Cy-3 |
| 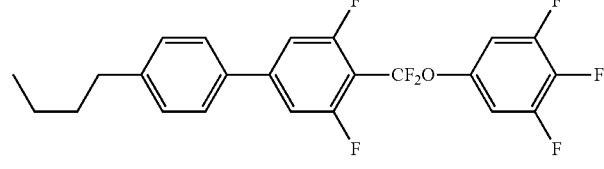 | 4 | 4-Ph—Ph3—CFFO—Ph3—F |
| 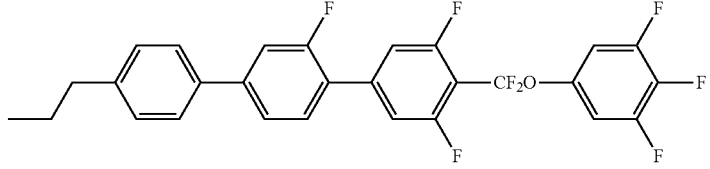 | 5 | 3-Ph—Ph1—Ph3—CFFO—Ph3—F |

-continued

[Chem. 101]

| Chemical structure | Ratio (%) | Abbreviated name |
|---|---|---|
| (structure with CF2O linkage) | 3 | 4-Cy-Cy-Ph1—CFFO—Ph3—F |
| (structure with OCF3) | 6 | 3-Cy-Ph—Ph3—Ph1—OCFFF |

The values of the physical properties of LC-4 were as follows.

TABLE 8

| | |
|---|---|
| $T_{ni}$ | 75.1 |
| $\Delta n$ | 0.119 |
| $\Delta\epsilon$ | 4.6 |
| $\eta$ | 14 |
| $\gamma 1$ | 45 |

It was found that the liquid crystal composition LC-which does not contain the compound represented by formula (1) has almost the same properties compared to the liquid crystal composition LC-3 which contains the compound represented by formula (1). While the initial VHR of the liquid crystal composition LC-4 was 99.1%, the VHR after being left at a high temperature of 150° C. for 1 hour was 97.7%. When the solubility at a low temperature was evaluated, the precipitates were observed early compared to LC-3 as shown in the following table.

In addition, using the liquid crystal composition LC-4, a liquid crystal display element was manufactured, and when burn-in, dropping marks, and process compatibility were measured using the above-described method, poor results were exhibited compared to the example 2 as shown below.

TABLE 9

| | |
|---|---|
| Evaluation of burn-in | B |
| Evaluation of dropping marks | D |
| Evaluation of process compatibility | C |
| Evaluation of solubility at a low temperature | D |

Examples 3 and 4

The following liquid crystal compositions LC-5 and LC-6 were prepared, and the values of the physical properties thereof were measured. The results are shown

TABLE 10

| Chemical structure | Ratio (%) |
|---|---|
| LC-5 | |
| 3-Cy-Cy-1d0 | 34 |
| 3-Cy-Cy-1d1 | 15 |
| 1-Ph—Ph-5 | 12 |
| 0d1-Cy-Cy-Ph-1 | 8 |
| 2-Ph—Ph1—Ph-3 | 8 |
| 2-Ph—Ph1—Ph-5 | 9 |
| 3-Ph—Ph3—CFF0-Ph3—F | 5 |
| 3-Ph—Ph1—Ph3—CFF0-—Ph3—F | 5 |
| 3-Cy-Ph—Ph3—Ph1-0CFFF | 4 |
| Tni/° C. | 75.3 |
| $\Delta n$ | 0.121 |
| $\Delta\epsilon$ | 3.6 |
| $\gamma 1$/mPa · s | 41 |
| $\eta$/mPa · s | 11 |
| LC-6 | |
| 3-Cy-Cy-1d0 | 48 |
| 3-Cy-Cy-1d1 | 4 |
| 1-Ph—Ph-3d1 | 8 |
| 2-Ph—Ph1—Ph-3 | 8 |
| 3-Ph—Ph1—Ph-3 | 7 |
| 3-Ph—Ph3—CFF0-Ph3—F | 4 |
| 3-Ph—Ph1—Ph3—CFF0-Ph3—F | 5 |
| 4-Cy-Cy-Ph1—CFF0-Ph3—F | 10 |
| 3-Cy-Ph—Ph3—Ph1-0CFFF | 6 |
| Tni/° C. | 76.1 |
| $\Delta n$ | 0.110 |
| $\Delta\epsilon$ | 5.9 |
| $\gamma 1$/mPa · s | 45 |
| $\eta$/mPa · s | 13 |

Solubilities at a low temperature of the liquid crystal compositions LC-5 and LC-6 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-5 and LC-6 were examined, excellent results were exhibited as shown below.

TABLE 11

| | LC-5 | LC-6 |
|---|---|---|
| Initial VHR (%) | 98.6 | 98.5 |
| VHR (%) after being left at 150° C. for 1 hour | 98.3 | 98.3 |

TABLE 11-continued

|  | LC-5 | LC-6 |
| --- | --- | --- |
| Evaluation of burn-in | A | A |
| Evaluation of dropping marks | A | A |
| Evaluation of process compatibility | A | A |
| Evaluation of solubility at a low temperature | A | A |

Example 5 and Reference Example 1

The following liquid crystal compositions LC-7 and LC-8 (Reference Example 1) were prepared, and the values of the physical properties thereof were measured. The results are shown in the following table.

TABLE 12

| Chemical structure | Ratio (%) |
| --- | --- |
| LC-7 | |
| 3-Cy-Cy-1d0 | 15 |
| 3-Cy-Cy-1d1 | 2 |
| 0d1-Cy-Cy-Ph-1 | 4 |
| 2-Ph—Ph1—Ph-3 | 7 |
| 2-Ph—Ph1—Ph-4 | 7 |
| 2-Cy-Cy-Ph3—F | 8 |
| 2-Cy-Ph—Ph3—F | 9 |
| 3-Cy-Cy-Ph—OCFFF | 14 |
| 3-Ph—Ph3—CFFO—Ph3—F | 11 |
| 3-Cy-Cy-CFFO—Ph3—F | 9 |
| 5-Cy-Cy-CFFO—Ph3—F | 8 |
| 3-Cy-Cy-Ph1—PH3—F | 3 |
| 3-Cy-Ph—Ph1-Cy-3 | 3 |
| Tni/° C. | 91.1 |
| Δn | 0.112 |
| Δε | 8.9 |
| γ1/mPa·s | 81 |
| η/mPa·s | 17 |
| LC-8 | |
| 3-Cy-Cy-1d0 | 22 |
| 3-Cy-Cy-1d1 | 6 |
| 0d1-Cy-Cy-Ph-1 | 8 |
| 3-Cy-Cy-VO—Ph-Cy-3 | 4 |
| 3-Ph—Ph3—CFFO—Ph3—F | 15 |
| 3-Cy-Cy-CFFO—Ph3—F | 7 |
| 5-Cy-Cy-CFFO—Ph3—F | 8 |
| 3-Ph—Ph1—Ph3—CFFO—Ph3—F | 7 |
| 2-Py—Ph—Ph3—CFFO—Ph3—F | 7 |
| 3-Py—Ph—Ph3—CFFO—Ph3—F | 8 |
| 3-Cy-Ph—Ph3—Ph1—OCFFF | 6 |
| 3-Ph—Ph—Ph1—Ph3—F | 2 |
| Tni/° C. | 98.6 |
| Δn | 0.121 |
| Δε | 19.4 |
| γ1/mPa·s | 168 |
| η/mPa·s | 30 |

TABLE 13

|  | LC-7 | LC-8 |
| --- | --- | --- |
| Initial VHR (%) | 98.0 | 98.3 |
| VHR (%) after being left at 150° C. for 1 hour | 97.5 | 97.7 |
| Evaluation of burn-in | A | A |
| Evaluation of dropping marks | A | A |
| Evaluation of process compatibility | A | A |
| Evaluation of solubility at a low temperature | A | A |

Example 7 and Reference Example 2

The following liquid crystal compositions LC-9 and LC-10 (Reference Example 2) were prepared, and the values of the physical properties thereof were measured. The results are shown in the following table.

TABLE 14

| LC-9 | |
| --- | --- |
| Chemical structure | Ratio (%) |
| 3-Cy-Cy-1d0 | 18 |
| 3-Cy-Cy-1d1 | 8 |
| 5-Cy-Ph-02 | 5 |
| 0d1-Cy-Cy-Ph-1 | 14 |
| 2-Cy-Ph—Ph3—F | 7 |
| 3-Cy-Ph—Ph3—F | 15 |
| 3-Cy-Cy-CFFO—Ph3—F | 17 |
| 3-Ph—Ph3—CFFO—Ph3—F | 7 |
| 3-Cy-Cy-VO—Ph-Cy-3 | 3 |
| 3-Cy-Cy-VO—Ph-Cy-4 | 3 |
| 3-Cy-Cy-VO—Ph-Cy-5 | 3 |
| Tni | 99.1 |
| Birefringence | 0.098 |
| Dielectric anisotropy | 5.6 |
| Viscosity | 18 |
| Rotational viscosity | 80 |

TABLE 15

| LC-10 | |
| --- | --- |
| Chemical structure | Ratio (%) |
| 3-Cy-Cy-1d0 | 44 |
| 3-Cy-Cy-1d1 | 6 |
| 1-Ph—Ph-3d1 | 11 |
| 3-Cy-Ph—Ph-2 | 4 |
| 3-Cy-Ph—Ph1—F | 4 |
| 3-Cy-Cy-Ph1—Ph3—F | 8 |
| 3-Ph—Ph3—CFFO—Ph3—F | 4 |
| 3-Ph—Ph1—Ph3—CFFO—Ph3—F | 6 |
| 3-Ph—Ph1—Ph-3 | 8 |
| 5-Cy-Ph—Ph1—F | 5 |
| Tni | 75.3 |
| Birefringence | 0.112 |
| Dielectric anisotropy | 4.7 |
| Viscosity | 11 |
| Rotational viscosity | 42 |

Solubilities at a low temperature of the liquid crystal compositions LC-7 and LC-8 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-7 and LC-8 were examined, excellent results were exhibited as shown below.

Solubilities at a low temperature of the liquid crystal compositions LC-9 and LC-10 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-9 and LC-10 were examined, excellent results were exhibited as shown below.

TABLE 16

|  | LC-9 | LC-10 |
|---|---|---|
| Initial voltage holding ratio (%) | 98.0 | 98.5 |
| Voltage holding ratio (%) after being left at 150° C. for 1 hour | 97.6 | 97.9 |
| Evaluation of burn-in | A | A |
| Evaluation of dropping marks | A | A |
| Evaluation of process compatibility | A | A |
| Evaluation of solubility at a low temperature | A | A |

Examples 9 and 10

The following liquid crystal compositions LC-11 and LC-12 were prepared, and the values of the physical properties thereof were measured. The results are shown

TABLE 17

| Chemical structure | Ratio (%) |
|---|---|
| LC-11 | |
| 3-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph-4 | 3 |
| 2-Cy-Cy-Ph3—F | 8 |
| 2-Cy-Ph-Ph3—F | 3 |
| 2-Cy-Ph-Ph3—F | 9 |
| 3-Cy-Cy-Ph-0CFFF | 14 |
| 3-Ph—Ph3—CFF0-Ph3—F | 11 |
| 3-Cy-Cy-CFF0-Ph3—F | 9 |
| 5-Cy-Cy-CFF0-Ph3—F | 8 |
| 3-Cy-Cy-Ph1—Ph3—F | 3 |
| Tni/° C. | 90.2 |
| Δn | 0.098 |
| Δε | 9.1 |
| γ1/mPa·s | 76 |
| η/mPa·s | 17 |
| LC-12 | |
| 3-Cy-Cy-1d0 | 10 |
| 3-Cy-Cy-1d0FF | 28 |
| 3-Cy-Cy-1d1 | 6 |
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph-Ph1—Ph-2 | 2 |
| 3-Ph—Ph3—CFF0-Ph3—F | 7 |
| 3-Cy-Cy-CFF0-Ph3—F | 6 |
| Tni/° C. | 80.0 |
| Δn | 0.110 |
| Δε | 4.0 |
| γ1/mPa·s | 45 |
| η/mPa·s | 11 |

Solubilities at a low temperature of the liquid crystal compositions LC-11 and LC-12 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-11 and LC-12 were measured, excellent results were exhibited as shown below.

TABLE 18

|  | LC-11 | LC-12 |
|---|---|---|
| Initial VHR (%) | 98.0 | 99.5 |
| VHR (%) after being left at 150° C. for 1 hour | 97.1 | 99.2 |
| Evaluation of burn-in | A | A |
| Evaluation of dropping marks | A | A |
| Evaluation of process compatibility | A | A |
| Evaluation of solubility at a low temperature | A | A |

Example 11 and Reference Example 3

The following liquid crystal compositions LC-13 and LC-14 (Reference Example 3) were prepared, and the values of the physical properties thereof were measured. The results are shown in the following table.

TABLE 19

| Chemical structure | Ratio (%) |
|---|---|
| LC-13 | |
| 3-Cy-Cy-1d0 | 28 |
| 3-Cy-Cy-1d1 | 15 |
| 0d1-Cy-Cy-Ph-1 | 10 |
| 0d3-Cy-Cy-Ph-1 | 14 |
| 2-Ph—Ph3—CFF0-Ph3—F | 2 |
| 3-Ph—Ph3—CFF0-Ph3—F | 12 |
| 3-Cy-Cy-CFF0-Ph3—F | 7 |
| 3-Ph—Ph1—Ph3—CFF0-Ph3—F | 2 |
| 2-Py—Ph—Ph3—CFF0-Ph3—F | 3 |
| 3-Py—Ph—Ph3—CFF0-Ph3—F | 6 |
| 3-Ph—Ph—Ph1—Ph3—F | 1 |
| Tni/° C. | 85.5 |
| Δn | 0.102 |
| Δε | 6.7 |
| γ1/mPa·s | 53 |
| η/mPa·s | 15 |
| LC-14 | |
| 3-Cy-Cy-1d0 | 42 |
| 3-Cy-Cy-1d1 | 9 |
| 0d3-Cy-Cy-Ph-1 | 5 |
| 3-Cy-Ph—Ph-2 | 7 |
| 2-Ph—Ph1—Ph-3 | 4 |
| 2-Ph—Ph1—Ph-4 | 4 |
| 3-Cy-Ph—Ph-Cy-3 | 4 |
| 3-Ph—Ph3—CFF0-Ph3—F | 3 |
| 3-Ph—Ph1—Ph3—F | 9 |
| 3-Cy-Cy-Ph1—Ph3—F | 3 |
| 3-Cy-Ph—Cl | 3 |
| 2-Ph—Ph3—Ph3—F | 7 |
| Tni/° C. | 75.2 |
| Δn | 0.110 |
| Δε | 4.1 |
| γ1/mPa·s | 40 |
| η/mPa·s | 10 |

Solubilities at a low temperature of the liquid crystal compositions LC-13 and LC-14 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-13 and LC-14 were examined, excellent results were exhibited as shown below.

TABLE 20

|  | LC-13 | LC-14 |
|---|---|---|
| Initial VHR (%) | 98.5 | 99.5 |
| VHR (%) after being left at 150° C. for 1 hour | 98.0 | 99.0 |

TABLE 20-continued

|  | LC-13 | LC-14 |
|---|---|---|
| Evaluation of burn-in | A | A |
| Evaluation of dropping marks | A | A |
| Evaluation of process compatibility | A | A |
| Evaluation of solubility at a low temperature | A | A |

Examples 14 to 15

The following liquid crystal compositions LC-15 and LC-16 were prepared, and the values of the physical properties thereof were measured. The results are shown

TABLE 21

| Chemical structure | Ratio (%) |
|---|---|
| LC- 15 | |
| 3-Cy-Cy-1d0 | 47 |
| 3-Cy-Cy-1d1 | 7 |
| 2-Ph—Ph1—Ph-3 | 14 |
| 2-Ph—Ph1—Ph-5 | 9 |
| 2-Cy-Ph—Ph—F | 2 |
| 3-Cy-Ph—Ph—F | 6 |
| 3-Ph—Ph3—CFF0-Ph3—F | 6 |
| 2-Cy-Cy-Ph—Ph3—F | 4 |
| 3-Cy-Cy-Ph—Ph3—F | 5 |
| Tni/° C. | 75.7 |
| Δn | 0.110 |
| Δε | 3.5 |
| γ1/mPa · s | 39 |
| η/mPa · s | 11 |
| LC- 16 | |
| 3-Cy-Cy-1d0 | 41 |
| 3-Cy-Cy-1d1 | 7 |
| 0d1-Cy-Cy-Ph-1 | 11 |
| 2-Ph—Ph1—Ph-3 | 11 |
| 2-Ph—Ph1—Ph-5 | 11 |
| 3-Ph—Ph3—CFF0-Ph3—F | 9 |
| 4-Ph—Ph1—Ph3—CFF0-Ph3—F | 4 |
| 3-Cy-Cy-Ph—Ph3—F | 6 |
| Tni/° C. | 80.8 |
| Δn | 0.116 |
| Δε | 4.3 |
| γ1/mPa · s | 45 |
| η/mPa · s | 12 |

Solubilities at a low temperature of the liquid crystal compositions LC-15 and LC-16 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-15 and LC-16 were examined, excellent results were exhibited as shown below.

TABLE 22

|  | LC-15 | LC-16 |
|---|---|---|
| Initial VHR (%) | 99.7 | 99.5 |
| VHR (%) after being left at 150° C. for 1 hour | 99.5 | 99.2 |
| Evaluation of burn-in | A | A |
| Evaluation of dropping marks | A | A |
| Evaluation of process compatibility | A | A |
| Evaluation of solubility at a low temperature | A | A |

Examples 16 and 17

The following liquid crystal compositions LC-17 and LC-18 were prepared, and the values of the physical properties thereof were measured. The results are shown

TABLE 23

|  | Ratio (%) | |
|---|---|---|
| Chemical structure | LC-17 | LC-18 |
| 3-Cy-Cy-1d0 | 5 | 10 |
| 4-Cy-Cy-1d0 | 10 | |
| 5-Cy-Cy-1d0 | | 5 |
| 0d1-Cy-Cy-Ph-1 | 4 | 7 |
| 3d1-Cy-Cy-Ph-1 | 14 | 12 |
| 2-Ph—Ph1—Ph-4 | | 3 |
| 3-Cy-Ph—Ph-Cy-3 | 4 | 3 |
| 3-Cy-Ph—Ph1-Cy-3 | 3 | 3 |
| 1-Cy-Cy-Ph3—F | 9 | 9 |
| 2-Cy-Cy-Ph3—F | 5 | 10 |
| 3-Cy-Cy-Ph3—F | 10 | 6 |
| 5-Cy-Cy-Ph3—F | 10 | 5 |
| 0d1-Cy-Cy-Ph1—F | 8 | 8 |
| 3-Cy-Cy-Ph1—Ph3—F | 8 | 9 |
| 2-Ph—Ph3—CFFO—Ph3—F | | 4 |
| 3-Ph—Ph3—CFFO—Ph3—F | 10 | 6 |
| T n i | 102.8 | 104.8 |
| Birefringence | 0.0937 | 0.0994 |
| Dielectric anisotropy | 8.21 | 8.35 |
| Viscosity | 21.5 | 20.9 |
| Rotational viscosity | 97 | 98 |

Solubilities at a low temperature of the liquid crystal compositions LC-17 and LC-18 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-17 and LC-18 were examined, excellent results were exhibited as shown below.

TABLE 24

|  | LC-17 | LC-18 |
|---|---|---|
| Initial voltage holding ratio (%) | 98.1 | 98.2 |
| Voltage holding ratio (%) after being left at 150° C. for 1 hour | 97.6 | 97.4 |
| Evaluation of burn-in | A | A |
| Evaluation of dropping marks | A | A |
| Evaluation of process compatibility | A | A |
| Evaluation of solubility at a low temperature | A | A |

Example 18 and Reference Example 4

The following liquid crystal compositions LC-19 and LC-20 (Reference Example 4) were prepared, and the values of the physical properties thereof were measured. The results are shown in the following table.

TABLE 25

| Chemical structure | Ratio (%) |
|---|---|
| LC- 19 | |
| 3-Cy-Cy-1d0 | 35 |
| 3-Cy-Cy-1d1 | 15 |
| 1-Ph-Ph-3d1 | 11 |
| 3-Cy-Ph—Ph-2 | 4 |
| 3-Ph—Ph1—Ph-3 | 8 |

TABLE 25-continued

| Chemical structure | Ratio (%) |
|---|---|
| 3-Cy-Ph—Ph1—F | 4 |
| 5-Cy-Ph—Ph1—F | 5 |
| 3-Cy-Cy-Ph1—Ph3—F | 8 |
| 3-Ph—Ph3—CFF0-Ph3—F | 6 |
| 3-Ph—Ph1—Ph3—CFF0-Ph3—F | 4 |
| Tni/° C. | 76.8 |
| Δn | 0.113 |
| Δε | 4.5 |
| γ1/mPa · s | 44 |
| η/mPa · s | 10 |
| LC- 20 | |
| 3-Cy-Cy-1d0 | 37 |
| 3-Cy-Cy-1d1 | 12 |
| 0d1-Cy-Cy-Ph-1 | 4 |
| 0d3-Cy-Cy-Ph-1 | 9 |
| 2-Ph—Ph3—CFF0-Ph3—F | 7 |
| 3-Ph—Ph3—CFF0-Ph3—F | 3 |
| 3-Cy-Cy-CFF0-Ph3—F | 2 |
| 5-Cy-Cy-CFF0-Ph3—F | 3 |
| 3-Ph—Ph1—Ph3—F | 9 |
| 2-Ph—Ph1—Ph3—F | 5 |
| 3-Cy-Cy-Ph1—Ph3—F | 9 |
| Tni/° C. | 75.5 |
| Δn | 0.100 |
| Δε | 7.0 |
| γ1/mPa · s | 49 |
| η/mPa · s | 11 |

Solubilities at a low temperature of the liquid crystal compositions LC-19 and LC-20 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-19 and LC-20 were examined, excellent results were exhibited as shown below.

TABLE 26

| | LC-19 | LC-20 |
|---|---|---|
| Initial VHR (%) | 99.5 | 98.9 |
| VHR (%) after being left at 150° C. for 1 hour | 99.0 | 98.1 |
| Evaluation of burn-in | A | A |
| Evaluation of dropping marks | A | A |
| Evaluation of process compatibility | A | A |
| Evaluation of solubility at a low temperature | A | A |

Reference Examples 5 and 6

The following liquid crystal compositions LC-21 (Reference Example 5) and LC-22 (Reference Example 6) were prepared, and the values of the physical properties thereof were measured. The results are shown in the following table.

TABLE 27

| LC-21 | |
|---|---|
| Chemical structure | Ratio (%) |
| 3-Cy-Cy-1d0 | 26 |
| 0d1-Cy-Cy-Ph-1 | 14 |
| 5-Cy-Ph-02 | 5 |
| 2-Cy-Ph—Ph3—F | 3 |
| 3-Cy-Ph—Ph3—F | 19 |
| 3-Cy-Cy-CFFO—Ph3—F | 10 |
| 3-Ph—Ph3—CFFO—Ph3—F | 14 |
| 3-Cy-Cy-VO—Ph-Cy-3 | 3 |

TABLE 27-continued

| LC-21 | |
|---|---|
| Chemical structure | Ratio (%) |
| 3-Cy-Cy-VO—Ph-Cy-4 | 3 |
| 3-Cy-Cy-VO—Ph-Cy-5 | 3 |
| T n i | 87.8 |
| Birefringence | 0.101 |
| Dielectric anisotropy | 6.1 |
| Viscosity | 18 |
| Rotational viscosity | 75 |

TABLE 28

| LC-22 | |
|---|---|
| Chemical structure | Ratio (%) |
| 3-Cy-Cy-1d0 | 20 |
| 5-Cy-Cy-1d0 | 8 |
| 0d1-Cy-Cy-Ph-1 | 8 |
| 3-Ph—Ph3—CFFO—Ph3—F | 15 |
| 2-Cy-Cy-CFFO—Ph3—F | 8 |
| 3-Cy-Cy-CFFO—Ph3—F | 7 |
| 3-Ph—Ph1—Ph3—CFFO—Ph3—F | 7 |
| 2-Py—Ph—Ph3—CFFO—Ph3—F | 5 |
| 3-Py—Ph—Ph3—CFFO—Ph3—F | 10 |
| 3-Cy-Ph—Ph3—Ph1—OCFFF | 6 |
| 3-Ph—Ph—Ph1—Ph3—F | 2 |
| 3-Cy-Cy-VO—Ph-Cy-3 | 4 |
| T n i | 95.2 |
| Birefringence | 0.119 |
| Dielectric anisotropy | 19.9 |
| Viscosity | 31 |
| Rotational viscosity | 173 |

Solubilities at a low temperature of the liquid crystal compositions LC-21 and LC-22 were excellent, and slight change between the initial VHR and the VHR after being left at a high temperature of 150° C. for 1 hour was observed, and the change was an acceptable level. In addition, when burn-in, dropping marks, and process compatibility of a liquid crystal display element manufactured using the liquid crystal compositions LC-21 and LC-22 were examined, excellent results were exhibited as shown below.

TABLE 29

| | LC-21 | LC-22 |
|---|---|---|
| Initial voltage holding ratio (%) | 98.5 | 98.2 |
| Voltage holding ratio (%) after being left at 150° C. for 1 hour | 97.6 | 97.6 |
| Evaluation of burn-in | A | A |
| Evaluation of dropping marks | A | A |
| Evaluation of process compatibility | A | A |
| Evaluation of solubility at a low temperature | A | A |

Reference Example 7 and Example 23

The following liquid crystal compositions LC-23 (Reference Example 7) and LC-24 were prepared, and the values of the physical properties thereof were measured. The results are shown in the following table.

TABLE 30

| Chemical structure | Ratio (%) |
|---|---|
| LC- 23 | |
| 3-Cy-Cy-1d0 | 11 |
| 3-Cy-Cy-1d1 | 4 |
| 0d1-Cy-Cy-Ph-1 | 3 |
| 0d3-Cy-Cy-Ph-1 | 10 |
| 3-Cy-Ph—Ph-Cy-3 | 4 |
| 3-Cy-Ph—Ph1-Cy-3 | 3 |
| 0d1-Cy-Cy-Ph1—F | 8 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 10 |
| 3-Cy-Cy-Ph1—Ph3—F | 8 |
| 2-Ph—Ph3—CFFO-Ph3—F | 6 |
| 3-Ph—Ph3—CFF0-Ph3—F | 4 |
| Tni/° C. | 101.0 |
| Δn | 0.092 |
| Δε | 9.3 |
| γ1/mPa · s | 90 |
| η/mPa · s | 21 |
| LC- 24 | |
| 3-Cy-Cy-1d0 | 41 |
| 3-Cy-Cy-1d1 | 11 |
| 3-Cy-Ph—Ph-2 | 7 |
| 2-Ph—Ph1—Ph-3 | 4 |
| 2-Ph—Ph1—Ph-4 | 2 |
| 2-Ph—Ph1—Ph-5 | 6 |
| 3-Cy-Ph—Ph-Cy-3 | 4 |
| 3-Ph—Ph3—CFF0-Ph3—F | 3 |
| 3-Ph—Ph1—Ph3—F | 9 |
| 3-Cy-Cy-Ph1—Ph3—F | 3 |
| 3-Cy-Ph—Cl | 3 |
| 2-Ph—Ph3—Ph3—F | 7 |
| Tni/° C. | 75.1 |
| Δn | 0.115 |
| Δε | 3.9 |
| γ1/mPa · s | 39 |
| η/mPa · s | 11 |

Solubilities at a low temperature of the liquid crystal compositions LC-23 and LC-24 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-23 and LC-24 were examined, excellent results were exhibited as shown below.

TABLE 31

| | LC-23 | LC-24 |
|---|---|---|
| Initial VHR (%) | 98.6 | 99.6 |
| VHR (%) after being left at 150° C. for 1 hour | 97.9 | 99.3 |
| Evaluation of burn-in | A | A |
| Evaluation of dropping marks | A | A |
| Evaluation of process compatibility | A | A |
| Evaluation of solubility at a low temperature | A | A |

Examples 24 and 25

The following liquid crystal compositions LC-25 and LC-26 were prepared, and the values of the physical properties thereof were measured. The results are shown

TABLE 32

| Chemical structure | Ratio (%) |
|---|---|
| LC- 25 | |
| 3-Cy-Cy-1d0 | 10 |
| 4-Cy-Cy-1d0 | 21 |
| 3-Cy-Cy-1d1 | 18 |
| 1-Ph—Ph-5 | 6 |
| 1-Ph—Ph-3d1 | 6 |
| 0d1-Cy-Cy-Ph-1 | 8 |
| 2-Ph—Ph1—Ph-3 | 8 |
| 2-Ph—Ph1—Ph-5 | 9 |
| 3-Ph—Ph3—CFFO—Ph3—F | 5 |
| 5-Ph—Ph1—Ph3—CFFO—Ph3—F | 5 |
| 3-Cy-Ph—Ph3—Ph1—OCFFF | 4 |
| Tni/° C. | 77.5 |
| Δn | 0.126 |
| Δε | 3.0 |
| γ1/mPa · s | 47 |
| η/mPa · s | 13 |
| LC- 26 | |
| 3-Cy-Cy-1d0 | 6 |
| 3-Cy-Cy-1d0FF | 28 |
| 2-Cy-Cy-1d1 | 8 |
| 3-Cy-Cy-1d1 | 8 |
| 0d1-Cy-Cy-Ph-1 | 5 |
| 0d3-Cy-Cy-Ph-1 | 6 |
| 2-Ph—Ph1—Ph-3 | 11 |
| 2-Ph—Ph1—Ph-5 | 13 |
| 5-Cy-Ph—Ph1—Ph-2 | 2 |
| 3-Ph—Ph3—CFFO—Ph3—F | 7 |
| 3-Cy-Cy-CFFO—Ph3—F | 6 |
| Tni/° C. | 73.8 |
| Δn | 0.112 |
| Δε | 3.7 |
| γ1/mPa · s | 43 |
| η/mPa · s | 10 |

Solubilities at a low temperature of the liquid crystal compositions LC-25 and LC-26 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-25 and LC-26 were examined, excellent results were exhibited as shown below.

TABLE 33

| | LC-25 | LC-26 |
|---|---|---|
| Initial VHR (%) | 99.7 | 99.6 |
| VHR (%) after being left at 150° C. for 1 hour | 99.3 | 99.1 |
| Evaluation of burn-in | A | A |
| Evaluation of dropping marks | A | A |
| Evaluation of process compatibility | A | A |
| Evaluation of solubility at a low temperature | A | A |

Examples 26 and 27

The following liquid crystal compositions LC-27 and LC-28 were prepared, and the values of the physical properties thereof were measured. The results are shown

TABLE 34

| Chemical structure | Ratio (%) |
|---|---|
| LC- 27 | |
| 3-Cy-Cy-1d0 | 30 |
| 3-Cy-Cy-1d1 | 19 |
| 0d1-Cy-Cy-Cy-3 | 8 |
| 1-Ph—Ph-5 | 4 |
| 1-Ph—Ph-3d1 | 8 |
| 2-Ph—Ph1—Ph-3 | 6 |
| 2-Ph—Ph1—Ph-4 | 5 |
| 3-Ph—Ph3—CFFO—Ph3—F | 6 |
| 3-Ph—Ph1—Ph3—CFFO—Ph3—F | 10 |
| 3-Cy-Ph—Ph3—Ph1—OCFFF | 4 |
| Tni/° C. | 75.1 |
| $\Delta n$ | 0.122 |
| $\Delta \epsilon$ | 4.7 |
| $\gamma 1$/mPa·s | 45 |
| $\eta$/mPa·s | 12 |
| LC- 28 | |
| 3-Cy-Cy-1d0 | 40 |
| 3-Cy-Cy-1d1 | 14 |
| 3-Ph—Ph3—CFFO—Ph3—F | 6 |
| 2-Ph—Ph1—Ph-3 | 7 |
| 2-Ph—Ph1—Ph-5 | 7 |
| 0d1-Cy-Cy-Ph-1 | 5 |
| 0d3-Cy-Cy-Ph-1 | 4 |
| 2-Cy-Ph—Ph—F | 2 |
| 3-Cy-Ph—Ph—F | 6 |
| 2-Cy-Cy-Ph—Ph3—F | 7 |
| 3-Cy-Cy-Ph—Ph3—F | 2 |
| Tni/° C. | 79.2 |
| $\Delta n$ | 0.098 |
| $\Delta \epsilon$ | 3.7 |
| $\gamma 1$/mPa·s | 40 |
| $\eta$/mPa·s | 11 |

Solubilities at a low temperature of the liquid crystal compositions LC-27 and LC-28 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-27 and LC-28 were examined, excellent results were exhibited as shown below.

TABLE 35

| | LC-27 | LC-28 |
|---|---|---|
| Initial VHR (%) | 99.5 | 99.8 |
| VHR (%) after being left at 150° C. for 1 hour | 99.2 | 99.4 |
| Evaluation of burn-in | A | A |
| Evaluation of dropping marks | A | A |
| Evaluation of process compatibility | A | A |
| Evaluation of solubility at a low temperature | A | A |

Examples 28 and 29

The following liquid crystal compositions LC-29 and LC-30 were prepared, and the values of the physical properties thereof were measured. The results are shown

TABLE 36

| Chemical structure | Ratio (%) |
|---|---|
| LC- 29 | |
| 3-Cy-Cy-1d0 | 35 |
| 3-Cy-Cy-1d1 | 15 |
| 1-Ph—Ph-3d1 | 11 |

TABLE 36-continued

| Chemical structure | Ratio (%) |
|---|---|
| 3-Cy-Ph—Ph-2 | 4 |
| 3-Ph—Ph1—Ph-5 | 8 |
| 3-Cy-Ph—Ph1—F | 4 |
| 5-Cy-Ph—Ph1—F | 5 |
| 3-Cy-Cy-Ph1—Ph3—F | 8 |
| 3-Ph—Ph3—CFFO-Ph3—F | 6 |
| 3-Ph—Ph1—Ph3—CFFO-Ph3—F | 4 |
| Tni/° C. | 78.2 |
| $\Delta n$ | 0.113 |
| $\Delta \epsilon$ | 4.5 |
| $\gamma 1$/mPa·s | 44 |
| $\eta$/mPa·s | 10 |
| LC- 30 | |
| 3-Cy-Cy-1d0 | 41 |
| 3-Cy-Cy-1d1 | 11 |
| 3-Cy-Ph—Ph-2 | 7 |
| 2-Ph—Ph1—Ph-3 | 4 |
| 2-Ph—Ph1—Ph-4 | 2 |
| 2-Ph—Ph1—Ph-5 | 6 |
| 3-Cy-Ph—Ph-Cy-3 | 4 |
| 3-Ph—Ph3—CFFO-Ph3—F | 3 |
| 3-Ph—Ph1—Ph3—F | 9 |
| 3-Cy-Cy-Ph1—Ph3—F | 3 |
| 3-Cy-Ph—Cl | 3 |
| 3-Ph—Ph3—Ph3—F | 7 |
| Tni/° C. | 79 |
| $\Delta n$ | 0.115 |
| $\Delta \epsilon$ | 3.9 |
| $\gamma 1$/mPa·s | 39 |
| $\eta$/mPa·s | 11 |

Solubilities at a low temperature of the liquid crystal compositions LC-29 and LC-30 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-29 and LC-30 were examined, excellent results were exhibited as shown below.

TABLE 37

| | LC-29 | LC-30 |
|---|---|---|
| Initial VHR (%) | 99.3 | 99.6 |
| VHR (%) after being left at 150° C. for 1 hour | 98.9 | 99.1 |
| Evaluation of burn-in | A | A |
| Evaluation of dropping marks | A | A |
| Evaluation of process compatibility | A | A |
| Evaluation of solubility at a low temperature | A | A |

Examples 30 and 31

The following liquid crystal compositions LC-31 and LC-32 were prepared, and the values of the physical properties thereof were measured. The results are shown

TABLE 38

| Chemical structure | Ratio (%) |
|---|---|
| LC- 31 | |
| 3-Cy-Cy-1d0 | 47 |
| 3-Cy-Cy-1d1 | 9 |
| 3-Ph—Ph1—Ph3—F | 13 |
| 3-Ph—Ph3—CFFO—Ph3—F | 2 |
| 3-Cy-Ph—Ph-2 | 7 |
| 2-Ph—Ph1—Ph-3 | 4 |
| 2-Ph—Ph1—Ph-5 | 7 |

TABLE 38-continued

| Chemical structure | Ratio (%) |
|---|---|
| 3-Cy-Cy-Ph1—Ph3—F | 2 |
| 3-Cy-Ph—Ph-Cy-3 | 2 |
| 3-Cy-Ph—Ph3—Ph1—OCFFF | 7 |
| Tni/° C. | 81.2 |
| $\Delta n$ | 0.122 |
| $\Delta \epsilon$ | 4.7 |
| $\gamma 1$/mPa · s | 50 |
| $\eta$/mPa · s | 12 |

LC- 32

| | |
|---|---|
| 3-Cy-Cy-1d0 | 47 |
| 3-Cy-Cy-1d1 | 9 |
| 2-Ph—Ph1—Ph3—F | 4 |
| 3-Ph—Ph1—Ph3—F | 9 |
| 3-Ph—Ph3—CFFO—Ph3—F | 2 |
| 3-Cy-Ph—Ph-2 | 7 |
| 2-Ph—Ph1—Ph-3 | 4 |
| 2-Ph—Ph1—Ph-5 | 7 |
| 3-Cy-Cy-Ph1—Ph3—F | 2 |
| 3-Cy-Ph—Ph-Cy-3 | 2 |
| 3-Cy-Ph—Ph3—Ph1—OCFFF | 7 |
| Tni/° C. | 80.5 |
| $\Delta n$ | 0.121 |
| $\Delta \epsilon$ | 4.8 |
| $\gamma 1$/mPa · s | 51 |
| $\eta$/mPa · s | 12 |

Solubilities at a low temperature of the liquid crystal compositions LC-31 and LC-32 were excellent, and the initial VHR and the VHR after being left at a high temperature of 150° C. for 1 hour did not substantially change. In addition, when burn-in, dropping marks, and process compatibility of a liquid crystal display element manufactured using the liquid crystal compositions LC-31 and LC-32 were examined, excellent results were exhibited as shown below.

TABLE 39

| | LC-31 | LC-32 |
|---|---|---|
| Initial VHR (%) | 99.5 | 99.6 |
| VHR (%) after being left at 150° C. for 1 hour | 99.3 | 99.3 |
| Evaluation of burn-in | A | A |
| Evaluation of dropping marks | A | A |
| Evaluation of process compatibility | A | A |
| Evaluation of solubility at a low temperature | A | A |

Examples 32 and 33

The following liquid crystal compositions LC-33 and LC-34 were prepared, and the values of the physical properties thereof were measured. The results are shown in the following table.

TABLE 40

LC-33

| Chemical structure | Ratio (%) |
|---|---|
| 3-Cy-Cy-1d0 | 11 |
| 2-Cy-Cy-1d1 | 10 |
| 3-Cy-Cy-1d1 | 8 |
| 3-Cy-Cy-4 | 4 |
| 3-Cy-Ph-O1 | 11 |
| 0d1-Cy-Cy-Ph-1 | 17 |
| 0d3-Cy-Cy-Ph-1 | 9 |
| 0d3-Ph—Ph1—Ph-2 | 1 |
| 3-Ph—Ph3—CFFO—Ph3—F | 9 |
| 3-Ph—Ph1—Ph3—CFFO—Ph3—F | 5 |
| 3-Py—Ph—Ph3—CFFO—Ph3—F | 4 |

TABLE 40-continued

LC-33

| Chemical structure | Ratio (%) |
|---|---|
| 3-Cy-Cy-Ph1—Ph3—F | 7 |
| 3-Ph—Ph—Ph1—Ph3—F | 1 |
| 3-Cy-Cy-Ph—OCFFF | 3 |
| T n i | 90.0 |
| Birefringence | 0.105 |
| Dielectric anisotropy | 7.2 |
| Viscosity | 13 |
| Rotational viscosity | 65 |

TABLE 41

LC-34

| Chemical structure | Ratio (%) |
|---|---|
| 3-Cy-Cy-1d0 | 56 |
| 3-Ph—Ph1—Ph3—F | 13 |
| 3-Ph—Ph3—CFFO—Ph3—F | 2 |
| 3-Cy-Ph—Ph-2 | 7 |
| 2-Ph—Ph1—Ph-3 | 4 |
| 2-Ph—Ph1—Ph-5 | 7 |
| 3-Cy-Cy-Ph1—Ph3—F | 4 |
| 3-Cy-Ph—Ph3—Ph1—OCFFF | 7 |
| T n i | 76.0 |
| Birefringence | 0.119 |
| Dielectric anisotropy | 5.2 |
| Viscosity | 11 |
| Rotational viscosity | 48 |

Solubilities at a low temperature of the liquid crystal compositions LC-33 and LC-34 were excellent, and a slight difference between the initial VH and the VHR after being left at a high temperature of 150° C. for 1 hour was observed, and the change was within an acceptable range. In addition, when burn-in, dropping marks, and process compatibility of a liquid crystal display element manufactured using the liquid crystal compositions LC-33 and LC-34 were examined, excellent results were exhibited as shown below.

TABLE 42

| | LC-33 | LC-34 |
|---|---|---|
| Initial voltage holding ratio (%) | 99.0 | 99.5 |
| Voltage holding ratio (%) after being left at 150° C. for 1 hour | 97.9 | 99.0 |
| Evaluation of burn-in | A | A |
| Evaluation of dropping marks | A | A |
| Evaluation of process compatibility | A | A |
| Evaluation of solubility at a low temperature | A | A |

Example 35

To 99.7% of the nematic liquid crystal composition LC-1 shown in the example 1, 0.3% of the polymerizable compound represented by formula (V-2)

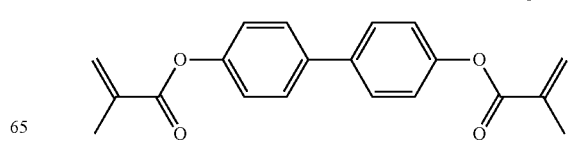

[Chem. 102]

was added and the resultant product was homogeneously dissolved, whereby a polymerizable liquid crystal composition CLC-1 was prepared. The physical properties of the CLC-1 are almost the same as the physical properties of the nematic liquid crystal composition shown in the example 1. The CLC-1 was injected into an ITO applied cell coated with a polyimide alignment film which induces a homogeneous alignment having a cell gap of 3.5 μm by the vacuum injection method. While applying a square wave of a frequency of 1 kHz to this cell, irradiation of ultraviolet rays was performed to the liquid crystal cell by a high-pressure mercury lamp through a filter which cuts ultraviolet rays of 320 nm or less. The irradiation intensity of the cell surface was adjusted so as to become 10 mW/cm$^2$, the irradiation was performed for 600 seconds, whereby a horizontal alignment liquid crystal display element in which the polymerizable compound in the polymerizable liquid crystal composition was polymerized was obtained. By polymerizing the polymerizable compound, it was confirmed that a force for restricting the alignment with respect to the liquid crystal compound occurs.

Example 36

Manufacture of Liquid Crystal Display Element for Active Matrix Driving (Production of Front Plane)
(Formation of Black Matrix)
A black matrix forming composition having the following composition was coated on a borosilicate glass substrate for the liquid crystal display element (OA-10 manufactured by Nippon Electric Glass Co, Ltd.) such that the thickness in a wet state becomes 10 μm using a die coater, and after drying, pre-baking was performed at a temperature of 90° C. for 2 minutes, whereby a black matrix layer having a thickness of 2 μm was formed.
(Coating Composition for Black Matrix Formation)
Benzyl methacrylate/methacrylic acid copolymer (molar ratio=73/27) 300 parts
Dipentaerythritol hexaacrylate 160 parts
Carbon black dispersion 300 parts
Photopolymerization initiator (2-benzyl-2-dimethylamino-1-(4-morpholinophenyl)butanone-1) 5 parts
Propylene glycol monomethyl ether acetate 1200 parts
The numbers of parts are all by mass.
Thereafter, the glass substrate to which the black matrix layer obtained above was applied was introduced to an exposure apparatus having an apparatus for transporting the substrate from the upstream side to the downstream side, and transported to an exposure portion.
The temperature of the main body of the exposure apparatus was adjusted so as to be 23° C.±0.1° C., and the relative humidity was adjusted so as to be 60%±1%, respectively.
After the glass substrate to which the black matrix layer above was applied was adsorptively fixed on an exposure table, a gap between a coating film surface of the glass substrate and a photomask pattern was automatically adjusted so as to be 100 μm. In addition, as for the light exposure position of the glass substrate, the distance from the end surface of the glass substrate was automatically detected, and after the distance from the glass substrate to the photomask pattern position was automatically adjusted so as to be a constant distance, exposure was performed. As a light source, a high-pressure mercury lamp was used, exposure was performed on the exposure area of 200 mm×200 mm using an I-line (wavelength: 365 nm) at an illuminance of 15 mW/cm$^2$ for 20 seconds, and the exposure amount was 300 mJ/cm$^2$.

The developing process was performed by a developing device installed on the downstream side of an exposure machine. The glass base material after the exposure process was transported at a constant rate of 400 mm/min, whereby a substrate (1) to which a black matrix layer in which a black matrix having a predetermined pattern was laminated was applied was obtained.

As a result of measuring a size change of an alignment mark formed by the same material as that of the black matrix in a transport direction and a direction perpendicular to the transport direction under the conditions of a temperature of 23° C.±0.1° C. and a relative humidity of 60%±1% using a dimension measuring machine (NEXIV VMR-6555 manufactured by Nikon Corporation), a size value of the photomask was 100.000 mm in the transport direction and 100.000 mm in the perpendicular direction, and actually, a size of the pattern formed on the glass base material was 99.998 mm in the transport method and 100.001 mm in the perpendicular direction.

Thereafter, the black matrix was heat-cured by performing post baking at 220° C. for 30 minutes in a bake furnace. When a size of the obtained black matrix was measured under the same conditions (temperature; 23° C.±0.1° C., relative humidity; 60%±1%), a size of the pattern formed on the substrate (1) was 99.998 mm in the transport direction and 100.001 mm in the perpendicular direction.
(Formation of RGB Coloration Layer)
A coloration pattern forming composition having the following composition was coated using a die coater on the substrate (1) to which a black matrix layer was applied such that the thickness in a wet state becomes 10 μm, and after drying, pre-baking was performed at a temperature of 90° C. for 2 minutes, whereby a substrate (1) to which a black matrix layer having a thickness of 2 μm and a coloration pattern forming composition were applied was obtained.

A composition of a red coloration pattern forming composition is shown below. When an arbitrary green pigment is used instead of a red pigment, a GREEN coloration pattern forming composition is obtained, and when a blue pigment is used, a BLUE coloration pattern forming composition is obtained. Each of the red, green, and blue coloration pigments may include a resin composition for the purpose of improving coloring or brightness. As the resin composition for such purposes, a block copolymer with methacrylic acid having a primary, secondary, or tertiary amino group is used in many cases, and specifically, "BYK6919" and the like manufactured by BYK Japan KK are exemplified.
(Red Coloration Pattern Forming Composition)
Benzyl methacrylate/methacrylic acid copolymer (molar ratio=73/27) 50 parts
Trimethylolpropane triacrylate 40 parts
Red pigment (C. I. Pigment Red 254) 90 parts
Photopolymerization initiator (2-methyl-1-[4-(methylthio)phenyl]-2-morpholinopropanone-1) 1.5 parts
Propylene glycol monomethyl ether acetate 600 parts
The numbers of parts are all by mass.
(Case of Green Coloration Pattern)
Green coloration pattern is manufactured in the same manner as in the red coloration pattern forming composition except that a green pigment (for example, C. I. Pigment Green 58) is used instead of the red pigment used in the red coloration pattern forming composition.

(Case of Blue Coloration Pattern)

Blue coloration pattern is manufactured in the same manner as in the red coloration pattern forming composition except that a blue pigment (for example, C. I. Pigment Blue 15.6) is used instead of the red pigment used in the red coloration pattern forming composition.

The substrate (1) to which the black matrix layer obtained above and the coloration pattern forming composition were applied was introduced to the exposure apparatus having an apparatus for transporting from the upstream side to the downstream side, and transported to the exposure portion.

The temperature of the main body of the exposure apparatus was adjusted so as to be 23° C.±0.1° C., and the relative humidity was adjusted so as to be 60%±1%, respectively.

After the substrate (1) to which the black matrix layer and the coloration pattern forming composition were applied was adsorptively fixed on the exposure table, a gap between a coating film surface of the substrate (1) to which the black matrix layer and the coloration pattern forming composition were applied and a photomask pattern was automatically adjusted so as to be 100 μm. In addition, as for the light exposure position of the substrate (1) to which the black matrix layer and the coloration pattern forming composition were applied, the distance from the end surface of the substrate (1) to which the black matrix layer and the coloration pattern forming composition were applied was automatically detected, and distance of the photomask pattern position from the substrate (1) to which the black matrix layer and the coloration pattern forming composition were applied was automatically adjusted so as to be a constant distance. After alignment with respect to a photomask for RED was performed using the alignment mark simultaneously formed at the time of forming the above-described black matrix, exposure was performed. As a light source, a high-pressure mercury lamp was used, exposure was performed on the exposure area of 200 mm×200 mm using an I-line (wavelength: 365 nm) at an illuminance of 15 mW/cm$^2$ for 20 seconds, and the exposure amount was 100 mJ/cm$^2$. The developing was performed by the developing device installed on the downstream side of the exposure machine. The substrate (1) to which the black matrix layer and the coloration pattern forming composition were applied after the exposure process was transported at a constant rate of 400 mm/min, whereby a substrate (1) in which a RED coloration layer was laminated at a predetermined position of an opening portion of the black matrix on the glass base material was obtained. Thereafter, the red coloration layer was heat-cured by performing post baking at 220° C. for 30 minutes in a bake furnace. By repeating the same method as in the above-described RED, GREEN and BLUE coloration layers were formed, whereby a color filter in which a black matrix and an RGB coloration layer were formed on the substrate (1) was obtained. Moreover, when a size of the black matrix was measured under the same conditions (temperature; 23° C.±0.1° C., relative humidity; 60%±1%) after a post bake process of the BLUE coloration layer, a size of the pattern formed on the glass substrate was 99.999 mm in the transport direction and 100.002 mm in the perpendicular direction. The size change of the black matrix was 10 ppm in the manufacturing process from after the development of the first layer (black matrix layer) to after the post baking of the fourth layer (BLUE layer), and by this, it was possible to form a 4-inch size color filter having a resolution of 200 ppi (BM line width of 7 μm, pitch of 42 μm) on the glass base material without causing a pixel shift. (Formation of ITO electrode layer)

Subsequently, the color filter was introduced into the sputtering apparatus, an ITO film having a film thickness of 150 nm was formed on the black matrix and the RGB coloration layer using ITO (indium tin oxide) as a target in a reactive sputter using oxygen as a reaction gas by DC sputter, and this was used as an ITO electrode layer. A sheet resistance value of the ITO electrode produced in this manner was 45 Ω/square.

(Formation of Post Spacer)
(Preparation of Dry Film)

As for a dry film for forming the post spacer, a post spacer forming composition consisting of a negative type photosensitive resin was coated using a die coater on a PET base film having a thickness of 25 μm such that the thickness in a wet state becomes 20 μm, and after drying, pre-baking was performed at a temperature of 90° C. for 2 minutes to obtain a thickness of 4.5 μm. Thereafter, a PET cover film having a thickness of 25 μm was laminated on the top thereof, and this was used as a dry film for forming the post spacer.

(Production of laminate substrate)

The dry film for forming the pattern spacer from which the cover film was peeled-off in advance was laminated on the substrate (1) on which the black matrix, the RGB coloration layer, and the ITO electrode layer obtained above were formed such that the post spacer forming composition faces the ITO electrode layer, and the post spacer forming composition layer was continuously transferred under the conditions of a roller pressure of 5 kg/cm$^2$, a roller surface temperature of 120° C., and a rate of 800 mm/min. At this time, without peeling-off the base film was not peeled off from the resultant, and the resultant was advanced to the next exposure process in a state that the base film was attached on the post spacer forming composition.

(Exposure Processing Step)

The laminate substrate obtained above was introduced to an exposure apparatus having an apparatus for transporting the substrate from the upstream side to the downstream side, and transported to the exposure portion.

The temperature of the main body of the exposure apparatus was adjusted so as to be 23° C.±0.1° C., and the relative humidity was adjusted so as to be 60%±1%, respectively.

After the laminate substrate was adsorptively fixed on the exposure table, a gap between the base film of the laminate substrate and the photomask pattern was automatically adjusted so as to be 30 μm. The photomask pattern used at this time was designed so as to become a spacer pattern formed on the black matrix.

In addition, as for the light exposure position of the pattern on the laminate substrate, the distance from the end surface of the laminate substrate was automatically detected, and according to the detection result, distance of the photomask pattern position from the laminate substrate was automatically adjusted so as to be a constant distance. After alignment with respect to a photomask for the post spacer was performed using the alignment mark simultaneously formed at the time of forming the above-described black matrix, exposure was performed. As a light source, a high-pressure mercury lamp was used, exposure was performed on the exposure area of 200 mm×200 mm using an I-line (wavelength: 365 nm) at an illuminance of 15 mW/cm$^2$ for 20 seconds, and the exposure amount was 300 mJ/cm$^2$.

(Developing process•post-bake processing step)

The developing process was performed while, after installing the developing device on the downstream side of the exposure machine, peeling the base film off from the laminate substrate after exposure in the developing device, and transporting the laminate substrate at a constant rate of 400 mm/min. In this manner, a color filter in which a pattern spacer was formed at a predetermined position of a lattice pattern portion of the black matrix on the substrate (1) on which the black matrix, the RGB coloration layer, and the ITO electrode layer described above were formed was obtained. Thereafter, the post spacer was heat-cured by performing a post bake process at 220° C. for 30 minutes in a bake furnace. In this manner, a front plane in which the black matrix, the RGB coloration layer, the ITO electrode layer, and the post spacer were formed on the substrate (1) using the spacer pattern was obtained.

(Production of Back Plane)
(Formation of TFT Electrode Layer)

A TFT electrode layer was formed on a transparent substrate using a glass plate for the liquid crystal display element (OA-10 manufactured by Nippon Electric Glass Co., Ltd.) as the transparent substrate according to the method described in JP-A-2004-140381.

That is, after forming an amorphous Si layer of a thickness of 100 nm on a glass substrate, an Si oxide layer ($SiO_x$) was formed by the vacuum film-forming method. Thereafter, by forming a TFT layer and a pixel electrode on the Si oxide layer using the photo lithography method and the etching method, a TFT array-applied glass substrate to be used as a back plane was obtained.

(Manufacture of Liquid Crystal Display Element)
(Alignment Film Formation)

A liquid crystal alignment film was formed on the front plane and the back plane produced as described above. After washing both substrates with pure water, a liquid crystal alignment agent including polyimide was coated using a liquid crystal alignment film coating printer (flexographic press), the resultant product was dried at 180° C. for 20 minutes in an oven, and a coating film having an average dried film thickness of 600 angstroms was formed on the surface of the front plane on which ITO was formed and on the surface of the back plane on which the TFT electrode layer was formed. This coating film was subjected to the rubbing treatment by a rubbing apparatus having a roll wrapped with cloth of rayon at a roller rotational speed of 400 rpm, a stage movement speed of 30 mm/s, a fur push length of 0.4 mm, washed with water, and dried at 120° C. for 10 minutes in an oven. Using a dispenser, a closed loop of the seal material was drawn to the seal material-coated portion of the front plane by coating.

Using a photo-heat combination curable type resin composition including a bisphenol A-type methacrylic acid-modified epoxy resin as the seal material, 0.5% by mass of a spherical spacer having almost the same size as the post spacer formed as above, with respect to the resin component, was mixed in the seal material. The coating amount of the seal material was adjusted so as to become a seal width (0.7 mm) of the liquid crystal display element. Subsequently, using a constant volume metering pump type dispenser at a predetermined position in the seal material closed loop, dropping of the liquid crystal composition (LC-13) shown in the example 11 by 24.7 pL was performed 90 times per front plane. (Total 2230 pL)

The front plane and the back plane after liquid crystal dropping were adsorbed to an electrostatic chuck. The front plane and the back plane were disposed so as to face each other. The back plane was slowly lowered, and when the distance between the front plane and the back plane was 300 μm, the lowering was stopped. In this state, the inside of a vacuum chamber was decompressed to 100 Pa. Using the alignment mark which was formed in advance, a bonding position of the front plane and the back plane was adjusted.

After alignment was completed, the front plane and the back plane were moved closer to each other, and the both base materials were held at a height at which the seal material and the TFT electrode layer come into contact. In this state, an inert gas was introduced into the vacuum chamber, and the inside of the system was returned to atmospheric pressure. The front plane and the back plane were compressed by atmospheric pressure, and a cell gap was formed at the height of the post spacer. Subsequently, irradiation of ultraviolet rays was performed (365 nm, 30 kJ/m$^2$) to the seal material-coated portion to cure the seal material, whereby the substrates were fixed with each other. In this state, the substrate applied with the liquid crystal composition was transported to a heating apparatus, held at the surface temperature of 120° C. for one hour, and air-cooled after heating ended, whereby a liquid crystal display element for active matrix driving was obtained.

REFERENCE SIGNS LIST

100: Substrate a
102: TFT layer
103: Pixel electrode
104: Passivation film
105: Alignment film a
200: Substrate b
201: Planarization film (overcoat layer)
202: Black matrix
203: Color filter
204: Transparent electrode
205: Alignment film b
301: Seal material
302: Post spacer
303: Liquid crystal layer
304: Projection
401: Post spacer pattern photomask
402: Post spacer forming composition

The invention claimed is:
1. A liquid crystal composition having positive dielectric anisotropy, comprising:
  a component (A) which is a dielectrically positive component containing a compound represented by formula (1), a compound represented by general formula (2), and a compound represented by formula (12.2); and
  a dielectrically neutral component (B) of which dielectric anisotropy is greater than −2 and less than +2 including a compound represented by formula (40), two or more types of compounds represented by general formula (9), and a compound represented by formula (4.4),
  wherein the compound represented by general formula (40) is contained in an amount of 29% by mass or more with respect to the total amount of the liquid crystal composition:

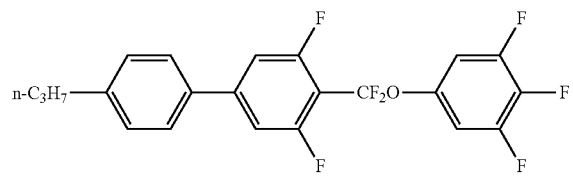

(1)

-continued

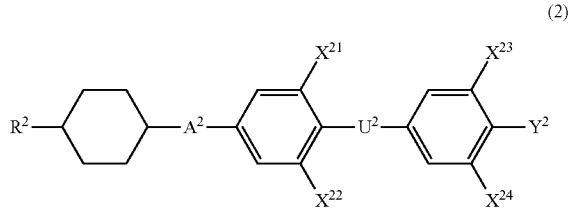
(2)

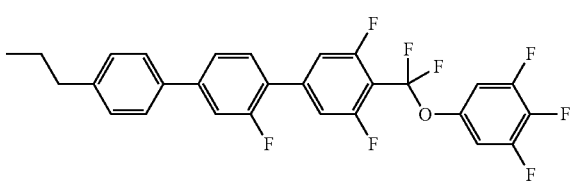
(12.2)

(wherein in formula (2), $R^2$ represents an alkyl group having 2 to 5 carbon atoms, $A^2$ represents a 1,4-phenylene group or a 1,4-cyclohexylene group, each of $X^{21}$ to $X^{24}$ independently represents a hydrogen atom or a fluorine atom, $U^2$ represents a single bond, and $Y^2$ represents a fluorine atom or $-OCF_3$),

[Chem. 3]

(40)

[Chem. 4]

(9)

(4.4)

(wherein, each of $R^{91}$ and $R^{92}$ independently represents an alkyl group having 2 to 5 carbon atoms or an alkenyl group having 2 to 5 carbon atoms, and each of $X^{91}$ and $X^{92}$ independently represents a hydrogen atom or a fluorine atom).

2. The liquid crystal composition according to claim 1, comprising:

one type or two or more types of compounds represented by general formula (6) as the dielectrically positive component (A):

[Chem. 5]

(6)

(wherein, $R^6$ represents an alkyl group having 2 to 5 carbon atoms, each of $X^{65}$ to $X^{66}$ independently represents a hydrogen atom or a fluorine atom, $Y^6$ represents a fluorine atom or $-OCF_3$, and $U^6$ represents a single bond or $-CF_2O-$).

3. The liquid crystal composition according to claim 1, comprising:

one type or two or more types of compounds represented by general formula (8) as the dielectrically positive component (A):

[Chem. 6]

(8)

(wherein, $R^8$ represents an alkyl group having 2 to 5 carbon atoms, $A^8$ represents a 1,4-phenylene group or a 1,4-cyclohexylene group, and each of $X^{86}$ to $X^{89}$ independently represents a hydrogen atom or a fluorine atom).

4. The liquid crystal composition according to claim 1, comprising:

a compound represented by formula (10):

[Chem. 8]

(10)

5. The liquid crystal composition according to claim 1, comprising:

one type or two or more types of compounds represented by general formula (16) as the dielectrically neutral component (B):

[Chm. 9]

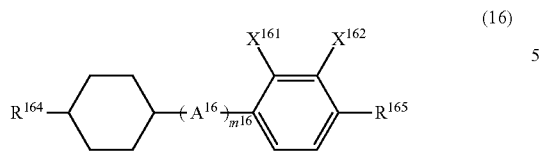

(16)

(wherein, $R^{164}$ represents an alkyl group having 2 to 5 carbon atoms, $R^{165}$ represents an alkyl group or an alkoxy group having 1 to 5 carbon atoms, each of $X^{161}$ and $X^{162}$ independently represents a hydrogen atom or a fluorine atom, $A^{16}$ represents a 1,4-phenylene group or a 1,4-cyclohexylene group, and $m^{16}$ represents 0 or 1).

6. A liquid crystal display element for active matrix driving using the liquid crystal composition according to claim 1.

* * * * *